United States Patent
Sasada et al.

(10) Patent No.: US 11,434,383 B2
(45) Date of Patent: Sep. 6, 2022

(54) INK COMPOSITION FOR INK JET PRINTING, IMAGE FORMING METHOD, AND RECORDED MATERIAL

(71) Applicant: FUJIFILM CORPORATION, Tokyo (JP)

(72) Inventors: Misato Sasada, Kanagawa (JP); Toshiyuki Makuta, Kanagawa (JP); Daisuke Sasaki, Kanagawa (JP); Akihiro Hara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 137 days.

(21) Appl. No.: 16/931,476

(22) Filed: Jul. 17, 2020

(65) Prior Publication Data

US 2020/0347252 A1 Nov. 5, 2020

Related U.S. Application Data

(63) Continuation of application No. PCT/JP2019/006627, filed on Feb. 21, 2019.

(30) Foreign Application Priority Data

Feb. 21, 2018 (JP) .............................. JP2018-029131

(51) Int. Cl.
*C09D 11/00* (2014.01)
*C09D 11/10* (2014.01)
(Continued)

(52) U.S. Cl.
CPC ............ *C09D 11/10* (2013.01); *B42D 25/382* (2014.10); *C09D 11/033* (2013.01);
(Continued)

(58) Field of Classification Search
USPC .......... 106/31.01, 31.13, 31.6, 31.75, 31.76, 106/31.77
See application file for complete search history.

(56) References Cited

U.S. PATENT DOCUMENTS

2006/0203056 A1 9/2006 Furukawa et al.
2010/0196604 A1 8/2010 Kariya et al.
(Continued)

FOREIGN PATENT DOCUMENTS

CN 1890111 A 1/2007
CN 102199384 A 9/2011
(Continued)

OTHER PUBLICATIONS

International Search Report issued in International Application No. PCT/JP2019/006627 dated May 7, 2019.
(Continued)

*Primary Examiner* — James E McDonough
(74) *Attorney, Agent, or Firm* — Solaris Intellectual Property Group, PLLC

(57) ABSTRACT

Provided are an ink composition for ink jet printing, and an image forming method and a recorded material using the ink composition for ink jet printing. The ink composition for ink jet printing includes: a colorant represented by the following Formula 1; resin particles; a water-soluble organic solvent; and water.

In Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain consisting of 5 or 7 methine groups, and a methine group at a center of the methine chain has a specific substituent.

(Continued)

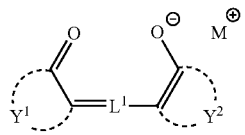

Formula 1

10 Claims, 1 Drawing Sheet

(51) Int. Cl.
  *B42D 25/382* (2014.01)
  *C09D 11/033* (2014.01)
  *C09D 11/102* (2014.01)
  *C09D 11/107* (2014.01)
  *C09D 11/322* (2014.01)
  *C09D 11/36* (2014.01)
  *C09D 1/00* (2006.01)
  *C09D 4/00* (2006.01)
  *C09D 5/00* (2006.01)
  *C09K 3/00* (2006.01)

(52) U.S. Cl.
  CPC .......... *C09D 11/102* (2013.01); *C09D 11/107* (2013.01); *C09D 11/322* (2013.01); *C09D 11/36* (2013.01)

(56) References Cited

U.S. PATENT DOCUMENTS

| 2011/0175965 | A1* | 7/2011 | Ono ..................... C09D 11/328 347/20 |
| 2011/0193912 | A1  | 8/2011 | Sakai et al. |
| 2011/0234688 | A1  | 9/2011 | Ikoshi |
| 2015/0166819 | A1* | 6/2015 | Shinohara ............... C09D 11/40 347/21 |
| 2016/0312032 | A1* | 10/2016 | Fujie ....................... C09B 11/28 |
| 2016/0349573 | A1  | 12/2016 | Ohmuro et al. |
| 2018/0016451 | A1  | 1/2018 | Okada et al. |
| 2018/0120485 | A1  | 5/2018 | Oota et al. |
| 2019/0176487 | A1* | 6/2019 | Hirai ..................... C09D 11/328 |

FOREIGN PATENT DOCUMENTS

| CN | 105874361 A | 8/2016 |
| CN | 107532031 A | 1/2018 |
| CN | 107533170 A | 1/2018 |
| EP | 3299422 A1 | 3/2018 |
| EP | 3502198 A1 | 6/2019 |
| JP | 2008-144004 A | 6/2008 |
| JP | 2009-109774 A | 5/2009 |
| JP | 2010-23339 A | 2/2010 |
| JP | 2010-173314 A | 8/2010 |
| JP | 2011-162692 A | 8/2011 |
| JP | 2012-236954 A | 12/2012 |
| JP | 2013-159765 A | 8/2013 |
| JP | 2013-189596 A | 9/2013 |
| JP | 2014-044341 A | 3/2014 |
| JP | 2014044341 A * | 3/2014 ......... C09B 23/0008 |
| JP | 2016-194007 A | 11/2016 |
| JP | 2017-002161 A | 1/2017 |
| JP | 2017-155092 A | 9/2017 |
| WO | 2016/186050 A1 | 11/2016 |
| WO | 2017/056760 A1 | 4/2017 |
| WO | 2018/034347 A1 | 2/2018 |

OTHER PUBLICATIONS

Written Opinion of the ISA issued in International Application No. PCT/JP2019/006627 dated May 7, 2019.

Extended European Search Report dated Mar. 18, 2021, issued in corresponding EP Patent Application No. 19757490.8.

English language translation of the following: Office action dated Sep. 7, 2021 from the JPO in a Japanese patent application No. 2020-501046 corresponding to the instant patent application. This office action translation is submitted now in order to supplement the understanding of the cited references which are being disclosed in the instant Information Disclosure Statement.

English language translation of the following: Office action dated Mar. 3, 2022 from the SIPO in a Chinese patent application No. 201980013152.6 corresponding to the instant patent application. This office action translation is submitted now in order to supplement the understanding of the cited references which are being disclosed in the instant Information Disclosure Statement.

* cited by examiner

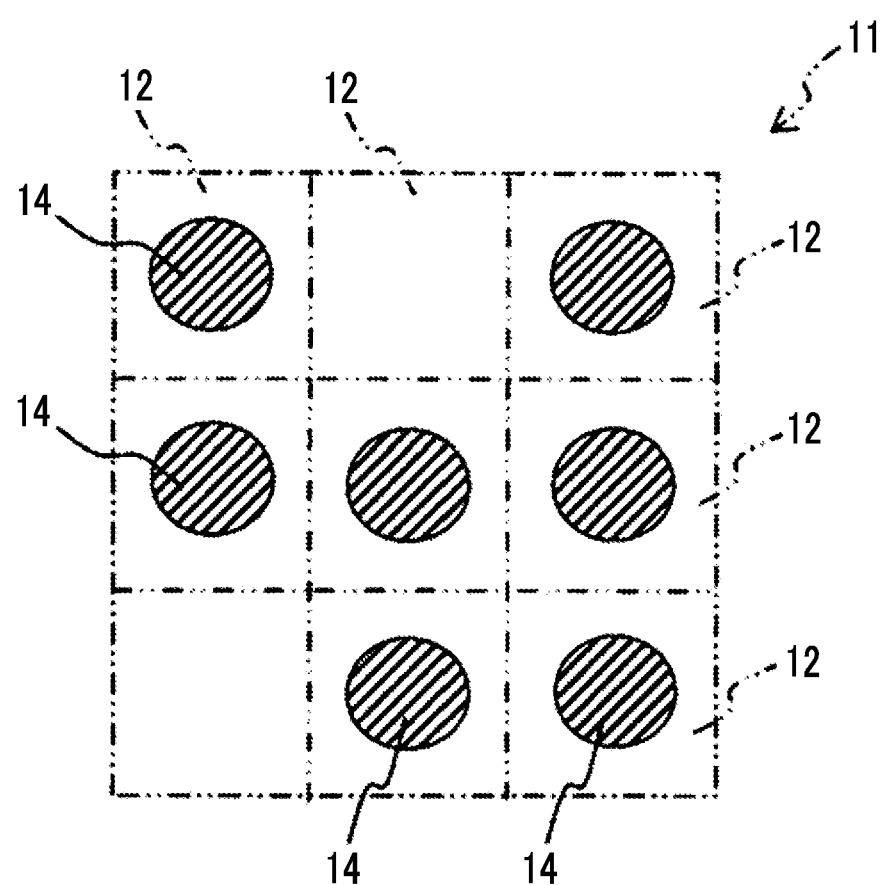

INK COMPOSITION FOR INK JET PRINTING, IMAGE FORMING METHOD, AND RECORDED MATERIAL

CROSS-REFERENCE TO RELATED APPLICATIONS

This application is a continuation application of International Application No. PCT/JP2019/006627, filed Feb. 21, 2019, which was published under PCT Article 21(2) in Japanese, and which claims priority from Japanese Patent Application No. 2018-029131, filed Feb. 21, 2018. The above applications are hereby expressly incorporated by reference, in their entireties, into the present specification.

BACKGROUND OF THE INVENTION

1. Field of the Invention

The present disclosure relates to an ink composition for ink jet printing, an image forming method, and a recorded material.

2. Description of the Related Art

In general, as a unit that optically reads information written on a certificate such as a stock certificate, a bond certificate, a check, a gift certificate, a lottery, or a commutation ticket, a code pattern that is readable using a bar code or an optical character reader (OCR) is provided in many cases. In addition, as a code pattern using optical reading, a bar code is widely used mainly in a physical distribution management system or the like. Further, recently, a two-dimensional code capable of a larger volume of data storage and high-density printing, for example, Data Code, Veri Code, Code 1, Maxi Code, or a two-dimensional bar code (QR code (registered trade name)) has been spread. In addition, a method using a dot pattern is also known.

As the above-described code pattern, a visible code pattern is general, which imposes various restrictions on a printed material, the restrictions including a restriction in designing a printed material and a restriction in securing a printing area. Therefore, a demand for excluding the visible code pattern has increased. Further, in order to prevent forgery of a certificate, it has been attempted to make a code pattern transparent by printing an ink not having an absorption band in a visible range. Making a code pattern transparent has advantageous effects in that a printed material can be freely designed, a printing area for printing a code pattern is not necessarily secured, and it is difficult to determine and identify a code pattern by visual inspection.

As an attempt to make a code pattern transparent (invisible), a technique of forming an infrared absorbing image using an ink that mainly absorbs infrared light outside a visible range is known (refer to JP2008-144004A).

As the ink used for forming the infrared absorbing image, an ink described in JP2013-189596A or WO2017/056760A is known.

JP2008-144004A describes an ink jet recording ink including a colorant represented by the following Formula (I).

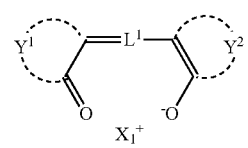

Formula (I)

In the formula, $Y^1$ and $Y^2$ each independently represent a non-metal atomic group which forms an aliphatic ring or a heterocycle, $L^1$ represents a methine chain consisting of 5 or 7 methine groups, and $X_1^+$ represents an alkali earth metal atom, a transition metal atom, or other polyvalent metal atoms.

JP2013-189596A describes an ink for aqueous ink jet recording including at least a coloring material, water, a water-soluble organic solvent, and a near infrared absorber having a maximum absorption wavelength in 800 to 1200 nm, in which the near infrared absorber is absorbed to or included in resin particles to be dispersed in the state of near infrared absorber-containing resin particles.

WO2017/056760A describes an ink set for forming an infrared absorbing pattern, the ink set including: an ink for forming an infrared absorbing pattern that includes an infrared absorber having a cyanine skeleton, a solvent having a boiling point of 200° C. or higher and a SP value of 18 $MPa^{1/2}$ to 26 $MPa^{1/2}$, and water; and a treatment liquid that includes a cationic polymer, a compound represented by Formula (1), and water.

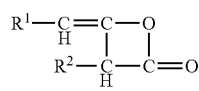

(1)

In Formula (1), $R^1$ and $R^2$ each independently represent an alkyl group having 10 to 14 carbon atoms.

SUMMARY OF THE INVENTION

In a case where an infrared absorbing image is formed and the obtained infrared absorbing image is irradiated with and exposed to light of a fluorescent lamp or the like, the reflectivity of the infrared absorbing image may decrease.

In the present disclosure, the suppression of a decrease in the reflectivity of the infrared absorbing image under illumination of light will also be referred to as "the light fastness of the infrared absorbing image being excellent".

Further improvement of light fastness is required for the infrared absorbing image obtained using the ink described in JP2013-189596A or WO2017/056760A.

In order to improve the light fastness, JP2008-144004A describes that an oxonol colorant having high infrared absorption capacity is described as an infrared absorbing colorant. However, even in a case where the oxonol colorant is used, further improvement is required from the viewpoints of rub resistance, infrared absorption capacity, and ink jet suitability.

An object of one embodiment of the present disclosure is to provide an ink composition for ink jet printing with which an infrared absorbing image having excellent rub resistance, light fastness, and jettability can be obtained, or to provide an image forming method and a recorded material using the ink composition for ink jet printing.

Configurations for achieving the objects include the following aspects.

<1> An ink composition for ink jet printing comprising:
a colorant represented by the following Formula 1;
resin particles;
a water-soluble organic solvent; and
water,

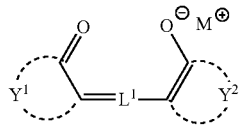

Formula 1 in Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain consisting of 5 or 7 methine groups, and a methine group at a center of the methine chain has a substituent represented by the following Formula A,

Formula A in Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, a cycloalkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and

* represents a binding site to the methine group at the center of the methine chain.

<2> The ink composition for ink jet printing according to <1>, wherein a volume average particle size of the resin particles is 125 nm or less.

<3> The ink composition for ink jet printing according to <1> or <2>, in which a content of the resin particles is 2 mass % to 12 mass % with respect to a total mass of the ink composition for ink jet printing.

<4> The ink composition for ink jet printing according to anyone of <1> to <3>, in which the resin particles include at least one kind of resin particles selected from the group consisting of acrylic resin particles, urethane resin particles, polyethylene resin particles, and styrene-acrylic resin particles.

<5> The ink composition for ink jet printing according to anyone of <1> to <4>,
in which the water-soluble organic solvent includes at least one selected from the group consisting of propylene glycol, dipropylene glycol, ethylene glycol, diethylene glycol, glycerin, trimethylolpropane, 2-pyrrolidone, 1,5-pentanediol, triethylene glycol, polyethylene glycol, and polyoxypropylene glyceryl ether, and a total content of the at least one water-soluble organic solvent selected from the group and another water-soluble organic solvent is 5 mass % to 35 mass % with respect to a total mass of the ink composition for ink jet printing.

<6> The ink composition for ink jet printing according to anyone of <1> to <5>,
in which the colorant represented by Formula 1 is a colorant represented by the following Formula 3,

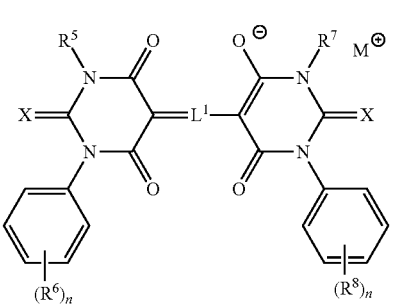

Formula 3 in Formula 3, $M^+$ represents a proton or a monovalent alkali metal cation or organic cation, $L^1$ represents a methine chain consisting of 5 or 7 methine groups, and a methine group at a center of the methine chain has a substituent represented by the following Formula A,

Formula A in Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more,

* represents a binding site to the methine group at the center of the methine chain, $R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, —OR$^{L3}$, —C(=O)R$^{L3}$, —C(=O)OR$^{L3}$, —OC(=O)R$^{L3}$, —N(R$^{L3}$)$_2$, —NHC(=O)R$^{L3}$, —C(=O)N(R$^{L3}$)$_2$, —NHC(=O)OR$^{L3}$, —OC(=O)N(R$^{L3}$)$_2$, —NHC(=O)N(R$^{L3}$)$_2$, —SR$^{L3}$, —S(=O)$_2$R$^{L3}$, —S(=O)$_2$OR$^{L3}$, —NHS(=O)$_2$R$^{L3}$, or —S(=O)$_2$N(R$^{L3}$)$_2$, $R^{L3}$'s each independently represent a hydrogen atom, an alkyl group, an alkenyl group, an aryl group, or a monovalent heterocyclic group, n's each independently represent an integer of 1 to 5, and X's each independently represent an O atom, a S atom, or a Se atom.

<7> The ink composition for ink jet printing according to <6>, in which in Formula 3, at least one selected from the group consisting of $R^5$, $R^6$, $R^7$, and $R^8$ has a hydrogen-bonding group.

<8> The ink composition for ink jet printing according to anyone of <1> to <7>, in which a maximum absorption wavelength of a dry material is present in a wavelength range of 700 nm to 1000 nm.

<9> The ink composition for ink jet printing according to anyone of <1> to <8>, in which a reflectivity R1 of a dry material at a wavelength of 600 nm and a reflectivity R2 of the dry material at an absorption maximum in a wavelength range of 800 nm to 1000 nm satisfy the following Expression R, $$2<R1/R2 \qquad \text{Expression R.}$$

<10> The ink composition for ink jet printing according to any one of <1> to <9>, which is an ink composition for forming an image that is readable using infrared light.

<11> The ink composition for ink jet printing according to anyone of <1> to <10>, in which a content of at least one of a divalent alkali earth metal element or a trivalent group 13 metal element is 10 ppm to 50,000 ppm with respect to a total mass of the ink.

<12> An image forming method comprising:

a step of forming an infrared absorbing image by applying the ink composition for ink jet printing according to any one of <1> to <11> to a substrate.

<13> The image forming method according to <12>, further comprising: a step of heating the formed infrared absorbing image after the step of forming the infrared absorbing image.

<14> The image forming method according to <12> or <13>, further comprising: a step of applying a treatment liquid including an aggregating agent to the substrate before the step of forming the infrared absorbing image.

<15> A recorded material comprising:

a substrate; and an infrared absorbing image that is a dry material of the ink composition for ink jet printing according to any one of <1> to <11>.

According to an embodiment of the present disclosure, there are provided an ink composition for ink jet printing with which an infrared absorbing image having excellent rub resistance, light fastness, and infrared absorption capacity can be obtained, or an image forming method and a recorded material using the ink composition for ink jet printing.

BRIEF DESCRIPTION OF THE DRAWINGS

FIG. 1 is a schematic diagram showing a pattern image formed in Examples.

DESCRIPTION OF THE PREFERRED EMBODIMENTS

Hereinafter, the details of the present disclosure will be described.

The following description regarding components has been made based on a representative embodiment of the present disclosure. However, the present disclosure is not limited to the embodiment.

In the present disclosure, numerical ranges represented by "to" include numerical values before and after "to" as lower limit values and upper limit values. Regarding numerical ranges that are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, unless specified as a substituted group or as an unsubstituted group, a group (atomic group) denotes not only a group having no substituent but also a group having a substituent. For example, "alkyl group" denotes not only an alkyl group having no substituent (unsubstituted alkyl group) but also an alkyl group having a substituent (substituted alkyl group).

In addition, in this specification, a chemical structural formula may also be shown as a simple structural formula in which a hydrogen atom is not shown.

In addition, in the present disclosure, in a case where a plurality of materials corresponding to each of components in a composition are present, the amount of the component in the composition represents the total amount of the plurality of materials present in the composition unless specified otherwise.

In the present disclosure, "(meth)acrylate" represents acrylate or methacrylate, "(meth)acryl" represents acryl and methacryl, and "(meth)acryloyl" represents acryloyl and methacryloyl.

In addition, in the present disclosure, a combination of preferable aspects is a more preferable aspect.

In the present disclosure, the term "step" denotes not only an individual step but also a step which is not clearly distinguishable from another step as long as an effect expected from the step can be achieved.

In addition, in the present disclosure, a combination of two or more preferable aspects is a more preferable aspect.

(Ink Composition for Ink Jet Printing)

An ink composition for ink jet printing according to an embodiment of the present disclosure (hereinafter, also simply referred to as "ink") includes a colorant represented by Formula 1, resin particles, a water-soluble organic solvent, and water.

It is preferable that the ink according to the embodiment of the present disclosure is an ink for forming an image that is readable using infrared light.

Further improvement of light fastness is required for the infrared absorbing image formed using the ink described in JP2013-189596A or WO2017/056760A.

In order to improve the light fastness, JP2008-144004A describes that an oxonol colorant having high infrared absorption capacity is described as an infrared absorbing colorant. However, even in a case where the oxonol colorant is used, further improvement is required from the viewpoints of rub resistance, infrared absorption capacity, and ink jet suitability.

As a result of thorough investigation, the present inventors found that, by using the ink composition for ink jet printing according to the embodiment of the present disclosure, an infrared absorbing image having excellent rub resistance, light fastness, and infrared absorption capacity can be obtained.

The detailed mechanism for obtaining the above-described effect is not clear but is presumed to be as follows.

It is presumed that an oxonol colorant has higher infrared absorbing properties by forming a J-aggregate in an infrared absorbing image. However, in the J-aggregate in the infrared absorbing image, stability in an ink jet printing process may be insufficient depending on ink compositions. For example, it is presumed that the J-aggregate is decomposed through a recorded material preparation process such that the reflectivity of the infrared absorbing image may decrease. In addition, in a case where the aggregating properties of dots are insufficient during ink jet printing, a desired image quality may not be obtained.

However, in the ink composition for ink jet printing according to the embodiment of the present disclosure, by using the specific oxonol colorant and, the resin particles, and the water-soluble organic solvent, a J-aggregate can be easily formed in the ink, rub resistance can be improved by a film formed of the resin particles in the infrared absorbing image, and a state where the oxonol colorant is the J-aggregate is stably maintained by the film. Therefore, it is presumed that light fastness is excellent.

Further, with the ink composition for ink jet printing according to the embodiment of the present disclosure, an infrared absorbing image having excellent rub resistance can be easily obtained.

The reason for this is presumed that the film derived from the resin particles is formed by drying or the like during image formation.

In addition, with the ink composition for ink jet printing according to the embodiment of the present disclosure, an infrared absorbing image having an excellent dot shape can be easily obtained.

The reason for this is presumed that, since the ink includes the resin particles, aggregating properties are improved by thickening or the like during the drying of the ink for image formation, and bleeding or the like is suppressed.

Further, with the ink composition for ink jet printing according to the embodiment of the present disclosure, an ink composition for forming an infrared absorbing image having excellent ink stability can be easily obtained.

"Ink stability" simply described in the present disclosure represents that a change in absorption wavelength or a change in particle size caused by ink storage is small.

The reason for this is presumed that, since the ink composition for ink jet printing according to the embodiment of the present disclosure includes the resin particles and the water-soluble organic solvent, the stability of the J-aggregate of the colorant represented by Formula 1 is high such that a change in absorption wavelength or a change in particle size caused by ink storage is small.

Hereinafter, each of the components included in the ink composition for ink jet printing according to the embodiment will be described.

<Resin Particles>

The ink composition for ink jet printing according to the embodiment of the present disclosure includes the resin particles.

The resin particles are not particularly limited as long as they are particles including a resin, and are preferably particles consisting of a resin.

The shape of the resin particles is not particularly limited and may be an unstructured shape, a polyhedral shape, or a hollow shape. From the viewpoint of jettability in an ink jet method, it is preferable that the resin particles have a spherical shape.

[Kind of Resin]

Examples of the resin particles include particles of various resins including: a thermoplastic, thermosetting, or modified resin such as an acrylic resin, an epoxy resin, a polyurethane resin, a polyether resin, a polyamide resin, an unsaturated polyester resin, a phenol resin, a silicone resin, or a fluororesin, a polyvinyl resin such as vinyl chloride, vinyl acetate, polyvinyl alcohol, or polyvinyl butyral; a polyester resin such as an alkyd resin or a phthalic acid resin; an amino material such as a melamine resin, a melamine formaldehyde resin, an amino-alkyd co-condensate resin, or a urea resin; and a resin having an anionic group such as a copolymer or a mixture of the above-described resins. Among the resin particles, the anionic acrylic resin can be obtained, for example, by polymerization of an acrylic monomer having an anionic group (anionic group-containing acrylic monomer) and another optional monomer that is copolymerizable with the anionic group-containing acrylic monomer in a solvent. Examples of the anionic group-containing acrylic monomer include an acrylic monomer having one or more groups selected from the group consisting of a carboxy group, a sulfonate group, and a phosphonate group. In particular, an acrylic monomer having a carboxy group (for example, acrylic acid, methacrylic acid, crotonic acid, etacrylic acid, propylacrylic acid, isopropylacrylic acid, itaconic acid, or fumaric acid) is preferable, and acrylic acid or methacrylic acid is more preferable.

From the viewpoints of rub resistance and a dot shape, it is preferable that the resin particles include particles of an acrylic resin, a vinyl acetate resin, a styrene-butadiene resin, a vinyl chloride resin, a urethane resin, an acryl-styrene resin, a butadiene resin, a styrene resin, a crosslinked acrylic resin, a crosslinked styrene resin, or a polyethylene resin, it is more preferable that the resin particles include at least one kind of resin particles selected from the group consisting of acrylic resin particles, urethane resin particles, polyethylene resin particles, and styrene-acrylic resin particles, and it is still more preferable that the resin particles include acrylic resin particles.

From the viewpoint of the stability (dispersion stability) of jetted ink, it is preferable that the resin particles according to the embodiment of the present disclosure are particles of a self-dispersing resin (self-dispersing resin particles). Here, the self-dispersing resin refers to a water-insoluble polymer that can be dispersed in an aqueous medium due to a functional group (in particular, an acidic group or a salt thereof) in the polymer itself in a case where it is dispersed using a phase-transfer emulsification method in the absence of a surfactant.

Here, the dispersed state refers to both of an emulsified state (emulsion) in which a water-insoluble polymer in a liquid state is dispersed in an aqueous medium and a dispersed state (suspension) in which a water-insoluble polymer in a solid state is dispersed in an aqueous medium.

In addition, the aqueous medium refers to a medium including water. Optionally, the aqueous medium may include a hydrophilic organic solvent. It is preferable that the aqueous medium includes water and 0.2 mass % or lower of the hydrophilic organic solvent with respect to water, and it is more preferable that the aqueous medium consists of only water.

From the viewpoint of an aggregation rate and fixing property in a case where the resin is included in the ink composition, it is preferable that the self-dispersing resin is self-dispersing resin particles that can enter a dispersed state in which the water-insoluble polymer in a solid state is dispersed.

Examples of a method of obtaining the emulsified or dispersed state of the self-dispersing resin, that is, a method of preparing an aqueous dispersion of the self-dispersing resin particle include a phase-transfer emulsification method.

Examples of the phase-transfer emulsification method include a method including: dissolving or dispersing the self-dispersing resin in a solvent (for example, a water-soluble organic solvent); adding the solution to water as it is without adding a surfactant; and stirring and mixing the solution to remove the solvent in a state where a salt-forming group (for example, an acidic group) included in the self-dispersing resin is neutralized such that the aqueous dispersion in the emulsified or dispersed state is obtained.

The stable emulsified or dispersed state of the self-dispersing resin refers to a state where the emulsified or dispersed state is stably present at 25° C. for at least one week (that is, a state where precipitation cannot be verified by visual inspection) even after a solution in which 30 g of a water-insoluble polymer is dissolved in 70 g of an organic solvent (for example, methyl ethyl ketone), a neutralizer (sodium hydroxide in a case where the salt-forming group is an anionic group; acetic acid in a case where the salt-forming group is a cationic group) that can completely neutralize the salt-forming group of the water-insoluble polymer, and 200 g of water are mixed and stirred (device: a stirring device with a stirring blade, a rotation speed of 200 rpm, 30 minutes, 25° C.) and the organic solvent is removed from the mixed solution.

In addition, the stability of the emulsified or dispersed state of the self-dispersing resin can also be verified by a precipitation acceleration test using centrifugal separation. The stability of the precipitation acceleration test using centrifugal separation can be evaluated, for example, by adjusting the aqueous dispersion of the resin particles obtained using the above-described method such that the solid content concentration is 25 mass %, centrifugally separating the aqueous dispersion at 12,000 rpm for 1 hour, and measuring the solid content concentration of the supernatant after the centrifugal separation.

In a case where a ratio of the solid content concentration after the centrifugal separation to the solid content concentration before the centrifugal separation is high (a numerical value similar to 1), precipitation of the resin particles by the centrifugal separation does not occur, that is, the aqueous dispersion of the resin particles is more stable. In the present disclosure, the ratio between the solid content concentrations before and after the centrifugal separation is preferably 0.8 or higher, more preferably 0.9 or higher, and still more preferably 0.95 or higher.

In a case where the self-dispersing resin is in the dispersed state, the content of a water-soluble component is preferably 10 mass % or lower, more preferably 8 mass % or lower, and still more preferably 6 mass % or lower. By adjusting the content of the water-soluble component to be 10 mass % or lower, wetting of the resin particles and fusion welding between the resin particles can be effectively suppressed, and a more stable dispersed state can be maintained. In addition, an increase in the viscosity of the ink composition can be suppressed. For example, in a case where the ink composition is applied using an ink jet method, jetting stability is further improved.

Here, the water-soluble component refers to a compound that is included in the self-dispersing resin and is soluble in water in a case where the self-dispersing resin is in a dispersed state. In a case where the self-dispersing resin is manufactured, the water-soluble component refers to a water-soluble compound that is produced as a byproduct or is incorporated.

A main chain skeleton of the water-insoluble polymer is not particularly limited. For example, a vinyl polymer or a condensation polymer (for example, an epoxy resin, polyester, polyurethane, polyamide, cellulose, polyether, polyurea, polyimide, or polycarbonate) can be used. In particular, a vinyl polymer is preferable.

Preferable examples of the vinyl polymer and a monomer forming the vinyl polymer include examples described in JP2001-181549A and JP2002-088294A. In addition, a vinyl polymer in which a dissociable group is introduced into a terminal of a polymer chain through radical polymerization of a vinyl monomer using a chain transfer agent, a polymerization initiator, or an iniferter having a dissociable group (or a substituent that can be introduced into a dissociable group) or through ionic polymerization using a compound including an initiator or a terminator having a dissociable group (or a substituent that can be introduced into a dissociable group).

In addition, preferable examples of the condensation polymer and a monomer forming the condensation polymer include examples described in JP2001-247787A.

From the viewpoint of dispersion stability, it is preferable that the resin particles according to the embodiment of the present disclosure include a water-insoluble polymer including a hydrophilic constitutional unit and a constitutional unit derived from the aromatic group-containing monomer or a cyclic aliphatic group-containing monomer.

"Hydrophilic constitutional unit" is not particularly limited as long as it is derived from a hydrophilic group-containing monomer, and may be derived from one hydrophilic group-containing monomer or two or more hydrophilic group-containing monomers. The hydrophilic group is not particularly limited and may be a dissociable group or a nonionic hydrophilic group.

From the viewpoint of the stability of the formed emulsified or dispersed state, the hydrophilic group is preferably a dissociable group and more preferably an anionic dissociable group.

That is, it is preferable that the resin particles according to the embodiment of the present disclosure are resin particles having an anionic dissociable group.

Examples of the dissociable group include a carboxy group, a phosphate group, and a sulfonate group. In particular, from the viewpoint of fixing property in a case where the ink composition is formed, a carboxy group is preferable.

From the viewpoint of dispersion stability and aggregating properties, the hydrophilic group-containing monomer is preferably a dissociable group-containing monomer and more preferably a dissociable group-containing monomer having a dissociable group and an ethylenically unsaturated bond.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamido-2-methylpropanesulfonic acid, 3-sulfopropyl (meth)acrylate, and bis-(3-sulfopropyl)-itaconic acid ester.

Specific examples of the unsaturated phosphoric acid monomer include vinylphosphonic acid, vinyl phosphate, bis(methacryloxyethyl)phosphate, diphenyl-2-acryloxyethyl phosphate, diphenyl-2-methacryloyloxyethyl phosphate, and dibutyl-2-acryloxyethylphosphate.

Among the dissociable group-containing monomers, from the viewpoints of dispersion stability and jetting stability, the unsaturated carboxylic acid monomer is preferable, and acrylic acid or methacrylic acid is more preferable.

From the viewpoints of dispersion stability and an aggregation rate during contact with a treatment liquid, it is preferable that the resin particles include a polymer having a carboxy group, and it is more preferable that the resin particles include a polymer having a carboxy group and an acid value of 25 mgKOH/g to 100 mgKOH/g. Further, from the viewpoints of self-dispersing properties and an aggregation rate during contact with a treatment liquid, the acid value is more preferably 25 mgKOH/g to 80 mgKOH/g and still more preferably 30 mgKOH/g to 65 mgKOH/g.

In particular, in a case where the acid value is 25 mgKOH/g or higher, dispersion stability is excellent. In a case where the acid value is 100 mgKOH/g or lower, aggregating properties are improved.

The acid value can be measured using a method described in JIS (JIS K 0070:1992).

The aromatic group-containing monomer is not particularly limited as long as it is a compound having an aromatic group and a polymerizable group. The aromatic group may be a group derived from an aromatic hydrocarbon or a group derived from an aromatic heterocycle. In the present disclosure, from the viewpoint of particle shape stability in an aqueous medium, the aromatic group is preferably an aromatic group derived from an aromatic hydrocarbon.

In addition, the polymerizable group may be a condensation polymerizable group or an addition polymerizable group. In the present disclosure, from the viewpoint of particle shape stability in an aqueous medium, the polymerizable group is preferably an addition polymerizable group and more preferably a group having an ethylenically unsaturated bond.

The aromatic group-containing monomer is preferably a monomer having an aromatic group derived from an aromatic hydrocarbon and an ethylenically unsaturated bond. As the aromatic group-containing monomer, one kind may be used alone, or two or more kinds may be used in combination.

Examples of the aromatic group-containing monomer include phenoxyethyl (meth)acrylate, benzyl (meth)acrylate, phenyl (meth)acrylate, and a styrene monomer. In particular, from the viewpoints of a balance between hydrophilicity and hydrophobicity of a polymer chain and ink fixing property, an aromatic group-containing (meth)acrylate monomer is preferable, at least one selected from phenoxyethyl (meth)acrylate, benzyl (meth)acrylate), or phenyl (meth)acrylate is more preferable, and phenoxyethyl (meth)acrylate or benzyl (meth)acrylate is still more preferable.

"(meth)acrylate" refers to acrylate or methacrylate.

The cyclic aliphatic group-containing monomer is preferably a monomer having a cyclic aliphatic group derived from a cyclic aliphatic hydrocarbon and an ethylenically unsaturated bond and more preferably an cyclic aliphatic group-containing (meth)acrylate monomer (hereinafter, also referred to as "alicyclic (meth)acrylate").

The alicyclic (meth)acrylate includes a constituent portion derived from (meth)acrylic acid and a constituent portion derived from an alcohol, in which a structure including at least one unsubstituted or substituted alicyclic hydrocarbon group (cyclic aliphatic group) is provided in the constituent portion derived from an alcohol. The alicyclic hydrocarbon group may be the constituent portion derived from an alcohol or may be bonded to the constituent portion derived from an alcohol through a linking group.

The alicyclic hydrocarbon group is not particularly limited as long as it includes a cyclic nonaromatic hydrocarbon group, and examples thereof include a monocyclic hydrocarbon group, a bicyclic hydrocarbon group, and a tricyclic or higher polycyclic hydrocarbon group. Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo$[5.2.1.0^{2,6}]$decanyl group, and bicyclo[4.3.0]nonane.

The alicyclic hydrocarbon group may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkyl or arylcarbonyl group, and a cyano group. In addition, the alicyclic hydrocarbon group may further form a fused ring. As the alicyclic hydrocarbon group in the present disclosure, the number of carbon atoms in the alicyclic hydrocarbon group portion is preferably 5 to 20 from the viewpoints of viscosity and solubility.

Specific examples of the alicyclic (meth)acrylate will be shown below. However, the alicyclic (meth)acrylate in the present disclosure is not limited to these examples.

Examples of the monocyclic (meth)acrylate include a cycloalkyl (meth)acrylate with a cycloalkyl group having 3 to 10 carbon atoms such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of the bicyclic (meth)acrylate include isobornyl (meth)acrylate and norbornyl (meth)acrylate.

Examples of the tricyclic or higher (meth)acrylate include adamantyl (meth)acrylate, dicyclopentanyl (meth)acrylate, and dicyclopentenyloxyethyl (meth)acrylate.

As each of the (meth)acrylates, one kind may be used alone, or a mixture of two or more kinds may be used.

Among these, from the viewpoints of dispersion stability of the resin particles, fixing property, and blocking resistance, it is preferable that at least one selected from a bicyclic (meth)acrylate or a tricyclic or higher polycyclic (meth)acrylate is used, and it is more preferable that at least one selected from isobornyl (meth)acrylate, adamantyl (meth)acrylate, or dicyclopentanyl (meth)acrylate is used.

As the resin used for forming the resin particles, an acrylic resin including a constitutional unit derived from the (meth)acrylate monomer is preferable, and an acrylic resin including a constitutional unit derived from the aromatic group-containing (meth)acrylate monomer or an alicyclic (meth)acrylate is more preferable. Further, it is preferable that the acrylic resin includes a constitutional unit derived from the aromatic group-containing (meth)acrylate monomer or an alicyclic (meth)acrylate, in which the content of the constitutional unit is 10 mass % to 95 mass %. In a case where the content of the aromatic group-containing (meth)acrylate monomer or the alicyclic (meth)acrylate is 10 mass % to 95 mass %, the stability of the emulsified state or the dispersed state is improved, and an increase in ink viscosity can be suppressed.

From the viewpoints of the stability of the dispersed state, the stabilization of particles in an aqueous medium by a hydrophobic interaction between aromatic rings or between alicyclic rings, and a decrease in the content of a water-soluble component by appropriate hydrophobicization of particles, the content of the aromatic group-containing (meth)acrylate monomer or the alicyclic (meth)acrylate is more preferably 15 mass % to 90 mass %, still more preferably 15 mass % to 80 mass %, and still more preferably 25 mass % to 70 mass %.

The resin used for forming the resin particles can be formed, for example, using a constitutional unit derived from the aromatic group-containing monomer or a cyclic aliphatic group-containing monomer and a constitutional unit derived from the dissociable group-containing monomer. Further, optionally, the resin may further include another constitutional unit.

As a monomer for forming the other constitutional unit is not particularly limited as long as it is a monomer that is copolymerizable with the aromatic group-containing monomer and the dissociable group-containing monomer. In particular, from the viewpoints of the flexibility of a polymer skeleton and easy control of glass transition temperature (Tg), it is preferable that the other constitutional unit is an alkyl group-containing monomer.

Examples of the alkyl group-containing monomer include a (meth)acrylamide including: an alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; a dialkylaminoalkyl (meth)acrylate such as dimethylaminoethyl (meth)acrylate; an N-hydroxyalkyl (meth)acrylamide such as N-hydroxymethyl (meth)acrylamide, N-hydroxyethyl (meth)acrylamide, or N-hydroxybutyl (meth)acrylamide; and an N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide, or N-(n-,iso)butoxyethyl (meth)acrylamide.

From the viewpoint of controlling hydrophilicity or hydrophobicity of the polymer, in the water-insoluble polymer forming the resin particles, the content of the constitutional unit derived from the aromatic group-containing (meth)acrylate monomer (preferably a constitutional unit derived from phenoxyethyl (meth)acrylate and/or a constitutional unit derived from benzyl (meth)acrylate) or the cyclic aliphatic group-containing monomer (preferably the alicyclic (meth)acrylate) is preferably 15 mass % to 80 mass % with respect to the total mass of the resin particles as a copolymerization ratio.

In addition, from the viewpoint of controlling hydrophilicity or hydrophobicity of the polymer, it is preferable that the water-insoluble polymer includes 15 mass % to 80 mass % (copolymerization ratio) of a constitutional unit derived from the aromatic group-containing (meth)acrylate monomer or the alicyclic (meth)acrylate monomer, a constitutional unit derived from a carboxy group-containing monomer, and a constitutional unit derived from the alkyl group-containing monomer (preferably a constitutional unit derived from an alkyl ester of (meth)acrylic acid), and it is more preferable that the water-insoluble polymer includes 15 mass % to 80 mass % (copolymerization ratio) of a constitutional unit derived from phenoxyethyl (meth)acrylate and/or a constitutional unit derived from benzyl (meth)acrylate), a constitutional unit derived from a carboxy group-containing monomer, and a constitutional unit derived from the alkyl group-containing monomer (preferably a constitutional unit derived from an alkyl ester having 1 to 4 carbon atoms of (meth)acrylic acid).

In addition, in the water-insoluble polymer, it is preferable that the acid value is 25 mgKOH/g to 100 mgKOH/g and the weight-average molecular weight is 3,000 to 200,000, and it is more preferable that the acid value is 25 mgKOH/g to 95 mgKOH/g and the weight-average molecular weight is 5,000 to 150,000. The acid value and the weight-average molecular weight can be measured using the above-described method.

Hereinafter, specific examples of the water-insoluble polymer forming the resin particles include exemplary compounds B-01 to B-23, but the water-insoluble polymer according to the embodiment of the present disclosure is not limited thereto. Numerical values in parentheses represent a mass ratio between copolymerization components.

B-01: a phenoxyethyl acrylate/methyl methacrylate/acrylic acid copolymer (50/45/5)

B-02: a phenoxyethyl acrylate/benzyl methacrylate/isobutyl methacrylate/methacrylic acid copolymer (30/35/29/6)

B-03: a phenoxyethyl methacrylate/isobutyl methacrylate/methacrylic acid copolymer (50/44/6)

B-04: a phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: a styrene/phenoxyethyl acrylate/methyl methacrylate/acrylic acid copolymer (10/50/35/5)

B-07: a benzyl acrylate/methyl methacrylate/acrylic acid copolymer (55/40/5)

B-08: a phenoxyethyl methacrylate/benzyl acrylate/methacrylic acid copolymer (45/47/8)

B-09: a styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: a phenoxyethyl acrylate/methyl methacrylate/butyl acrylate/methacrylic acid copolymer (12/50/30/8)

B-12: a benzyl acrylate/isobutyl methacrylate/acrylic acid copolymer (93/2/5)

B-13: a styrene/phenoxyethyl methacrylate/butyl acrylate/acrylic acid copolymer (50/5/20/25)

B-14: a styrene/butyl acrylate/acrylic acid copolymer (62/35/3)

B-15: a methyl methacrylate/phenoxyethyl acrylate/acrylic acid copolymer (45/51/4)

B-16: a methyl methacrylate/phenoxyethyl acrylate/acrylic acid copolymer (45/49/6)

B-17: a methyl methacrylate/phenoxyethyl acrylate/acrylic acid copolymer (45/48/7)

B-18: a methyl methacrylate/phenoxyethyl acrylate/acrylic acid copolymer (45/47/8)

B-19: a methyl methacrylate/phenoxyethyl acrylate/acrylic acid copolymer (45/45/10)

B-20: a methyl methacrylate/isobornyl methacrylate/methacrylic acid copolymer (20/72/8)

B-21: a methyl methacrylate/isobornyl methacrylate/methacrylic acid copolymer (40/52/8)

B-22: a methyl methacrylate/isobornyl methacrylate/dicyclopentanyl methacrylate/methacrylic acid copolymer (20/62/10/8)

B-23: a methyl methacrylate/dicyclopentanyl methacrylate/methacrylic acid copolymer (20/72/8)

A method of manufacturing the water-insoluble polymer included in the resin particles is not particularly limited, and examples thereof include a method of forming a covalent bond of a polymerizable surfactant and the water-insoluble polymer by emulsion polymerization in the presence of the surfactant, and a method of copolymerizing a monomer mixture including the above-described hydrophilic group-containing monomer and the aromatic group-containing monomer or an alicyclic group-containing monomer using a well-known polymerization method such as a solution polymerization method or a bulk polymerization method. Among these polymerization methods, from the viewpoint of an aggregation rate and jetting stability in the case of an ink composition, a solution polymerization method is preferable, and a solution polymerization method using an organic solvent is more preferable.

From the viewpoint of an aggregation rate, it is preferable that the resin particles include a polymer synthesized in an organic solvent and that the polymer is prepared as a polymer dispersion having anionic group (carboxy group) (preferably having an acid value of 20 mgKOH/g to 100 mgKOH/g) in which a part or all of the anionic groups (carboxy groups) of the polymer are neutralized such that water is a continuous phase.

That is, it is preferable that the resin particles are manufactured using a method including: a step of synthesizing a polymer in an organic solvent; and a dispersing step of neutralizing at least a part of anionic groups (carboxy groups) of the polymer to obtain an aqueous dispersion.

It is preferable that the dispersing step includes a step (1) and a step (2) described below.

Step (1): a step of stirring a mixture including a polymer (water-insoluble polymer), an organic solvent, a neutralizer, and an aqueous medium Step (2): a step of removing the organic solvent from the mixture It is preferable that the step (1) is a process of obtaining a dispersion by dissolving the polymer (water-insoluble polymer) in the organic solvent, gradually adding the neutralizer and the aqueous medium, and mixing and stirring the solution. This way, by adding the neutralizer and the aqueous medium to the water-insoluble polymer solution in which the polymer is dissolved in the organic solvent, resin particles having a particle size for obtaining higher storage stability can be obtained without requiring a strong shear force.

A method of stirring the mixture is not particularly limited. For example, a generally used mixing and stirring device can be used, and optionally a disperser such as an ultrasonic disperser or a high-pressure homogenizer can be used.

In addition, in the step (2), the aqueous dispersion of the resin particles can be obtained by distilling off the organic solvent from the dispersion obtained in the Step (1) using an ordinary method such as distillation under reduced pressure for phase transfer to water. The organic solvent in the obtained aqueous dispersion is substantially removed, and the amount of the organic solvent is preferably 0.2 mass % or lower and more preferably 0.1 mass % or lower.

Preferable examples of the organic solvent include an alcohol solvent, a ketone solvent, and an ether solvent. As the organic solvent, an organic solvent described in paragraph "0059" of JP2010-188661A can be used.

As the neutralizer, a neutralizer described in paragraphs "0060" and "0061" of JP2010-188661A can be used.

[Volume Average Particle Size]

From the viewpoint of improving ink jettability, the volume average particle size of the resin particles is preferably 1 m or less, more preferably 125 nm or less, and still more preferably 100 nm or less.

In addition, from the viewpoint of ink stability, the volume average particle size of the resin particles is preferably 5 nm or more and more preferably 10 nm or more.

The volume average particle size and the particle size distribution of the resin particles can be measured with a dynamic light scattering method using a Nanotrac particle size distribution measuring apparatus. As the Nanotrac particle size distribution measuring apparatus, UPA-EX150 (manufactured by Nikkiso Co., Ltd.) can be used.

In addition, the particle size distribution of the resin particles is not particularly limited, and the resin particles may have a wide particle size distribution or a monodispersed particle size distribution. In addition, a mixture of two or more kinds of resin particles may be used.

[Weight-Average Molecular Weight]

The weight-average molecular weight of the resin of the resin particles is preferably 5,000 or higher and more preferably 10,000 or higher.

In addition, the weight-average molecular weight of the resin of the resin particles is preferably 300,000 or lower and more preferably 100,000 or lower.

In the present disclosure, the number-average molecular weight and the weight-average molecular weight are values measured by gel permeation chromatography (GPC).

Specifically, in the GPC, HLC-8220GPC (manufactured by Tosoh Corporation) is used as a measuring device, three pieces of TSKgel Super Multipore HZ-H (4.6 mm ID×15 cm, manufactured by Tosoh Corporation) are used as columns, and tetrahydrofuran (THF) is used as an eluent. In addition, the measurement can be used using a differential refractive index (RI) detector under measurement conditions of sample concentration: 0.45 mass %, flow rate: 0.35 ml/min, sample injection volume: 10 μl, and measurement temperature: 40° C. A calibration curve is obtained from 8 samples of "Standard sample, TSK standard, polystyrene": "F-40", "F-20", "F-4", "F-1", "A-5000", "A-2500", "A-1000", and "n-propylbenzene" (manufactured by Tosoh Corporation).

[Glass Transition Temperature]

From the viewpoint of rub resistance and ink stability, the glass transition temperature (Tg) of the resin of the resin particles is preferably 30° C. to 230° C. and more preferably 70° C. to 230° C.

Tg is a value measured using a differential scanning calorimeter (DSC) EXSTAR 6220 (manufactured by SII Nanotechnology Inc.) under typical measurement conditions. However, in a case where the measurement is difficult due to the decomposition of a resin or the like, Tg calculated from the following calculation expression is applied. The Tg is calculated from the following Expression (1).

$$1/Tg = \Sigma(Xi/Tgi) \qquad (1)$$

Here, it is assumed that a polymer to be calculated is obtained by copolymerization of n types monomer components (i=1 to n). Xi represents a mass fraction ($\Sigma Xi=1$) of an i-th monomer, and Tgi represents a glass transition temperature (absolute temperature) of a homopolymer of the i-th monomer. In this case, E represents the sum of i=1 to n. As the value of the glass transition temperature of the homopolymer of each of the monomer, a value described in Polymer Handbook (3rd Edition) (J. Brandrup, E. H. Immergut, (Wiley-Interscience, 1989)) is adopted.

[Content]

The ink composition for ink jet printing according to the embodiment of the present disclosure may include one kind of resin particles or may include a combination of two or more kinds of resin particles.

From the viewpoint of improving rub resistance, ink stability, and ink jettability, the total content of the resin particles is preferably 1 mass % to 20 mass %, more preferably 2 mass % to 12 mass %, and still more preferably 3 mass % to 10 mass % with respect to the total mass of the ink composition for ink jet printing according to the embodiment of the present disclosure.

In addition, from the viewpoint of improving light fastness, the content of the resin particles is preferably 60 mass % to 96 mass % with respect to the total content of the colorant represented by Formula 1 and the resin particles.

<Colorant Represented by Formula 1>

The ink composition for ink jet printing according to the embodiment of the present disclosure includes the colorant represented by the following Formula 1.

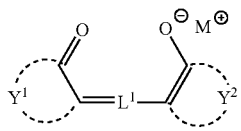

Formula 1

In Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain consisting of 5 or 7 methine groups, and a methine group at a center of the methine chain has a substituent represented by the following Formula A.

$$*-S^A-T^A$$ Formula A

In Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

[$Y^1$ and $Y^2$]

$Y^1$ and $Y^2$ may represent the same non-metal atomic group or different non-metal atomic groups. From the viewpoint of synthesis suitability, it is preferable that $Y^1$ and $Y^2$ represent the same non-metal atomic group.

Examples of the aliphatic ring which is formed by $Y^1$ and $Y^2$ include an aliphatic ring having 5 to 10 carbon atoms. The aliphatic ring may have a substituent and may form a fused ring with an aliphatic ring, an aromatic ring, or another heterocycle.

Examples of the aliphatic ring which is formed by $Y^1$ and $Y^2$ include a 1,3-indandione ring, a 1,3-benzoindandione ring, and 2,3-dihydro-1H-phenalene-1,3-dione.

Examples of the heterocycle which is formed by $Y^1$ and $Y^2$ include a heterocycle which is a 5-membered ring or a 6-membered ring. Examples of a heteroatom included in the heterocycle include a nitrogen atom (N atom), an oxygen atom (O atom), and a sulfur atom (S atom). Among these, a N atom is preferable. The aliphatic ring may have a substituent and may form a fused ring with an aliphatic ring, an aromatic ring, or another heterocycle.

In Formula 1, $Y^1$ and $Y^2$ each independently represent preferably a non-metal atomic group which forms a heterocycle and more preferably a non-metal atomic group which forms the same heterocycle.

Examples of the heterocycle which is formed by $Y^1$ and $Y^2$ include a 5-pyrazolone ring, an isoxazolone ring, a barbituric acid ring, a pyridone ring, a rhodanine ring, a pyrazolidinedione ring, a pyrazolopyridone ring, and a Meldrum's acid ring. From the viewpoint of invisibility, a barbituric acid ring is preferable.

[$M^+$]

$M^+$ represents a proton or a monovalent alkali metal cation or organic cation. From the viewpoint of improving the light fastness and moist heat resistance of the obtained infrared absorbing image, it is preferable that $M^+$ represents a monovalent alkali metal cation.

Examples of the monovalent alkali metal cation are not particularly limited and include a lithium ion (Li$^+$), a sodium ion (Na$^+$), a potassium ion (K$^+$), a rubidium ion (Rb$^+$), a cesium ion (Cs$^+$), and a francium ion (Fr$^+$). Among these, Li$^+$, Na$^+$, K$^+$, Rb$^+$, or Cs$^+$ is preferable, Li$^+$, Na$^+$, K$^+$, Rb$^+$, or Cs$^+$ is more preferable, and Li$^+$, Na$^+$, or K$^+$ is still more preferable.

The organic cation may be a monovalent organic cation or a polyvalent organic cation and is preferably a monovalent organic cation.

Examples of the organic cation include a tetraalkylammonium ion, a trialkylammonium ion, a pyridinium ion, a N-methylpyridinium ion, and a N-ethylpyridinium ion. Among these, a trialkylammonium ion is preferable, and a triethylammonium ion is more preferable.

In addition, from the viewpoint of dispersion easiness, a polyvalent organic cation can be used as the organic cation. Examples of the polyvalent organic cation include N,N,N', N'-tetramethylethylenediammonium and Cation Master PD-7 (manufactured by Yokkaichi Chemical Co., Ltd.).

$M^+$ represents a counter cation, and the compound represented by Formula 1 is electrically neutral as a whole due to the presence of $M^+$.

[$L^1$]

$L^1$ represents a methine chain consisting of 5 or 7 methine groups, and a methine group at a center of the methine chain has a substituent represented by the following Formula A.

$L^1$ represents a methine chain consisting of 5 or 7 methine groups, and preferably a methine chain consisting of 5 methine groups.

A methine group other than the methine group at the center of the methine chain may be substituted but is preferably unsubstituted.

The methine chain may have a crosslinked structure at any position. For example, opposite carbon atoms adjacent to the methine group may be crosslinked to form a ring structure. By introducing a ring structure, the absorption wavelength of the colorant, the light fastness of a near infrared absorbing image obtained using the dispersion according to the embodiment of the present disclosure, and the like can be controlled. Therefore, the ring structure may be appropriately determined depending on the intended use of the dispersion. The ring structure is not particularly limited and is preferably an aliphatic ring and more preferably a 5-membered aliphatic ring or a 6-membered aliphatic ring.

Specifically, $L^1$ represents preferably a group represented by the following Formula L1-1, L1-2, L2-1, or L2-2 and more preferably a group represented by the following Formula L1-1 or L1-2.

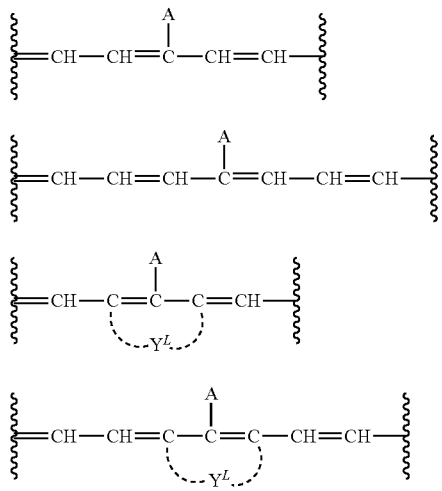

In Formulae L1-1, L1-2, L2-1, and L2-2, A represents a substituent represented by Formula A, and wave line portions each independently represent a binding site to a structure other than $L^1$ in Formula 1.

$Y^L$ represents a non-metal atomic group which forms an aliphatic ring or a heterocycle and preferably a non-metal atomic group which forms an aliphatic ring. As $Y^L$, an alkyl group is preferable. Examples of the alkyl group include —CH$_2$CH$_2$— and —CH$_2$C(Z)—CH$_2$—. As the aliphatic ring, a 5-membered aliphatic hydrocarbon ring or a 6-membered aliphatic hydrocarbon ring is preferable.

As the group represented by Formula L2-1 or L2-2, a group represented by any one of the following Formulae L3-1 to L3-4 is preferable.

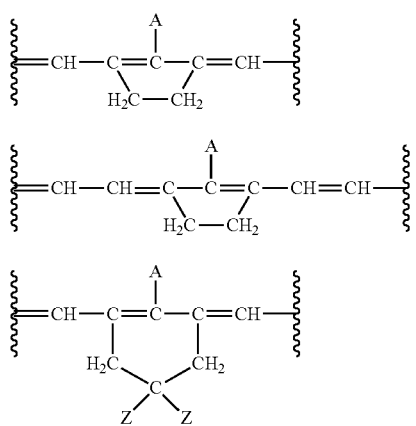

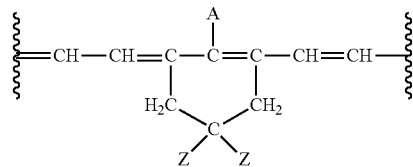

In Formulae L3-1 to L3-4, A represents a substituent represented by Formula A, and wave line portions each independently represent a binding site to a structure other than $L^1$ in Formula 1.

Z represents a hydrogen atom or an alkyl group, preferably a hydrogen atom or an alkyl group having 1 to 8 carbon atoms, and more preferably a hydrogen atom or a methyl group. Two Z's may be bonded to each other to form a ring structure.

—Substituent Represented by Formula A—

In Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination of at least two thereof. Among these, from the viewpoint of improving the invisibility of the obtained infrared absorbing image, a single bond, an alkylene group, an alkenylene group, or an alkynylene group is preferable, and a single bond is more preferable.

As the alkylene group, an alkylene group having 1 to 10 carbon atoms is preferable, an alkylene group having 1 to 4 carbon atoms is more preferable, and a methylene group or an ethylene group is still more preferable.

As the alkenylene group, an alkenylene group having 2 to 10 carbon atoms is preferable, an alkenylene group having 2 to 4 carbon atoms is more preferable, and an alkenylene group having 2 or 3 carbon atoms is still more preferable.

As the alkynylene group, an alkynylene group having 2 to 10 carbon atoms is preferable, an alkynylene group having 2 to 4 carbon atoms is more preferable, and an alkynylene group having 2 or 3 carbon atoms is still more preferable.

The alkylene group, the alkenylene group, and the alkynylene group may be linear or branched, and some or all of the carbon atoms included in each of the groups may form a cyclic structure. Unless specified otherwise, the above-described contents shall be applied to the description of the alkylene group, the alkenylene group, and the alkynylene group in the present disclosure.

In —C(=O)O—, the carbon atom is on the side of binding to $L^1$ and the oxygen atom may be on the side of binding to $T^A$ or vice versa.

In —C(=O)NR$^{L1}$—, the carbon atom is on the side of binding to $L^1$ and the nitrogen atom may be on the side of binding to $T^A$ or vice versa.

$R^{L1}$ represents a hydrogen atom, a halogen atom, an alkyl group, an aryl group, or a monovalent heterocyclic group, preferably a hydrogen atom, an alkyl group, or an aryl group, and more preferably a hydrogen atom.

As the alkyl group, an alkyl group having 1 to 10 carbon atoms is preferable, an alkyl group having 1 to 4 carbon atoms is more preferable, and an alkyl group having 1 or 2 carbon atoms is still more preferable.

The alkyl group may be linear or branched, and some or all of the carbon atoms included in the alkyl group may form a cyclic structure. Unless specified otherwise, the above-described contents shall be applied to the description of the alkyl group in the present disclosure.

As the aryl group, an aryl group having 6 to 20 carbon atoms is preferable, and a phenyl group or a naphthyl group is more preferable.

In the present disclosure, a monovalent heterocyclic group refers to a group obtained by removing one hydrogen atom from a heterocyclic compound, and a divalent heterocyclic group refers to a group obtained by removing two hydrogen atoms from a heterocyclic compound.

It is preferable that a heterocycle in the monovalent heterocyclic group is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

$R^{L2}$ represents an alkylene group, an arylene group, or a divalent heterocyclic group and preferably an alkylene group.

As the alkylene group, an alkylene group having 1 to 10 carbon atoms is preferable, an alkylene group having 1 to 4 carbon atoms is more preferable, and an alkylene group having 1 or 2 carbon atoms is still more preferable.

As the arylene group, an arylene group having 6 to 20 carbon atoms is preferable, a phenylene group or a naphthylene group is more preferable, and a phenylene group is still more preferable.

As the divalent heterocyclic group, a structure obtained by further removing another hydrogen atom from the monovalent heterocyclic group of $R^{L}1$ is preferable.

In Formula A, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group. Among these, an aryl group, a monovalent heterocyclic group, or a trialkylsilyl group is preferable. As the heterocyclic group, a heterocyclic group having an oxygen atom or a nitrogen atom is preferable. A phenyl group or a pyridyl group is more preferable.

Examples of the halogen atom include a fluorine atom (F atom), a chlorine atom (Cl atom), a bromine atom (Br atom), and an iodine atom (I atom). Among these, a Cl atom or a Br atom is preferable, and a Cl atom is more preferable.

As the alkyl group, an alkyl group having 1 to 10 carbon atoms is preferable, an alkyl group having 1 to 4 carbon atoms is more preferable, and an alkyl group having 1 or 2 carbon atoms is still more preferable.

In a case where $T^A$ represents an alkyl group, $T^A$ may form a ring structure with another carbon atom in the methine chain. As the ring structure, s a 5-membered ring or a 6-membered ring is preferable.

As the aryl group, an aryl group having 6 to 20 carbon atoms is preferable, a phenyl group or a naphthyl group is more preferable, and a phenyl group is still more preferable. The aryl group may further have a substituent. Examples of the substituent that can be introduced into the aryl group include an alkyl group, a halogen atom, an alkenyl group, an aryl group, a monovalent heterocyclic group, a nitro group, a cyano group, $-OR^{L3}$, $-C(=O)R^{L3}$, $-C(=O)OR^{L3}$, $-OC(=O)R^{L3}$, $-N(R^{L3})_2$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-SR^{L3}$, $-S(=O)_2R^{L3}$, $-S(=O)_2OR^{L3}$, $-NHS(=O)_2R^{L3}$, and $-S(=O)_2N(R^{L3})_2$. Among these, an alkyl group, an aryl group, a monovalent heterocyclic group, a nitro group, a cyano group, $-OR^{L3}$, $-N(R^{L3})_2$, $-NHC(=O)R^{L3}$, $-C(=O)N(R^{L3})_2$, $-NHC(=O)OR^{L3}$, or $-NHC(=O)N(R^{L3})_2$ is preferable.

It is preferable that a heterocycle in the monovalent heterocyclic group is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a triazine ring, a piperidine ring, a furan ring, a furfuran ring, a Meldrum's acid ring, a barbituric acid ring, a succinimide ring, a thiophene ring, a pyrrole ring, a quinoline ring, a morpholine ring, a thiomorpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The heterocycle may form a salt structure. For example, the pyridine ring may form a pyridinium salt, and may be present as a pyridinium ion.

The aryl group or the monovalent heterocyclic group may have a substituent. Examples of the substituent include an alkyl group, an alkoxy group, a halogen atom, an alkenyl group, an alkynyl group, an aryl group, a monovalent heterocyclic group, a nitro group, a cyano group, $-OR^T$, $-C(=O)R^T$, $-C(=O)OR^T$, $-OC(=O)R^T$, $-N(R^T)_2$, $-NHC(=O)R^T$, $-C(=O)N(R^T)_2$, $-NHC(=O)OR^T$, $-OC(=O)N(R^T)_2$, $-NHC(=O)N(R^T)_2$, $-SR^T$, $-S(=O)_2 R^T$, $-S(=O)_2OR^T$, $-NHS(=O)_2R^T$, and $-S(=O)_2N(R^T)_2$.

$R^T$'s each independently represent a hydrogen atom, an alkyl group, an aryl group, or a monovalent heterocyclic group and preferably a hydrogen atom, an alkyl group, or an aryl group.

As the alkyl group represented by $R^T$, an alkyl group having 1 to 12 carbon atoms is preferable, an alkyl group having 1 to 6 carbon atoms is more preferable, and a methyl group or an ethyl group is still more preferable.

As the alkyl group of the alkoxy group represented by $R^T$, an alkyl group having 1 to 12 carbon atoms is preferable, an alkyl group having 1 to 6 carbon atoms is more preferable, and a methyl group or an ethyl group is still more preferable.

As the aryl group represented by $R^T$, an aryl group having 6 to 20 carbon atoms is preferable, a phenyl group or a naphthyl group is more preferable, and a phenyl group is still more preferable.

It is preferable that a heterocycle in the monovalent heterocyclic group represented by $R^T$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a piperazine ring, a pyrrolidine ring, a furan ring, a tetrahydrofuran ring, a tetrahydropyran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The monovalent heterocyclic group may further have a substituent. Examples of the substituent include the groups represented by $R^T$, and preferable aspects thereof are also the same.

The amino group refers to an amino group or a substituted amino group, and a diarylamino group or a diheteroarylamino group is preferable.

Examples of a substituent of the substituted amino group include an alkyl group, an aryl group, and a monovalent heterocyclic group. The alkyl group, the aryl group, or the monovalent heterocyclic group has the same definition and the same preferable aspect as the alkyl group, the aryl group, or the monovalent heterocyclic group represented by $T^4$.

As the trialkylsilyl group, a trialkylsilyl group in which the number of carbon atoms in the alkyl group is 1 to 10 is preferable, and a trialkylsilyl group in which the number of carbon atoms in the alkyl group is 1 to 4 is more preferable. Preferable examples of the trialkylsilyl group include a trimethylsilyl group, a dimethylbutylsilyl group, a triethylsilyl group, and a triisopropylsilyl group.

As the trialkoxysilyl group, a trialkoxysilyl group in which the number of carbon atoms in the alkoxy group is 1 to 10 is preferable, and a trialkoxysilyl group in which the number of carbon atoms in the alkoxy group is 1 to 4 is more preferable. Preferable examples of the trialkoxysilyl group include a trimethoxysilyl group and a triethoxysilyl group.

In a case where $S^A$ represents a single bond or an alkylene group and $T^A$ represents an alkyl group, the total number of carbon atoms included in $S^A$ and $T^A$ is 3 or more. From the viewpoint of the invisibility of the obtained infrared absorbing image, the total number of carbon atoms is preferably 4 or more and more preferably 5 or more.

In a case where $S^A$ represents a single bond or an alkylene group, $T^A$ represents an alkyl group, and the total number of carbon atoms is 3 or more, the invisibility of the obtained infrared absorbing image is excellent.

In addition, from the viewpoint of dispersion easiness, the total number of carbon atoms is preferably 20 or less and more preferably 10 or less.

In particular, from the viewpoint of dispersibility, a heterocycle in which $T^A$ at a terminal in Formula A has a nitrogen atom, an aryl group, or a halogen atom is preferable. In addition, the alkyl group, the aryl group, or the like further has a substituent such that the dispersibility and the absorption wavelength of the colorant, in particular, the absorption maximum can be easily adjusted to be in the preferable range.

Specific examples of the substituent represented by Formula A include the following substituents A-1 to A-48. However, the substituent according to the embodiment of the present disclosure is not limited to these examples. In the following substituents A-1 to A-48, i-$C_{10}$ represents an isodecyl group, i-$C_8$ represents an isooctyl group, and * represents a binding site to $L^1$ in Formula 1.

Among the following substituents A-1 to A-48, from the viewpoint of dispersibility, A-1, A-2, A-4, A-7, A-8, A-12, A-13, A-14, A-15, A-16, A-20, A-26, A-28, A-29, A-30, A-31, A-32, A-34, A-39, A-41, A-42, A-43, A-44, A-45, A-47, or A-48 is preferable, and A-1, A-2, A-4, A-7, A-8, A-13, A-14, A-15, A-26, A-28, A-29, A-30, A-31, A-32, A-34, A-39, or A-42 is more preferable.

In addition, from the viewpoint of increasing the absorption wavelength of the specific colorant, A-1, A-2, A-4, A-5, A-6, A-7, A-8, A-20, A-34, A-39, A-41, A-42, A-45 or A-48 is preferable, and A-1, A-2, A-4, A-8, A-39, or A-42 is more preferable.

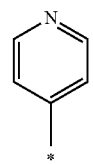

A-1

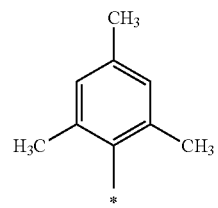

A-2

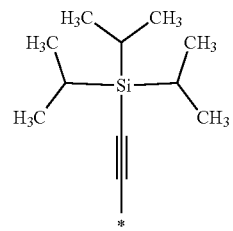

A-3

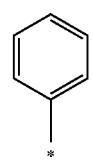

A-4

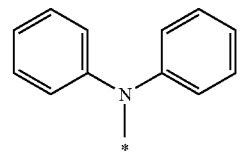

A-5

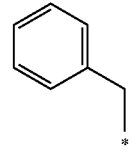

A-6

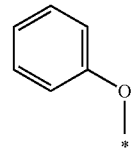

A-7

A-8

A-9

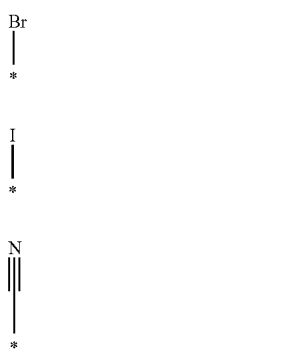
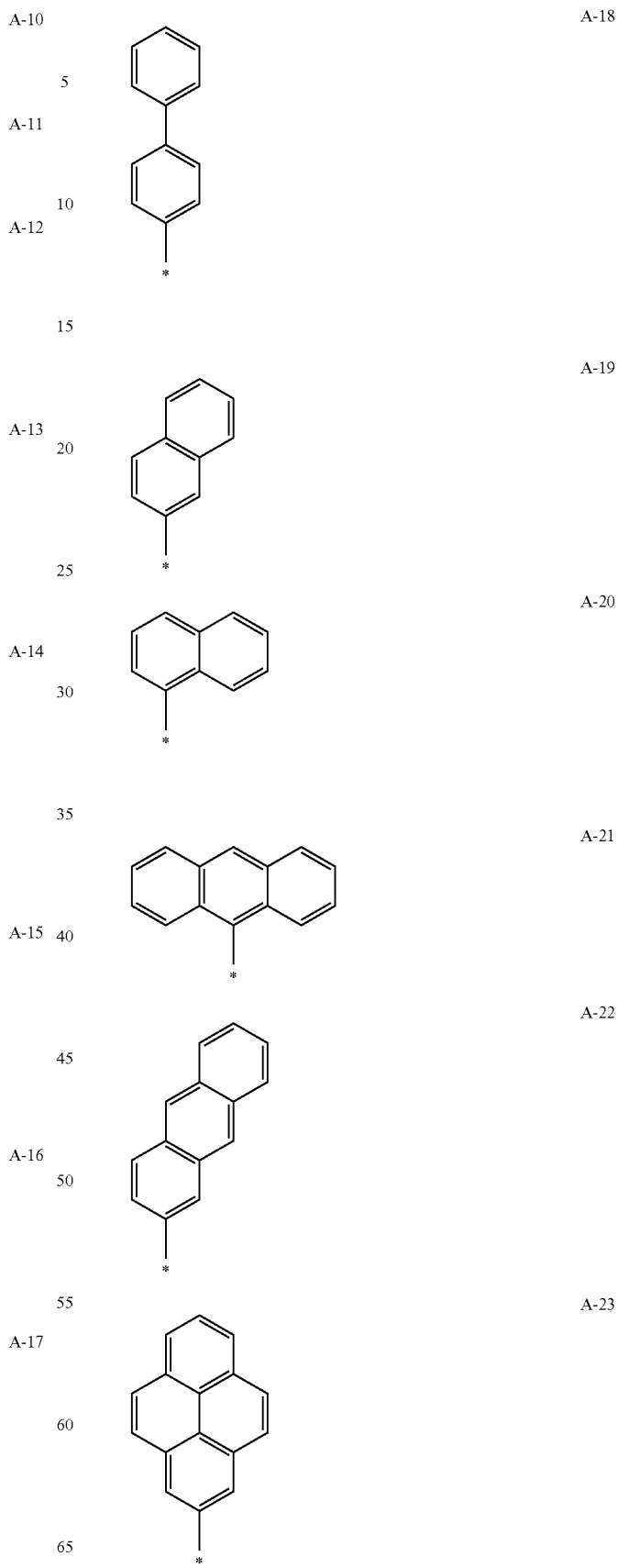

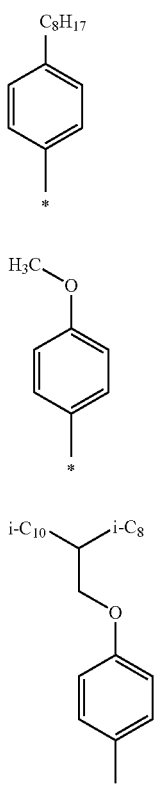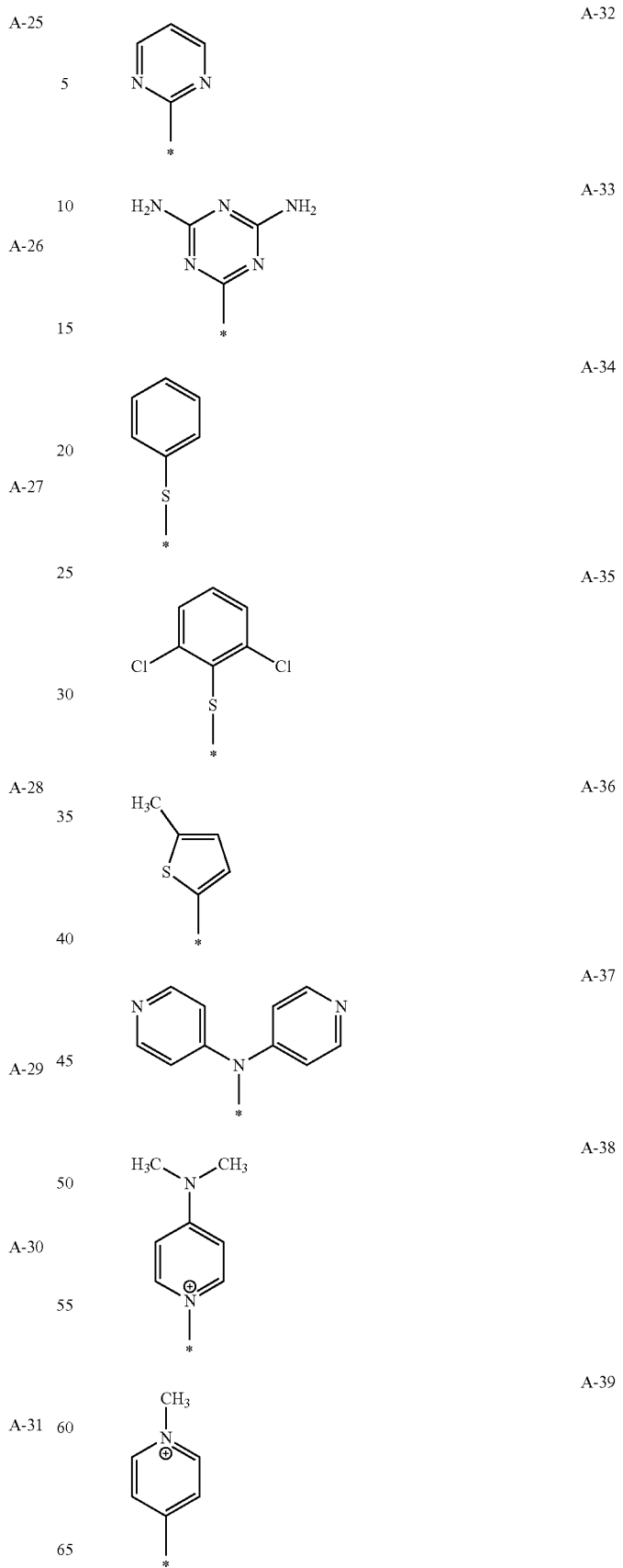

-continued

A-40 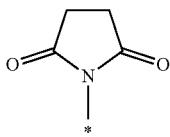

A-41 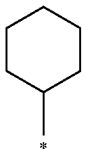

A-42 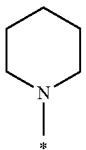

A-43 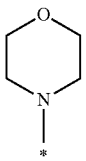

A-44 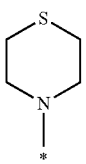

A-45 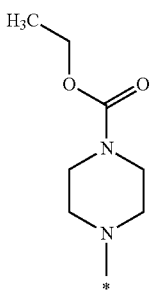

A-46 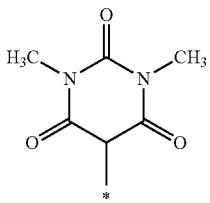

A-47 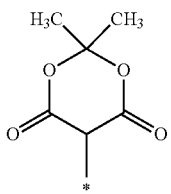

A-48 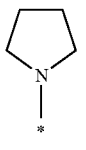

In the ink composition for ink jet printing according to the embodiment of the present disclosure, the content of the colorant represented by Formula 1 is preferably 0.1 mass % to 10 mass %, more preferably 0.1 mass % to 5 mass %, and still more preferably 0.1 mass % 3 mass % with respect to the total mass of the ink composition for ink jet printing.

In a case where the content of the colorant represented by Formula 1 is 0.1 mass % or higher, an infrared absorbing image having higher readability can be obtained.

In a case where the content of the colorant represented by Formula 1 is 3 mass % or lower, an infrared absorbing image having higher invisibility can be obtained.

The ink composition for ink jet printing according to the embodiment of the present disclosure may include one colorant represented by Formula 1 or may include two or more colorants represented by Formula 1.

<Colorant Represented by Formula 2>

It is preferable that the colorant represented by Formula 1 is a colorant represented by the following Formula 2. In the ink composition for ink jet printing according to the embodiment of the present disclosure, by using the colorant represented by Formula 2, an infrared absorbing image having higher invisibility can be obtained.

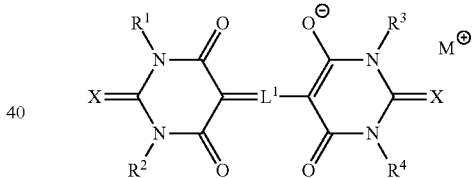

Formula 2

In Formula 2, $M^+$ represents a proton or a monovalent alkali metal cation or organic cation, $L^1$ represents a methine chain consisting of 5 or 7 methine groups, and a methine group at a center of the methine chain has a substituent represented by the following Formula A.

$$\text{*-}S^A\text{-}T^A$$

Formula A

In Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^4$ is 3 or more, and * represents a binding site to the methine group at the center of the methine chain.

$R^1$, $R^2$, $R^3$, and $R^4$ each independently represent a hydrogen atom, an alkyl group, an aryl group, or a monovalent heterocyclic group, and X's each independently represent an O atom, a S atom, or a Se atom.

[$L^1$ and $M^+$]

In Formula 2, $L^1$ and $M^+$ have the same definitions and the same preferable aspects as $L^1$ and $M^+$ in Formula 1.

[$R^1$, $R^2$, $R^3$, and $R^4$]

In Formula 2, $R^1$, $R^2$, $R^3$, and $R^4$ each independently represent a hydrogen atom, an alkyl group, an aryl group, or a monovalent heterocyclic group. From the viewpoints of the light fastness and invisibility of the obtained infrared absorbing image, a hydrogen atom or an aryl group is preferable, and a hydrogen atom or a phenyl group is more preferable.

As the alkyl group represented by $R^1$, $R^2$, $R^3$, and $R^4$, an alkyl group having 1 to 10 carbon atoms is preferable, an alkyl group having 1 to 4 carbon atoms is more preferable, and a methyl group or an ethyl group is still more preferable.

It is preferable that the alkyl group has a substituent. Examples of the substituent include examples of a substituent in the aryl group described below excluding an alkyl group, a nitro group, and a cyano group, and preferable aspects thereof are also the same.

As the aryl group represented by $R^1$, $R^2$, $R^3$, and $R^4$, an aryl group having 6 to 20 carbon atoms is preferable, a phenyl group or a naphthyl group is more preferable, and a phenyl group is still more preferable.

The aryl group may be unsubstituted but preferably has a substituent. As the introduction position of the substituent, from the viewpoint of dispersibility and aggregation stability, the meta position or the para position is preferable, and the meta position is more preferable with respect to a binding site to another structure in Formula 1. Among these, an aspect where a polar group is present at the meta position is more preferable.

Examples of the substituent that can be introduced into the aryl group include an alkyl group, a halogen atom, an alkenyl group, an aryl group, a monovalent heterocyclic group, a nitro group, a cyano group, $-OR^{L3}$, $-C(=O)R^{L3}$, $-C(=O)OR^{L3}$, $-OC(=O)R^{L3}$, $-N(R^{L3})_2$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-SR^{L3}$, $-S(=O)_2R^{L3}$, $-S(=O)_2OR^{L3}$, $-NHS(=O)_2R^{L3}$, and $-S(=O)_2N(R^{L3})_2$.

From the viewpoint of further improving the dispersibility and aggregation stability of the specific colorant in the dispersion, a polar group is preferable as the substituent. Among the above-described examples of the substituent, a nitro group, a cyano group, $-OR^{L3}$, $-C(=O)R^{L3}$, $-C(=O)OR^{L3}$, $-OC(=O)R^{L3}$, $-N(R^{L3})_2$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-SR^{L3}$, $-S(=O)_2R^{L3}$, $-S(=O)_2OR^{L3}$, $-NHS(=O)_2R^{L3}$, or $-S(=O)_2N(R^{L3})_2$ is preferable as the polar group. Among these, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-NHS(=O)_2R^{L3}$, or $-S(=O)_2N(R^{L3})_2$ is more preferable.

In addition, in a case where the dispersion is applied to a near infrared absorbing ink composition, a hydrogen-bonding group is preferable as the substituent from the viewpoints of the light fastness and moist heat resistance of a near infrared absorbing image that is a dry material of the ink composition. Among the above-described substituents, as the hydrogen-bonding group, for example, $-OH$, $-C(=O)OH$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-NHS(=O)_2R^{L3}$, or $-S(=O)_2N(R^{L3})_2$ is preferable, and $-NHC(=O)OR^{L3}$ is more preferable.

$R^{L3}$'s each independently represent a hydrogen atom, an alkyl group, an alkenyl group, an aryl group, or a monovalent heterocyclic group, and preferably a hydrogen atom, an alkyl group, or an aryl group.

As the alkyl group represented by $R^{L3}$, an alkyl group having 1 to 10 carbon atoms is preferable, an alkyl group having 1 to 4 carbon atoms is more preferable, and a methyl group or an ethyl group is still more preferable.

As the alkenyl group represented by $R^{L3}$, an alkenyl group having 2 to 10 carbon atoms is preferable, an alkenyl group having 2 to 4 carbon atoms is more preferable, and an alkenyl group having 2 or 3 carbon atoms is still more preferable.

As the aryl group represented by $R^{L3}$, an aryl group having 6 to 20 carbon atoms is preferable, a phenyl group or a naphthyl group is more preferable, and a phenyl group is still more preferable.

It is preferable that a heterocycle in the monovalent heterocyclic group represented by $R^{L3}$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The monovalent heterocyclic group may further have a substituent. Examples of the substituent include the groups represented by $R^{L3}$, and preferable aspects thereof are also the same.

It is preferable that a heterocycle in the monovalent heterocyclic group represented by $R^1$, $R^2$, $R^3$, and $R^4$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

It is preferable that the monovalent heterocyclic group has a substituent. Examples of the substituent include the examples of the substituent in a case where $R^1$, $R^2$, $R^3$, and $R^4$ represent an aryl group, and preferable aspects thereof are also the same.

In addition, from the viewpoint of improving the light fastness and moist heat resistance of the obtained infrared absorbing image, it is preferable that at least one selected from the group consisting of $R^1$, $R^2$, $R^3$, and $R^4$ represent a hydrogen atom, it is more preferable that at least two selected from the group consisting of $R^1$, $R^2$, $R^3$, and $R^4$ represent a hydrogen atom, and it is still more preferable that two selected from the group consisting of $R^1$, $R^2$, $R^3$, and $R^4$ represent a hydrogen atom.

In a case where two selected from the group consisting of $R^1$, $R^2$, $R^3$, and $R^4$ represent a hydrogen atom, it is preferable that one of $R^1$ or $R^2$ and one of $R^3$ or $R^4$ represent a hydrogen atom.

Further, from the viewpoint of the invisibility of the obtained infrared absorbing image, it is more preferable that one of $R^1$ or $R^2$ and one of $R^3$ or $R^4$ represent a hydrogen atom and the other one of $R^1$ or $R^2$ and the other one of $R^3$ or $R^4$ represent a phenyl group. It is still more preferable that the phenyl group has a substituent as described above.

Specific examples of $R^1$, $R^2$, $R^3$, and $R^4$ include the following substituents R-1 to R-79. However, $R^1$, $R^2$, $R^3$, and $R^4$ according to the present disclosure are not limited to these examples. In the following substituents R-1 to R-79, a wave line portion represents a binding site to another structure in Formula 2.

Among the following substituents R-1 to R-79, from the viewpoint of light fastness, R-1, R-2, R-3, R-4, R-5, R-7, R-11, R-13, R-14, R-15, R-18, R-19, R-20, R-22, R-50, R-51, R-52, R-53, R-56, R-57, R-60, R-61, R-62, R-63, R-64, R-65, R-66, R-67, R-68, R-69, R-70, R-71, R-72, R-73, R-74, R-75, R-76, R-77, R-78, or R-79 is preferable, and R-1, R-2, R-4, R-7, R-11, R-13, R-14, R-15, R-18, R-19, R-51, R-52, R-53, R-56, R-57, R-60, R-61, R-62, R-63, R-64, or R-79 is more preferable.

In structures of the following substituents, Me represents a methyl group.

R-1
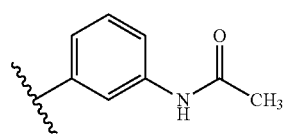

R-2
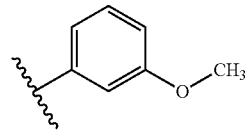

R-3
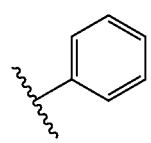

R-4
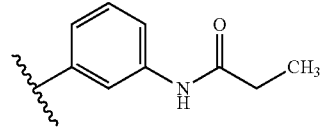

R-5
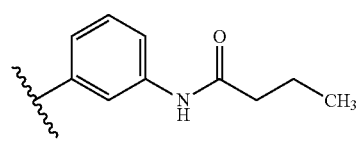

R-6
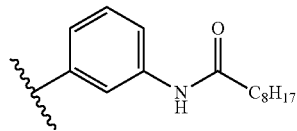

R-7
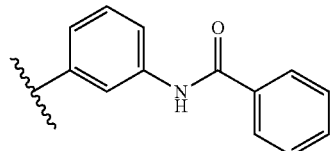

R-8
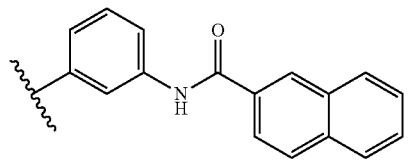

R-9
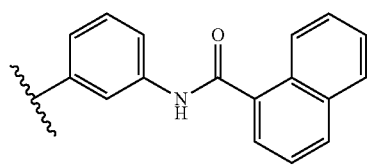

R-10
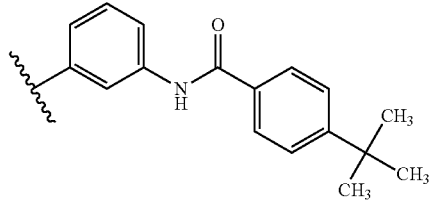

R-11
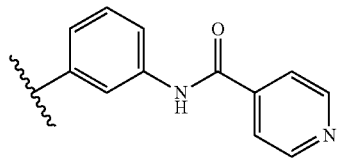

R-12
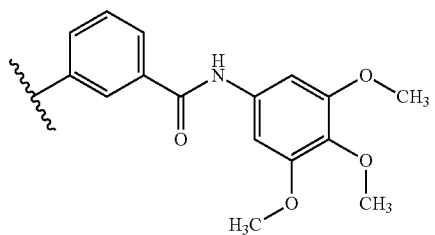

R-13
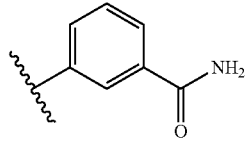

R-14
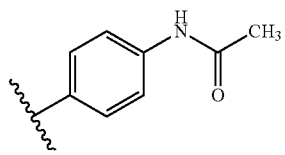

R-15 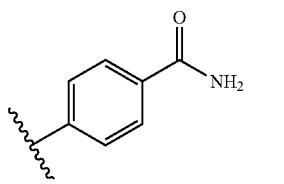
R-16 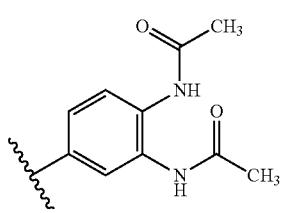
R-17 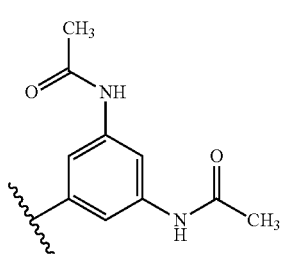
R-18 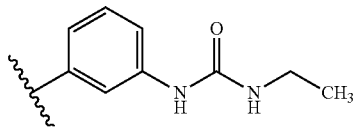
R-19 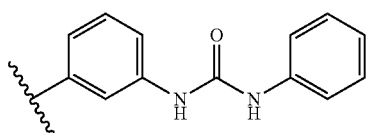
R-20 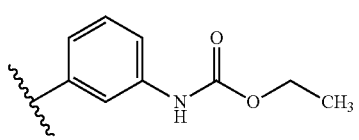
R-21 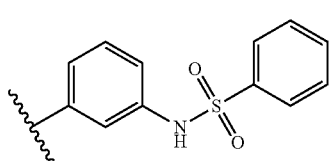
R-22 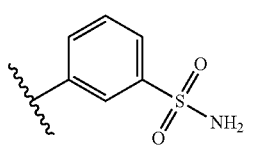
R-23 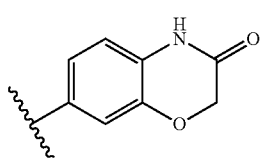
R-24 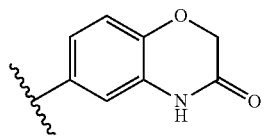
R-25 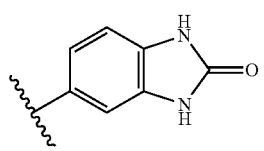
R-26 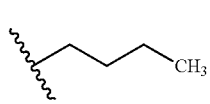
R-27 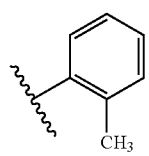
R-28 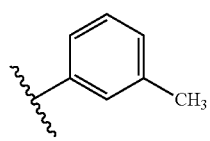
R-29 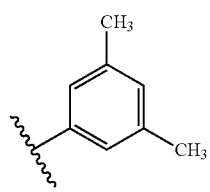
R-30 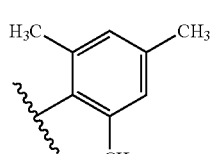
R-31 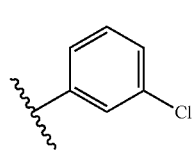
R-32 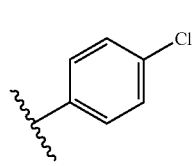
R-33 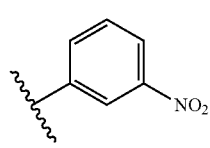

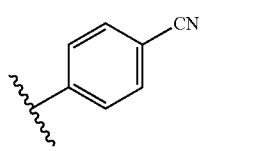
R-34
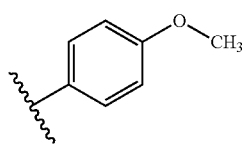
R-35
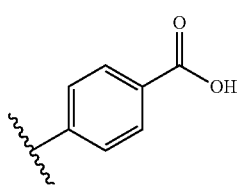
R-36
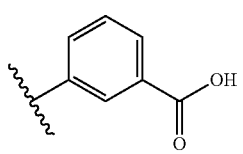
R-37
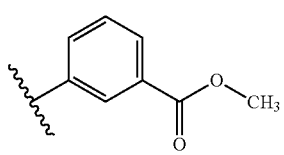
R-38
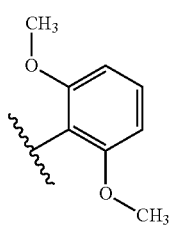
R-39
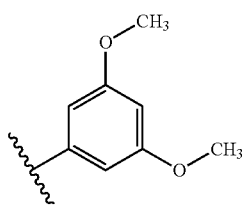
R-40
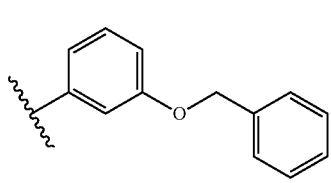
R-41
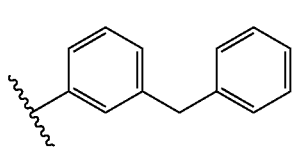
R-42
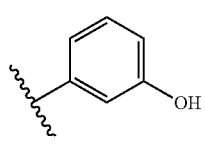
R-43
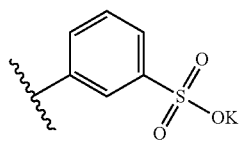
R-44
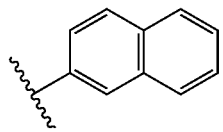
R-45
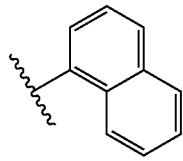
R-46
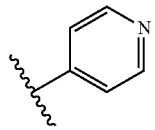
R-47
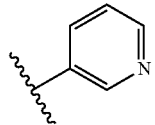
R-48
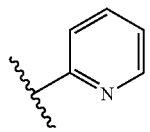
R-49
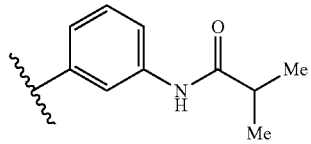
R-50
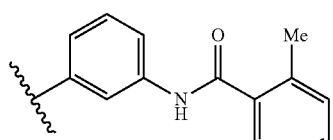
R-51
R-52

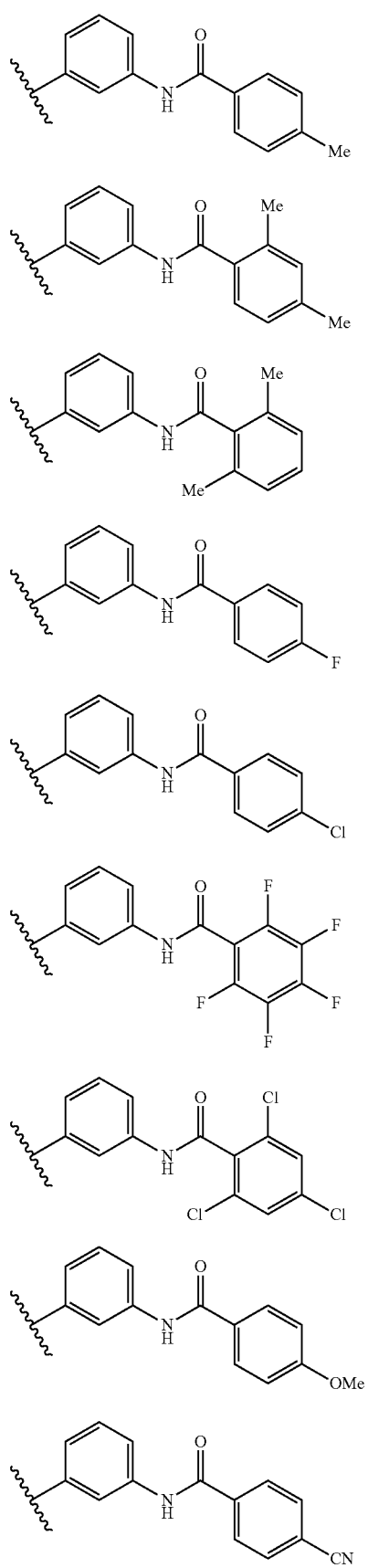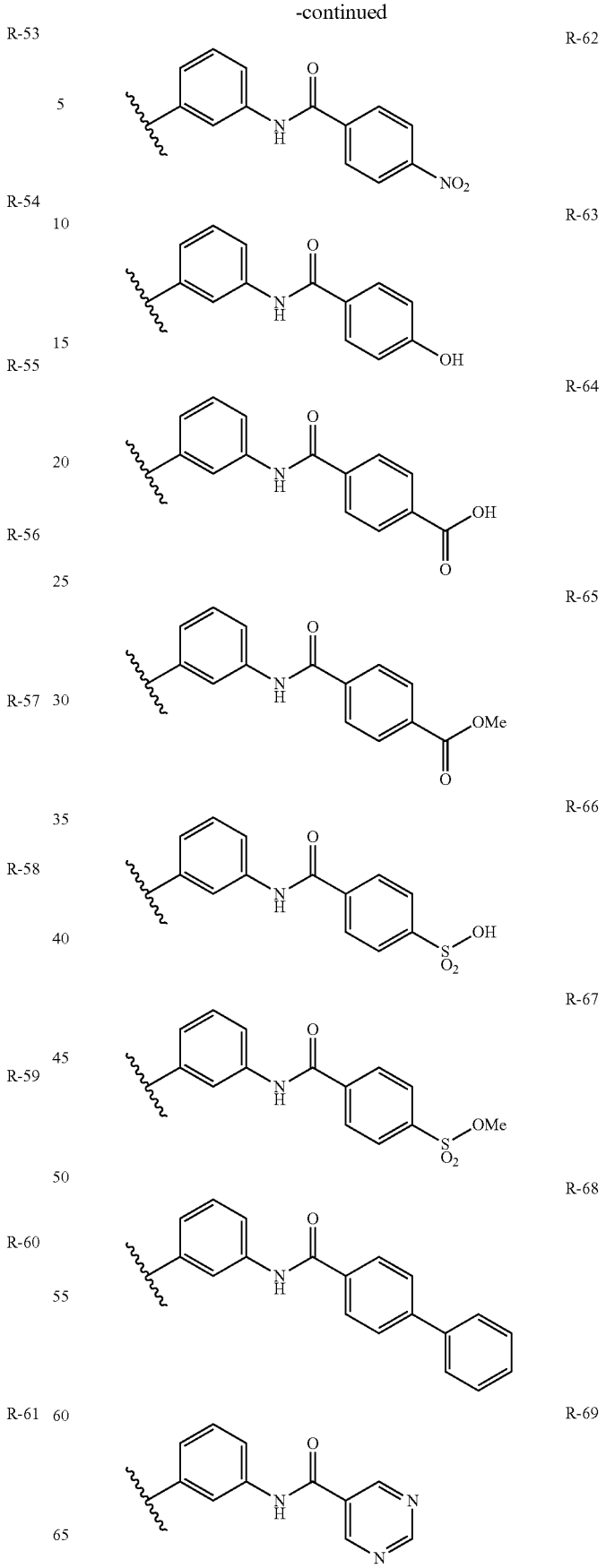

-continued

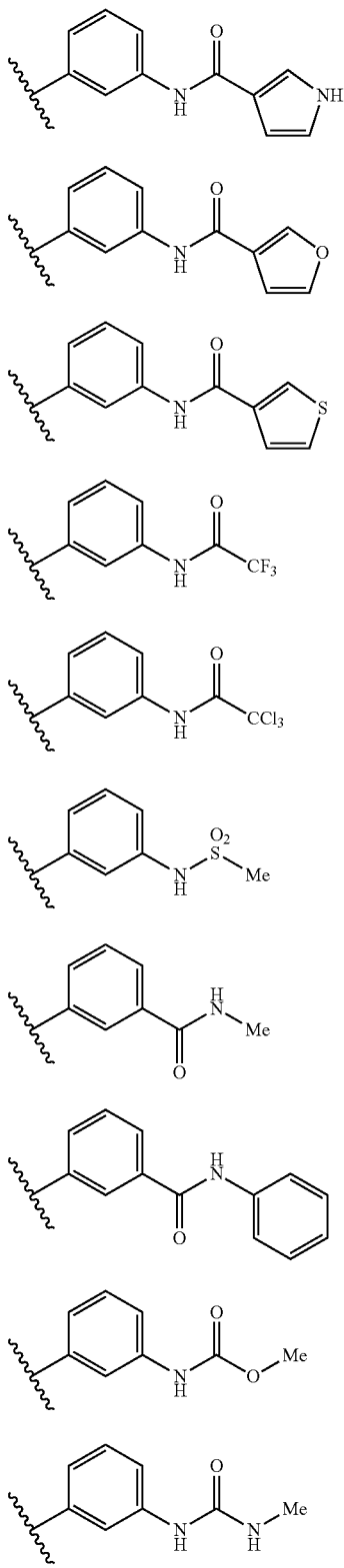

R-70
R-71
R-72
R-73
R-74
R-75
R-76
R-77
R-78
R-79

[X]

In Formula 2, X's each independently represent an O atom, a S atom, or a Se atom, preferably an O atom or a S atom, and more preferably an O atom.

<Colorant Represented by Formula 3>

It is preferable that the colorant represented by Formula 2 is a colorant represented by the following Formula 3. In the ink composition for ink jet printing according to the embodiment of the present disclosure, by using the colorant represented by Formula 3, an infrared absorbing image having higher light fastness, moist heat resistance, and readability can be obtained.

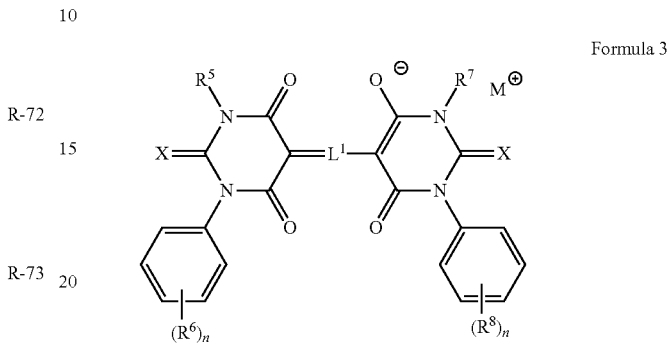

Formula 3

In Formula 3, $M^+$ represents a proton or a monovalent alkali metal cation or organic cation, $L^1$ represents a methine chain consisting of 5 or 7 methine groups, and a methine group at a center of the methine chain has a substituent represented by the following Formula A.

$$*-S^A-T^A$$  Formula A

In Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

$R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, —$OR^{L3}$, —C(=O)$R^{L3}$, —C(=O)$OR^{L3}$, —OC(=O)$R^{L3}$, —N($R^{L3}$)$_2$, —NHC(=O)$R^{L3}$, —C(=O)N($R^{L3}$)$_2$, —NHC(=O)$OR^{L3}$, —OC(=O)N($R^{L3}$)$_2$, —NHC(=O)N($R^{L3}$)$_2$, —$SR^{L3}$, —S(=O)$_2R^{L3}$, —S(=O)$_2OR^{L3}$, —NHS(=O)$_2R^{L3}$, or —S(=O)$_2$N($R^{L3}$)$_2$, $R^{L3}$'s each independently represent a hydrogen atom, an alkyl group, an alkenyl group, an aryl group, or a monovalent heterocyclic group, n's each independently represent an integer of 1 to 5, and X's each independently represent an O atom, a S atom, or a Se atom.

[$L^1$, $M^+$, and X]

In Formula 3, $L^1$, $M^+$, and X have the same definitions and the same preferable aspects as $L^1$, $M^+$, and X in Formula 2.

[$R^5$, $R^6$, $R^7$, and $R^8$]

$R^5$ and $R^7$ each independently represent a hydrogen atom, an alkyl group, an aryl group, or a monovalent heterocyclic group, and preferably a hydrogen atom.

The alkyl group, the aryl group, or the monovalent heterocyclic group represented by $R^5$ and $R^7$ has the same definition and the same preferable aspect as the alkyl group, the aryl group, or the monovalent heterocyclic group represented by $R^1$ and $R^3$.

$R^6$ and $R^8$ each independently represent an alkyl group, a halogen atom, an alkenyl group, an aryl group, a monovalent heterocyclic group, a nitro group, a cyano group, —$OR^{L3}$, —$C(=O)R^{L3}$, —$C(=O)OR^{L3}$, —$OC(=O)R^{L3}$, —$N(R^{L3})_2$, —$NHC(=O)R^{L3}$, —$C(=O)N(R^{L3})_2$, —$NHC(=O)OR^{L3}$, —$OC(=O)N(R^{L3})_2$, —$NHC(=O)N(R^{L3})_2$, —$SR^{L3}$, —$S(=O)_2R^{L3}$, —$S(=O)_2OR^{L3}$, —$NHS(=O)_2R^{L3}$, or —$S(=O)_2N(R^{L3})_2$.

$R^{L3}$ has the same definition and the same preferable range and the same preferable aspect as $R^{L3}$ in $R^1$ to $R^4$.

From the viewpoint of improving light fastness and moist heat resistance, it is preferable $R^6$ and $R^8$ each independently represent a hydrogen-bonding group. As the hydrogen-bonding group, for example, —OH, —C(=O)OH, —NHC(=O)$R^{L3}$, —C(=O)N($R^{L3}$)$_2$, —NHC(=O)O$R^{L3}$, —OC(=O)N($R^{L3}$)$_2$, —NHC(=O)N($R^{L3}$)$_2$, —NHS(=O)$_2R^{L3}$, or —S(=O)$_2$N($R^{L3}$)$_2$ is preferable, and —NHC(=O)O$R^{L4}$ is more preferable.

$R^{L3}$ has the same definition and the same preferable range and the same preferable aspect as $R^{L3}$ in $R^1$ to $R^4$.

$R^{L4}$ represents an alkyl group, preferably an alkyl group having 1 to 4 carbon atoms, and more preferably a methyl group.

From the viewpoint of ink stability, it is preferable that the colorant represented by Formula 3 has one group represented by $R^6$ and one group represented by $R^8$. In this case, it is preferable that the binding site of the group represented by $R^6$ or the group represented by $R^8$ is the meta position with respect to the binding site of a barbituric acid ring in a benzene ring to which the group represented by $R^6$ or $R^8$ is bonded.

In Formula 3, it is preferable that at least one selected from the group consisting of $R^5$, $R^6$, $R^7$, and $R^8$ has a hydrogen-bonding group, and it is more preferable that at least two selected from the group consisting of $R^5$, $R^6$, $R^7$, and $R^8$ have a hydrogen-bonding group.

In addition, from the viewpoint of synthesis suitability, it is preferable that $R^5$ and $R^7$ represent the same group and $R^6$ and $R^8$ represent the same group.

Further, it is more preferable that one of $R^5$ or $R^7$ represent a hydrogen atom and $R^6$ and $R^8$ represent the same hydrogen-bonding group.

[n]

n's each independently represent an integer of 1 to 5. From the viewpoint of dispersion easiness, n's each independently represent preferably an integer of 1 to 3, more preferably 1 or 2, and still more preferably 1.

<Method of Manufacturing Colorant Represented by any One of Formulae 1 to 3>

The colorant represented by any one of Formulae 1 to 3 used in the present disclosure can be synthesized with reference to, for example, methods described in JP2002-020648A and F. M. Harmer, "Heterocyclic Compounds Cyanine Dyes and Related Compounds" (John Wiley&Sons, New York, London, 1964).

Hereinafter, specific examples of the colorant represented by any one Formulae 1 to 3 will be described. However, the colorant represented by any one Formulae 1 to 3 according to the present disclosure is not limited to these examples.

In the item "Skeleton" of the following tables, each of A, $R^a$, $R^b$, $R^c$, $R^d$, X, and $M^+$ of molecular skeletons SK-1 to SK-8 described below represents an atom, a molecule, or a group corresponding to each of A, $R^a$, $R^b$, $R^c$, $R^d$, X, and $M^+$ of the molecular skeletons SK-1 to SK-8. In addition, A-1 to A-4 described in the item "A" represent the above-described substituents A-1 to A-4, respectively. R-1 to R-79 descried in the items "$R^a$", "$R^b$", "$R^c$", and "$R^d$" represent the above-described substituents R-1 to R-49, respectively. Further, TEA described in the item "$M^+$" represents a triethylammonium ion. For example, the description "$K^+$:TEA=2:1" represents that a potassium ion and a triethylammonium ion are added at a molar ratio of 2:1.

Among the specific examples, Compound 1, Compound 8, Compound 9, Compound 10, Compound 11, Compound 13, Compound 17, Compound 19, Compound 20, Compound 21, Compound 24, Compound 25, Compound 26, Compound 28, Compound 2, Compound 56, Compound 57, Compound 58, Compound 59, Compound 61, Compound 65, Compound 67, Compound 68, Compound 69, Compound 72, Compound 73, Compound 74, Compound 76, Compound 153, Compound 6, Compound 154, Compound 155, Compound 156, Compound 158, Compound 162, Compound 164, Compound 165, Compound 166, Compound 169, Compound 170, Compound 171, Compound 173, Compound 201, Compound 202, Compound 203, Compound 204, Compound 205, Compound 207, Compound 211, Compound 213, Compound 214, Compound 215, Compound 218, Compound 219, Compound 220, Compound 222, Compound 250, Compound 251, Compound 252, Compound 253, Compound 254, Compound 256, Compound 260, Compound 262, Compound 263, Compound 264, Compound 267, Compound 268, Compound 269, Compound 271, Compound 299, Compound 300, Compound 301, Compound 302, Compound 303, Compound 305, Compound 307, Compound 309, Compound 311, Compound 312, Compound 313, Compound 316, Compound 318, Compound 320, Compound 348, Compound 349, Compound 350, Compound 351, Compound 352, Compound 354, Compound 358, Compound 360, Compound 361, Compound 362, Compound 365, Compound 366, Compound 367, Compound 369, Compound 936, Compound 937, Compound 938, Compound 939, Compound 940, Compound 942, Compound 946, Compound 948, Compound 949, Compound 951, Compound 953, Compound 954, Compound 955, Compound 957, Compound 1622, Compound 1623, Compound 1624, Compound 1625, Compound 1626, Compound 1628, Compound 1632, Compound 1634, Compound 1635, Compound 1636, Compound 1639, Compound 1640, Compound 1641, Compound 1643, Compound 1867, Compound 1868, Compound 1869, Compound 1870, Compound 1871, Compound 1873, Compound 1877, Compound 1878, Compound 1879, Compound 1880, Compound 1881, Compound 1884, Compound 1885, Compound 1886, Compound 1888, Compound 1965, Compound 1966, Compound 1967, Compound 1968, Compound 1969, Compound 1971, Compound 1975, Compound 1977, Compound 1978, Compound 1979, Compound 1982, Compound 1983, Compound 1984, Compound 1986, Compound 2014, Compound 2015, Compound 2016, Compound 2017, Compound 2018, Compound 2020, Compound 2024, Compound 2026, Compound 2027, Compound 2028, Compound 2031, Compound 2032, Compound 2033, Compound 2035, Compound 2161, Compound 2162, Compound 2163, Compound 2164, Compound 2165, Compound 2167, Compound 2171, Compound 2173, Compound 2174, Compound 2175, Compound 2177, Compound 2178, Compound 2179, Compound 2181, Compound 2308, Compound 2309, Compound 2310, Compound 2311, Compound 2312, Compound 2314, Compound 2318, Compound 2320, Compound 2321, Compound 2322, Compound 2325, Compound 2326, Compound 2327, Compound 2329, Compound 2504, Compound 2505, Compound 2506, Compound 2507, Compound 2510, Compound 2511, Compounds 2514 to 2533, Compound 2534, Compound 2535, Compound 2536, Compound 2537, Compound 2540, Compound 2541, Compounds 2544 to 2563, Compound 2564, Compound 2565, Compound 2566, Compound 2567, Compound 2570, Compound 2571, Compounds 2574 to 2593, Compound 2594, Compound 2595, Compound 2596, Compound 2597, Compound 2600, Compound 2601, Compound 2604, Compound 2605, Compound 2606, Compound 2607, Compound 2608, Compound 2623, Compound 2624, Compound 2625, Compound 2626, Compound 2627, Compound 2630, Compound 2631, Compound 2634, Compound 2635, Compound 2636, Compound 2637, Compound 2638, Compound 2653, Compound 2654, Compound 2655, Compound 2656, Compound 2657, Compound 2660, Compound 2661, Compound 2664, Compound 2665, Compound 2666, Compound 2667, Compound 2668, Compound 2683, Compound 2684, Compound, Compound 2685, Compound 2686, Compound 2687, Compound 2690, Compound 2691, Compounds 2694 to 2713, Compound 2774, Compound 2775, Compound 2776, Compound 2777, Compound 2780, Compound 2781, Compound 2784, Compound 2785, Compound 2786, Compound 2787, Compound 2788, Compound 2803, Compound 2834, Compound 2835, Compound 2836, Compound 2837, Compound 2840, Compound 2841, Compound 2844, Compound 2845, Compound 2846, Compound 2847, Compound 2848, Compound 2863, Compound 2864, Compound 2865, Compound 2866, Compound 2867, Compound 2870, Compound 2871, Compounds 2874 2893, Compound 2894, Compound 2895, Compound 2896, Compound 2897, Compound 2900, Compound 2901, Compounds 2904 to 2923, Compound 2924, Compound 2925, Compound 2926, Compound 2927, Compound 2930, Compound 2931, Compound 2934, Compound 2935, Compound 2936, Compound 2937, Compound 2938, Compound 2953, Compound 2954, Compound 2955, Compound 2956, Compound 2957, Compound 2960, Compound 2961, Compound 2964, Compound 2965, Compound 2966, Compound 2967, Compound 2968, Compound 2983, Compound 2984, Compound 2985, Compound 2987, Compound 2989, Compound 2991, Compound 2992, Compound 2993, Compound 2994, Compound 2995, Compound 2996, Compound 3010, Compounds 3012 to 3018, Compound 3032, Compound 3033, Compound 3034, Compound 3036, Compound 3038, Compound 3040, Compound 3041, Compound 3042, Compound 3043, Compound 3044, Compound 3045, Compound 3059, Compounds 3061 to 3067, Compound 3081, Compound 3082, Compound 3083, Compound 3085, Compound 3087, Compound 3089, Compound 3090, Compound 3091, Compound 3092, Compound 3093, Compound 3094, Compound 3108, Compounds 3110 to 3116, Compound 3130, Compound 3278, Compound 3279, Compound 3281, Compound 3283, Compound 3285, Compound 3286, Compound 3287, Compound 3288, Compound 3289, Compound 3290, Compound 3304, Compounds 3306 to 3312, Compound 3326, Compound 3425, Compound 3246, Compound 3428, Compound 3430, Compound 3432, Compound 3433, Compound 3434, Compound 3435, Compound 3436, Compound 3437, Compound 3451, Compounds 3453 to 3459, Compound 3473, Compound 3523, Compound 3524, Compound 3526, Compound 3528, Compounds 3530 to 3535, Compound 3549, Compounds 3551 to 3557, Compound 3571, Compounds 3670 to 3675, Compounds 3677 to 3683, Compound 3685, Compound 3696, Compounds 3698 to 3724, Compounds 3726 to 3732, Compound 3734, Compound 3745, Compounds 3747 to 3773, Compounds 3775 to 3781, Compound 3783, Compound 3794, Compounds 3796 to 3818, Compound 3820, Compound 3822, Compounds 3824 to 3830, Compound 3832, Compound 3843, Compounds 3845 to 3851, Compound 3865, Compound 3866, Compound 3867, Compound 3869, Compound 3871, Compounds 3873 to 3879, Compound 3881, Compound 3892, Compounds 3894 to 3900, Compound 3914, Compound 3915, Compound 3916, Compound 3918, Compound 3920, Compounds 3922 to 3928, Compound 3930, Compound 3941, Compounds 3943 to 3949, Compound 3963, Compounds 3964 to 3969, Compounds 3971 to 3977, Compound 3979, Compound 3990, Compounds 3992 to 4014, Compound 4016, Compound 4018, Compounds 4020 to 4026, Compound 4028, Compound 4039, Compounds 4041 to 4047, Compound 4061, Compound 4062, Compound 4063, Compound 4065, Compound 4067, Compounds 4069 to 4075, Compound 4077, Compound 4088, Compounds 4090 to 4096, Compounds 4110 to 4116, Compounds 4118 to 4124, Compound 4126, Compound 4137, Compounds 4139 to 4161, Compound 4163, Compound 4165, Compounds 4167 to 4173, Compound 4175, Compound 4186, Compounds 4188 to 4194, Compound 4208, Compounds 4209 to 4214, Compounds 4216 to 4222, Compound 4224, Compound 4235, Compounds 4237 to 4259, Compound 4261, Compound 4263, Compounds 4265 to 4271, Compound 4273, Compound 4284, Compounds 4286 to 4292, Compound 4306, Compound 4307, Compound 4308, Compound 4310, Compound 4312, Compounds 4314 to 4320, Compound 4322, Compound 4333, Compounds 4335 to 4341, Compound 4355, Compounds 4356 to 4361, Compounds 4363 to 4369, Compound 4371, Compound 4382, Compounds 4384 to 4410, Compounds 4412 to 4418, Compound 4420, Compound 4431, Compounds 4433 to 4459, Compounds 4461 to 4467, Compound 4469, Compound 4480, Compounds 4482 to 4504, Compound 4506, Compound 4508, Compounds 4510 to 4516, Compound 4529, Compounds 4531 to 4537, Compound 4551, Compound 4552, Compound 4553, Compound 4555, Compound 4557, Compounds 4559 to 4565, Compound 4578, Compounds 4580 to 4586, Compound 4600, Compound 4601, Compound 4602, Compound 4604, Compound 4606, Compounds 4608 to 4614, Compound 4627, Compounds 4629 to 4635, Compounds 4649 to 4655, Compounds 4657 to 4663, Compound 4665, Compound 4676, Compounds 4678 to 4700, Compound 4702, Compound 4704, Compounds 4706 to 4712, Compound 4725, Compounds 4727 to 4733, Compound 4747, Compound 4748, Compound 4749, Compound 4751, Compound 4753, Compounds 4755 to 4761, Compound 4774, Compounds 4776 to 4782, Compound 4796, Compounds 4797 to 4802, Compounds 4804 to 4810, Compound 4812, Compound 4823, Compounds 4825 to 4847, Compound 4849, Compound 4851, Compounds 4853 to 4859, Compound 4872, Compounds 4874 to 4880, Compound 4872, Compounds 4874 to 4880, Compound 4894, Compounds 4895 to 4900, Compounds 4902 to 4908, Compound 4910, Compound 4921, Compounds 4923 to 4945, Compound 4947, Compound 4949, Compounds 4951 to 4957, Compound 4970, Compounds 4972 to 4978, Compound 4992, Compound 4993, Compound 4994, Compound 4996, Compound 4998, Compounds 5000 to 5006, Compound 5019, Compounds 5021 to 5027, Compound 5041, Compounds 5042 to 5047, Compounds 5049 to 5055, Compound 5057, Compound 5068, Compounds 5070 to 5096, Compounds 5098 to 5104, Compound 5106, Compound 5117, Compounds 5119 to 5145, Compounds 5147 to 5153, Compound 5155, Compound 5166, Compounds 5168 to 5190, Compound 5192, Compound 5194, Compounds 5196 to 5202, Compound 5215, Compounds 5217 to 5223, Compound 5237, Compound 5238, Compound 5239, Compound 5241, Compound 5243, Compounds 5245 to 5251, Compound 5264, Compounds 5266 to 5272, Compound 5286, Compound 5287, Compound 5288, Compound 5290, Compound 5292, Compounds 5294 to 5300, Compound 5313, Compounds 5315 to 5321, Compounds 5335 to 5341, Compounds 5343 to 5349, Compound 5351, Compound 5362, Compounds 5364 to 5386, Compound 5388, Compound 5390, Compounds 5392 to 5398, Compound 5411, Compounds 5413 to 5419, Compound 5433, Compound 5434, Compound 5435, Compound 5437, Compound 5439, Compounds 5441 to 5447, Compound 5460, Compounds 5462 to 5468, Compounds 5482 to 5488, Compounds 5490 to 5496, Compound 5498, Compound 5509, Compounds 5511 to 5533, Compound 5535, Compound 5537, Compounds 5539 to 5545, Compound 5558, Compounds 5560 to 5566, Compounds 5580 to 5586, Compounds 5588 to 5594, Compound 5596, Compound 5607, Compounds 5609 to 5631, Compound 5633, Compound 5635, Compounds 5637 to 5643, Compound 5656, Compounds 5658 to 5664, Compound 5678, Compound 5679, Compound 5680, Compound 5682, Compound 5684, Compounds 5686 to 5692, Compound 5705, Compound 5707 to 5713, or Compound 5727 is preferable, and Compound 1, Compound 8, Compound 10, Compound 13, Compound 17, Compound 19, Compound 20, Compound 21, Compound 2, Compound 25, Compound 56, Compound 58, Compound 61, Compound 65, Compound 67, Compound 68, Compound 69, Compound 73, Compound 153, Compound 6, Compound 155, Compound 158, Compound 162, Compound 164, Compound 165, Compound 166, Compound 170, Compound 348, Compound 349, Compound 351, Compound 354, Compound 358, Compound 360, Compound 361, Compound 362, Compound 366, Compound 1867, Compound 1868, Compound 1870, Compound 1873, Compound 1877, Compound 1878, Compound 1879, Compound 1881, Compound 1885, Compound 2014, Compound 2015, Compound 2017, Compound 2020, Compound 2024, Compound 2026, Compound 2027, Compound 2028, Compound 2032, Compounds 2504 to 2507, Compound 2510, Compound 2511, Compounds 2514 to 2518, Compounds 2533 to 2537, Compound 2540, Compound 2541, Compounds 2544 to 2548, Compound 2563, Compounds 2564 to 2567, Compound 2570, Compound 2571, Compounds 2574 to 2578, Compounds 2684 to 2687, Compound 2690, Compound 2691, Compounds 2694 to 2698, Compounds 2864 to 2867, Compound 2870, Compound 2871, Compounds 2874 to 2878, Compound 2893, Compounds 2894 to 2897, Compound 2900, Compound 2901, Compounds 2904 to 2908, Compound 2923, Compound 2989, Compound 3670, Compound 3671, Compound 3673, Compound 3675, Compound 3677 to 3682, Compound 3696, Compounds 3698 to 3704, Compound 3718, Compound 3719, Compound 3720, Compound 3722, Compound 3724, Compound 3726, Compounds 3727 to 3731, Compound 3745, Compounds 3747 to 3753, Compound 3767, Compound 3768, Compound 3769, Compound 3771, Compound 3773, Compounds 3775 to 3780, Compound 3794, Compounds 3796 to 3801, Compound 3964, Compound 3965, Compound 3967, Compound 3969, Compounds 3971 to 3976, Compound 3990, Compounds 3992 to 3998, Compound 4012, Compound 4111, Compound 4112, Compound 4114, Compound 4116, Compounds 4118 to 4123, Compound 4137, Compounds 4139 to 4145, Compound 4159, Compound 4209, Compound 4210, Compound 4212, Compound 4214, Compounds 4216 to 4221, Compound 4235, Compounds 4237 to 4243, Compound 4257, Compound 4356, Compound 4357, Compound 4359, Compound 4361, Compounds 4363 to 4368, Compound 4382, Compounds 4384 to 4390, Compound 4404, Compound 4405, Compound 4406, Compound 4408, Compound 4410, Compounds 4412 to 4417, Compound 4431, Compounds 4433 to 4439, Compound 4453, Compound 4454, Compound 4455, Compound 4457, Compound 4459, Compounds 4461 to 4466, Compound 4480, Compounds 4482 to 4488, Compound 4502, Compound 4650, Compound 4651, Compound 4653, Compound 4655, Compounds 4657 to 4662, Compound 4676, Compound 4678, Compounds 4679 to 4684, Compound 4698, Compound 4797, Compound 4798, Compound 4800, Compound 4802, Compounds 4804 to 4809, Compound 4823, Compounds 4825 to 4831, Compound 4845, Compound 4895, Compound 4896, Compound 4898, Compound 4900, Compounds 4902 to 4907, Compound 4921, Compounds 4923 to 4929, Compound 4943, Compound 5042, Compound 5043, Compound 5045, Compound 5047, Compounds 5049 to 5054, Compound 5068, Compounds 5070 to 5076, Compound 5090, Compound 5091, Compound 5092, Compound 5094, Compound 5096, Compounds 5098 to 5103, Compound 5117, Compounds 5119 to 5125, Compound 5139, Compound 5140, Compound 5141, Compound 5143, Compound 5145, Compounds 5147 to 5152, Compound 5166, Compounds 5168 to 5174, Compound 5188, Compound 5336, Compound 5337, Compound 5339, Compound 5341, Compounds 5343 to 5348, Compound 5362, Compounds 5364 to 5370, Compound 5384, Compound 5483, Compound 5484, Compound 5486, Compound 5488, Compounds 5490 to 5495, Compound 5509, Compounds 5511 to 5517, or Compound 5531 is more preferable.

TABLE 1

| | Skeleton | A | $R^a$ | $R^b$ | $R^c$ | $R^d$ | X | $M^+$ |
|---|---|---|---|---|---|---|---|---|
| Compound 1 | SK-1 | A-1 | H | R-1 | H | R-1 | O | $K^+$ |
| Compound 2 | SK-1 | A-2 | H | R-1 | H | R-1 | O | $K^+$ |
| Compound 3 | SK-1 | A-1 | H | R-1 | H | R-1 | S | $K^+$ |
| Compound 4 | SK-1 | A-1 | H | R-1 | H | R-1 | O | TEA |
| Compound 5 | SK-1 | A-3 | H | R-1 | H | R-1 | O | $K^+$:TEA = 2:1 |
| Compound 6 | SK-1 | A-4 | H | R-2 | H | R-2 | O | $K^+$ |
| Compound 7 | SK-1 | A-4 | R-3 | R-3 | R-3 | R-3 | O | $K^+$ |

In the following Compounds 8 to 2356, the skeleton is SK-1, $R^a$ and $R^c$ in SK-1 represent a hydrogen atom (H), X represents an oxygen atom (O), $M^+$ represents a potassium ion ($K^+$), and A, $R^b$, and $R^d$ in SK-1 are as shown in Table 2 below.

In the following Compounds 2357 to 2376, the skeleton is SK-2, $R^a$ and $R^c$ in SK-2 represent H, X represents O, $M^+$ represents $K^+$, and A, $R^b$, and $R^d$ in SK-2 are as shown in Table 3 below.

In the following Compounds 2377 to 2396, the skeleton is SK-4, $R^a$ and $R^c$ in SK-4 represent H, X represents O, $M^+$ represents $K^+$, and A, $R^b$, and $R^d$ in SK-4 are as shown in Table 3 below.

In the following Compounds 2397 to 2417, the skeleton is SK-5, $R^a$ and $R^c$ in SK-5 represent H, X represents O, $M^+$ represents $K^+$, and A, $R^b$, and $R^d$ in SK-5 are as shown in Table 3 below.

In the following Compounds 2418 to 2436, the skeleton is SK-6, $R^a$ and $R^c$ in SK-6 represent H, X represents O, $M^+$ represents $K^+$, and A, $R^b$, and $R^d$ in SK-6 are as shown in Table 3 below.

In the following Compounds 2437 to 2456, the skeleton is SK-8, $R^a$ and $R^c$ in SK-8 represent H, X represents O, $M^+$ represents $K^+$, and A, $R^b$, and $R^d$ in SK-8 are as shown in Table 3 below.

In the following Compounds 2457 to 2466, the skeleton is SK-3, $R^a$ and $R^c$ in SK-3 represent H, X represents O, $M^+$ represents $K^+$, $Z^a$ and $Z^b$ represent H, and A, $R^b$, and $R^d$ in SK-3 are as shown in Table 4 below.

In the following Compounds 2467 to 2476, the skeleton is SK-7, $R^a$ and $R^c$ in SK-7 represent H, X represents O, $M^+$ represents $K^+$, $Z^a$ and $Z^b$ represent H, and A, $R^b$, and $R^d$ in SK-7 are as shown in Table 4 below.

In the following Compounds 2477 to 2486, the skeleton is SK-3, $R^a$ and $R^c$ in SK-3 represent H, X represents O, $M^+$ represents $K^+$, $Z^a$ and $Z^b$ represent $CH_3$ (methyl group), and A, $R^b$, and $R^d$ in SK-3 are as shown in Table 4 below.

In the following Compounds 2487 to 2496, the skeleton is SK-7, $R^a$ and $R^c$ in SK-7 represent H, X represents O, $M^+$ represents $K^+$, $Z^a$ and $Z^b$ represent $CH_3$, and A, $R^b$, and $R^d$ in SK-7 are as shown in Table 4 below.

In the following Compounds 2504 to 2983, the skeleton is SK-1, $R^a$ and $R^c$ in SK-1 represent a hydrogen atom (H), X represents an oxygen atom (O), $M^+$ represents a potassium ion ($K^+$), and A, $R^b$, and $R^d$ in SK-1 are as shown in Table 2 below.

In the following Compounds 2984 to 3669, the skeleton is SK-1, $R^a$ and $R^c$ in SK-1 represent a hydrogen atom (H), X represents an oxygen atom (O), $M^+$ represents a lithium ion ($Li^+$), and A, $R^b$, and $R^d$ in SK-1 are as shown in Tables 5 to 10 below.

In the following Compounds 3670 to 4355, the skeleton is SK-1, $R^a$ and $R^c$ in SK-1 represent a hydrogen atom (H), X represents an oxygen atom (O), $M^+$ represents a sodium ion ($Na^+$), and A, $R^b$, and $R^d$ in SK-1 are as shown in Tables 11 to 16 below.

In the following Compounds 4356 to 5041, the skeleton is SK-1, $R^a$ and $R^c$ in SK-1 represent a hydrogen atom (H), X represents an oxygen atom (O), $M^+$ represents a rubidium ion ($Rb^+$), and A, $R^b$, and $R^d$ in SK-1 are as shown in Tables 17 to 22 below.

In the following Compounds 5042 to 5727, the skeleton is SK-1, $R^a$ and $R^c$ in SK-1 represent a hydrogen atom (H), X represents an oxygen atom (O), $M^+$ represents a cesium ion ($Cs^+$), and A, $R^b$, and $R^d$ in SK-1 are as shown in Tables 23 to 28 below.

TABLE 2

|  |  | A | $R^b$, $R^d$ |
|---|---|---|---|
| Compound | 8 to 55 | A-1 | R-2 to R-49 |
|  | 56 to 103 | A-2 | R-2 to R-49 |
|  | 104 to 152 | A-3 | R-4 |
|  | 153 | A-4 | R-1 |
|  | 154 to 200 | A-4 | R-3 to R-49 |
|  | 201 to 249 | A-5 | R-1 to R-49 |
|  | 250 to 298 | A-6 | R-1 to R-49 |
|  | 299 to 347 | A-7 | R-1 to R-49 |
|  | 348 to 396 | A-8 | R-1 to R-49 |
|  | 397 to 445 | A-9 | R-1 to R-49 |
|  | 446 to 494 | A-10 | R-1 to R-49 |
|  | 495 to 543 | A-11 | R-1 to R-49 |
|  | 544 to 592 | A-12 | R-1 to R-49 |
|  | 593 to 641 | A-13 | R-1 to R-49 |
|  | 642 to 690 | A-14 | R-1 to R-49 |

TABLE 2-continued

|  | A | $R^b$, $R^d$ |
|---|---|---|
| 691 to 739 | A-15 | R-1 to R-49 |
| 740 to 788 | A-16 | R-1 to R-49 |
| 789 to 837 | A-17 | R-1 to R-49 |
| 838 to 886 | A-18 | R-1 to R-49 |
| 887 to 935 | A-19 | R-1 to R-49 |
| 936 to 984 | A-20 | R-1 to R-49 |
| 985 to 1033 | A-21 | R-1 to R-49 |
| 1034 to 1082 | A-22 | R-1 to R-49 |
| 1083 to 1131 | A-23 | R-1 to R-49 |
| 1132 to 1180 | A-24 | R-1 to R-49 |
| 1181 to 1229 | A-25 | R-1 to R-49 |
| 1230 to 1278 | A-26 | R-1 to R-49 |
| 1279 to 1327 | A-27 | R-1 to R-49 |
| 1328 to 1376 | A-28 | R-1 to R-49 |
| 1377 to 1425 | A-29 | R-1 to R-49 |
| 1426 to 1474 | A-30 | R-1 to R-49 |
| 1475 to 1523 | A-31 | R-1 to R-49 |
| 1524 to 1572 | A-32 | R-1 to R-49 |
| 1573 to 1621 | A-3 3 | R-1 to R-49 |
| 1622 to 1670 | A-34 | R-1 to R-49 |
| 1671 to 1719 | A-3 5 | R-1 to R-49 |
| 1720 to 1768 | A-36 | R-1 to R-49 |
| 1769 to 1817 | A-37 | R-1 to R-49 |
| 1818 to 1866 | A-38 | R-1 to R-49 |
| 1867 to 1915 | A-39 | R-1 to R-49 |
| 1916 to 1964 | A-40 | R-1 to R-49 |
| 1965 to 2013 | A-41 | R-1 to R-49 |
| 2014 to 2062 | A-42 | R-1 to R-49 |
| 2063 to 2111 | A-43 | R-1 to R-49 |
| 2112 to 2160 | A-44 | R-1 to R-49 |
| 2161 to 2209 | A-45 | R-1 to R-49 |
| 2210 to 2258 | A-46 | R-1 to R-49 |
| 2259 to 2307 | A-47 | R-1 to R-49 |
| 2308 to 2356 | A-48 | R-1 to R-49 |
| 2504 to 2533 | A-1 | R-50 to R-79 |
| 2534 to 2563 | A-2 | R-50 to R-79 |
| 2564 to 2593 | A-4 | R-50 to R-79 |
| 2594 to 2623 | A-5 | R-50 to R-79 |
| 2624 to 2653 | A-6 | R-50 to R-79 |
| 2654 to 2683 | A-7 | R-50 to R-79 |
| 2684 to 2713 | A-8 | R-50 to R-79 |
| 2714 to 2743 | A-13 | R-50 to R-79 |
| 2744 to 2773 | A-14 | R-50 to R-79 |
| 2774 to 2803 | A-20 | R-50 to R-79 |
| 2804 to 2833 | A-29 | R-50 to R-79 |
| 2834 to 2863 | A-34 | R-50 to R-79 |
| 2864 to 2893 | A-39 | R-50 to R-79 |
| 2894 to 2923 | A-42 | R-50 to R-79 |
| 2924 to 2953 | A-45 | R-50 to R-79 |
| 2954 to 2983 | A-48 | R-50 to R-79 |

In Table 2, for example, in the compound 8, A represents A-1, and $R^b$ and $R^d$ represent R-2. In the compound 9, A represents A-1, and $R^b$ and $R^d$ represent R-3. Hereinafter, the same shall be applied to the compounds 10 to 2356 and the compounds 2504 to 2983.

TABLE 3

|  |  | A | $R^b$, $R^d$ |
|---|---|---|---|
| Compound | 2357 | A-1 | R-1 |
|  | 2358 | A-1 | R-2 |
|  | 2359 | A-1 | R-7 |
|  | 2360 | A-1 | R-13 |
|  | 2361 | A-1 | R-14 |
|  | 2362 | A-4 | R-1 |
|  | 2363 | A-4 | R-2 |
|  | 2364 | A-4 | R-7 |
|  | 2365 | A-4 | R-13 |
|  | 2366 | A-4 | R-14 |
|  | 2367 | A-8 | R-1 |
|  | 2368 | A-8 | R-2 |
|  | 2369 | A-8 | R-7 |
|  | 2370 | A-8 | R-13 |

TABLE 3-continued

| | A | $R^b, R^d$ |
|---|---|---|
| 2371 | A-8 | R-14 |
| 2372 | A-42 | R-1 |
| 2373 | A-42 | R-2 |
| 2374 | A-42 | R-7 |
| 2375 | A-42 | R-13 |
| 2376 | A-42 | R-14 |
| 2377 | A-1 | R-1 |
| 2378 | A-1 | R-2 |
| 2379 | A-1 | R-7 |
| 2380 | A-1 | R-13 |
| 2381 | A-1 | R-14 |
| 2382 | A-4 | R-1 |
| 2383 | A-4 | R-2 |
| 2384 | A-4 | R-7 |
| 2385 | A-4 | R-13 |
| 2386 | A-4 | R-14 |
| 2387 | A-8 | R-1 |
| 2388 | A-8 | R-2 |
| 2389 | A-8 | R-7 |
| 2390 | A-8 | R-13 |
| 2391 | A-8 | R-14 |
| 2392 | A-42 | R-1 |
| 2393 | A-42 | R-2 |
| 2394 | A-42 | R-7 |
| 2395 | A-42 | R-13 |
| 2396 | A-42 | R-14 |
| 2397 | A-1 | R-1 |
| 2398 | A-1 | R-2 |
| 2399 | A-1 | R-7 |
| 2400 | A-1 | R-13 |
| 2401 | A-1 | R-14 |
| 2402 | A-4 | R-1 |
| 2403 | A-4 | R-2 |
| 2404 | A-4 | R-7 |
| 2405 | A-4 | R-13 |
| 2406 | A-4 | R-14 |
| 2407 | A-8 | R-1 |
| 2408 | A-8 | R-2 |
| 2409 | A-8 | R-7 |
| 2410 | A-8 | R-13 |
| 2411 | A-8 | R-14 |
| 2412 | A-42 | R-1 |
| 2413 | A-42 | R-2 |
| 2414 | A-42 | R-7 |
| 2415 | A-42 | R-13 |
| 2416 | A-42 | R-14 |
| 2417 | A-1 | R-1 |
| 2418 | A-1 | R-2 |
| 2419 | A-1 | R-7 |
| 2420 | A-1 | R-13 |
| 2421 | A-1 | R-14 |
| 2422 | A-4 | R-1 |
| 2423 | A-4 | R-2 |
| 2424 | A-4 | R-7 |
| 2425 | A-4 | R-13 |
| 2426 | A-4 | R-14 |
| 2427 | A-8 | R-1 |
| 2428 | A-8 | R-2 |
| 2429 | A-8 | R-7 |
| 2430 | A-8 | R-13 |
| 2431 | A-8 | R-14 |
| 2432 | A-42 | R-1 |
| 2433 | A-42 | R-2 |
| 2434 | A-42 | R-7 |
| 2435 | A-42 | R-13 |
| 2436 | A-42 | R-14 |
| 2437 | A-1 | R-1 |
| 2438 | A-1 | R-2 |
| 2439 | A-1 | R-7 |
| 2440 | A-1 | R-13 |
| 2441 | A-1 | R-14 |
| 2442 | A-4 | R-1 |
| 2443 | A-4 | R-2 |
| 2444 | A-4 | R-7 |
| 2445 | A-4 | R-13 |
| 2446 | A-4 | R-14 |
| 2447 | A-8 | R-1 |
| 2448 | A-8 | R-2 |
| 2449 | A-8 | R-7 |
| 2450 | A-8 | R-13 |
| 2451 | A-8 | R-14 |
| 2452 | A-42 | R-1 |
| 2453 | A-42 | R-2 |
| 2454 | A-42 | R-7 |
| 2455 | A-42 | R-13 |
| 2456 | A-42 | R-14 |

TABLE 4

| | | A | $R^b, R^d$ |
|---|---|---|---|
| Compound | 2457 | A-1 | R-1 |
| | 2458 | A-1 | R-2 |
| | 2459 | A-1 | R-7 |
| | 2460 | A-1 | R-13 |
| | 2461 | A-1 | R-14 |
| | 2462 | A-4 | R-1 |
| | 2463 | A-4 | R-2 |
| | 2464 | A-4 | R-7 |
| | 2465 | A-4 | R-13 |
| | 2466 | A-4 | R-14 |
| | 2467 | A-8 | R-1 |
| | 2468 | A-8 | R-2 |
| | 2469 | A-8 | R-7 |
| | 2470 | A-8 | R-13 |
| | 2471 | A-8 | R-14 |
| | 2472 | A-42 | R-1 |
| | 2473 | A-42 | R-2 |
| | 2474 | A-42 | R-7 |
| | 2475 | A-42 | R-13 |
| | 2476 | A-42 | R-14 |
| | 2477 | A-1 | R-1 |
| | 2478 | A-1 | R-2 |
| | 2479 | A-1 | R-7 |
| | 2480 | A-1 | R-13 |
| | 2481 | A-1 | R-14 |
| | 2482 | A-4 | R-1 |
| | 2483 | A-4 | R-2 |
| | 2484 | A-4 | R-7 |
| | 2485 | A-4 | R-13 |
| | 2486 | A-4 | R-14 |
| | 2487 | A-8 | R-1 |
| | 2488 | A-8 | R-2 |
| | 2489 | A-8 | R-7 |
| | 2490 | A-8 | R-13 |
| | 2491 | A-8 | R-14 |
| | 2492 | A-42 | R-1 |
| | 2493 | A-42 | R-2 |
| | 2494 | A-42 | R-7 |
| | 2495 | A-42 | R-13 |
| | 2496 | A-42 | R-14 |

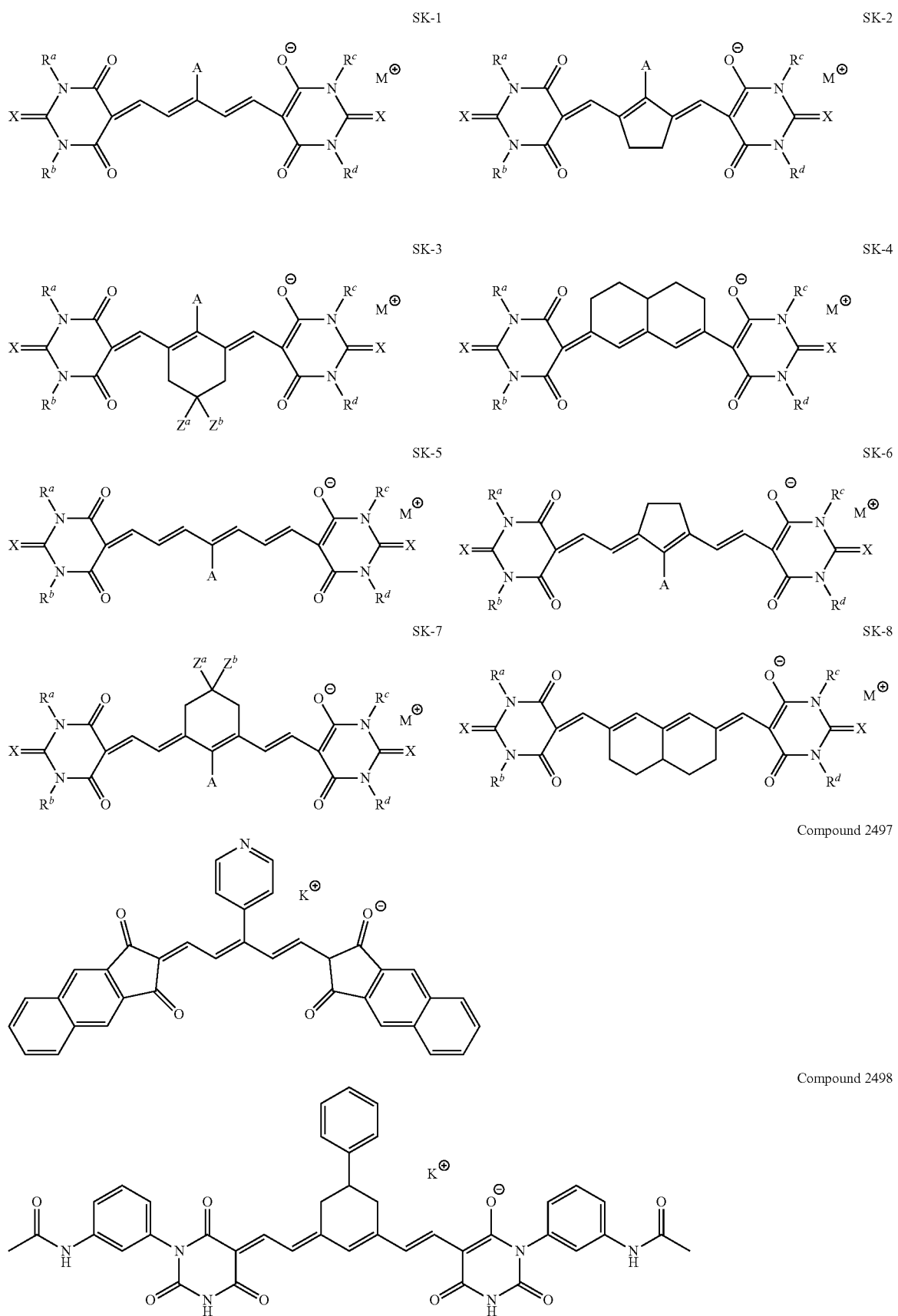

-continued
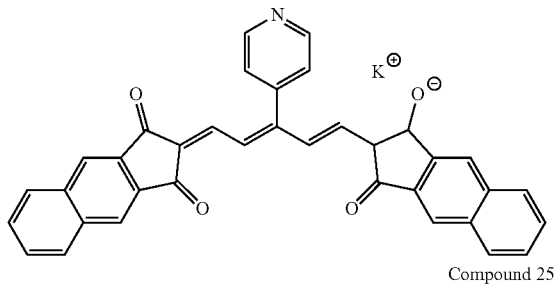
Compound 2499
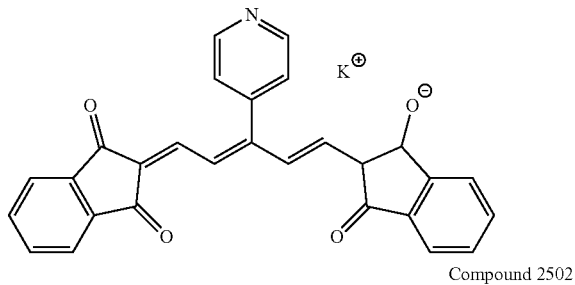
Compound 2500
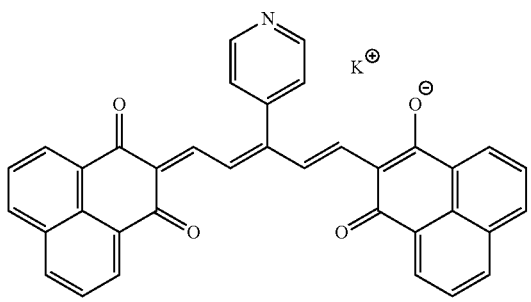
Compound 2501
Compound 2502
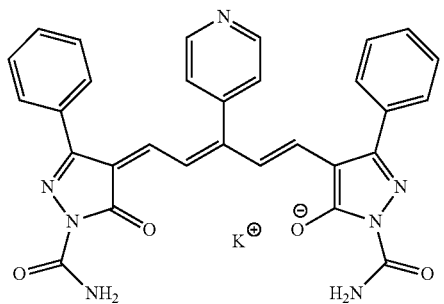
Compound 2503
| | | A | $R^b$, $R^d$ | | | A | $R^b$, $R^d$ |
|---|---|---|---|---|---|---|---|
| Compound | 2984 | A-1 | R-1 | 3012 | A-1 | R-56 |
| | 2985 | A-1 | R-2 | 3013 | A-1 | R-57 |
| | 2986 | A-1 | R-3 | 3014 | A-1 | R-60 |
| | 2987 | A-1 | R-4 | 3015 | A-1 | R-61 |
| | 2988 | A-1 | R-5 | 3016 | A-1 | R-62 |
| | 2989 | A-1 | R-7 | 3017 | A-1 | R-63 |
| | 2990 | A-1 | R-8 | 3018 | A-1 | R-64 |
| | 2991 | A-1 | R-11 | 3019 | A-1 | R-65 |
| | 2992 | A-1 | R-13 | 3020 | A-1 | R-66 |
| | 2993 | A-1 | R-14 | 3021 | A-1 | R-67 |
| | 2994 | A-1 | R-15 | 3022 | A-1 | R-68 |
| | 2995 | A-1 | R-18 | 3023 | A-1 | R-69 |
| | 2996 | A-1 | R-19 | 3024 | A-1 | R-70 |
| | 2997 | A-1 | R-20 | 3025 | A-1 | R-71 |
| | 2998 | A-1 | R-21 | 3026 | A-1 | R-72 |
| | 2999 | A-1 | R-22 | 3027 | A-1 | R-73 |
| | 3000 | A-1 | R-23 | 3028 | A-1 | R-74 |
| | 3001 | A-1 | R-26 | 3029 | A-1 | R-76 |
| | 3002 | A-1 | R-27 | 3030 | A-1 | R-77 |
| | 3003 | A-1 | R-31 | 3031 | A-1 | R-78 |
| | 3004 | A-1 | R-37 | 3032 | A-1 | R-79 |
| | 3005 | A-1 | R-38 | 3033 | A-2 | R-1 |
| | 3006 | A-1 | R-43 | 3034 | A-2 | R-2 |
| | 3007 | A-1 | R-44 | 3035 | A-2 | R-3 |
| | 3008 | A-1 | R-45 | 3036 | A-2 | R-4 |
| | 3009 | A-1 | R-47 | 3037 | A-2 | R-5 |
| | 3010 | A-1 | R-51 | 3038 | A-2 | R-7 |
| | 3011 | A-1 | R-55 | 3039 | A-2 | R-8 |

TABLE 5-continued

| | A | $R^b, R^d$ |
|---|---|---|
| 3040 | A-2 | R-11 |
| 3041 | A-2 | R-13 |
| 3042 | A-2 | R-14 |
| 3043 | A-2 | R-15 |
| 3044 | A-2 | R-18 |
| 3045 | A-2 | R-19 |
| 3046 | A-2 | R-20 |
| 3047 | A-2 | R-21 |
| 3048 | A-2 | R-22 |
| 3049 | A-2 | R-23 |
| 3050 | A-2 | R-26 |
| 3051 | A-2 | R-27 |
| 3052 | A-2 | R-31 |
| 3053 | A-2 | R-37 |
| 3054 | A-2 | R-38 |
| 3055 | A-2 | R-43 |
| 3056 | A-2 | R-44 |
| 3057 | A-2 | R-45 |
| 3058 | A-2 | R-47 |
| 3059 | A-2 | R-51 |
| 3060 | A-2 | R-55 |
| 3061 | A-2 | R-56 |
| 3062 | A-2 | R-57 |
| 3063 | A-2 | R-60 |
| 3064 | A-2 | R-61 |
| 3065 | A-2 | R-62 |
| 3066 | A-2 | R-63 |
| 3067 | A-2 | R-64 |
| 3068 | A-2 | R-65 |
| 3069 | A-2 | R-66 |
| 3070 | A-2 | R-67 |
| 3071 | A-2 | R-68 |
| 3072 | A-2 | R-69 |
| 3073 | A-2 | R-70 |
| 3074 | A-2 | R-71 |
| 3075 | A-2 | R-72 |
| 3076 | A-2 | R-73 |
| 3077 | A-2 | R-74 |
| 3078 | A-2 | R-76 |
| 3079 | A-2 | R-77 |
| 3080 | A-2 | R-78 |
| 3081 | A-2 | R-79 |
| 3082 | A-4 | R-1 |
| 3083 | A-4 | R-2 |
| 3084 | A-4 | R-3 |
| 3085 | A-4 | R-4 |
| 3086 | A-4 | R-5 |
| 3087 | A-4 | R-7 |
| 3088 | A-4 | R-8 |
| 3089 | A-4 | R-11 |
| 3090 | A-4 | R-13 |
| 3091 | A-4 | R-14 |
| 3092 | A-4 | R-15 |
| 3093 | A-4 | R-18 |
| 3094 | A-4 | R-19 |
| 3095 | A-4 | R-20 |
| 3096 | A-4 | R-21 |
| 3097 | A-4 | R-22 |
| 3098 | A-4 | R-23 |
| 3099 | A-4 | R-26 |
| 3100 | A-4 | R-27 |

TABLE 6

| | | A | $R^b, R^d$ |
|---|---|---|---|
| Compound | 3101 | A-4 | R-31 |
| | 3102 | A-4 | R-37 |
| | 3103 | A-4 | R-38 |
| | 3104 | A-4 | R-43 |
| | 3105 | A-4 | R-44 |
| | 3106 | A-4 | R-45 |
| | 3107 | A-4 | R-47 |
| | 3108 | A-4 | R-51 |
| | 3109 | A-4 | R-55 |

TABLE 6-continued

| | A | $R^b, R^d$ |
|---|---|---|
| 3110 | A-4 | R-56 |
| 3111 | A-4 | R-57 |
| 3112 | A-4 | R-60 |
| 3113 | A-4 | R-61 |
| 3114 | A-4 | R-62 |
| 3115 | A-4 | R-63 |
| 3116 | A-4 | R-64 |
| 3117 | A-4 | R-65 |
| 3118 | A-4 | R-66 |
| 3119 | A-4 | R-67 |
| 3120 | A-4 | R-68 |
| 3121 | A-4 | R-69 |
| 3122 | A-4 | R-70 |
| 3123 | A-4 | R-71 |
| 3124 | A-4 | R-72 |
| 3125 | A-4 | R-73 |
| 3126 | A-4 | R-74 |
| 3127 | A-4 | R-76 |
| 3128 | A-4 | R-77 |
| 3129 | A-4 | R-78 |
| 3130 | A-4 | R-79 |
| 3131 | A-5 | R-1 |
| 3132 | A-5 | R-2 |
| 3133 | A-5 | R-3 |
| 3134 | A-5 | R-4 |
| 3135 | A-5 | R-5 |
| 3136 | A-5 | R-7 |
| 3137 | A-5 | R-8 |
| 3138 | A-5 | R-11 |
| 3139 | A-5 | R-13 |
| 3140 | A-5 | R-14 |
| 3141 | A-5 | R-15 |
| 3142 | A-5 | R-18 |
| 3143 | A-5 | R-19 |
| 3144 | A-5 | R-20 |
| 3145 | A-5 | R-21 |
| 3146 | A-5 | R-22 |
| 3147 | A-5 | R-23 |
| 3148 | A-5 | R-26 |
| 3149 | A-5 | R-27 |
| 3150 | A-5 | R-31 |
| 3151 | A-5 | R-37 |
| 3152 | A-5 | R-38 |
| 3153 | A-5 | R-43 |
| 3154 | A-5 | R-44 |
| 3155 | A-5 | R-45 |
| 3156 | A-5 | R-47 |
| 3157 | A-5 | R-51 |
| 3158 | A-5 | R-55 |
| 3159 | A-5 | R-56 |
| 3160 | A-5 | R-57 |
| 3161 | A-5 | R-60 |
| 3162 | A-5 | R-61 |
| 3163 | A-5 | R-62 |
| 3164 | A-5 | R-63 |
| 3165 | A-5 | R-64 |
| 3166 | A-5 | R-65 |
| 3167 | A-5 | R-66 |
| 3168 | A-5 | R-67 |
| 3169 | A-5 | R-68 |
| 3170 | A-5 | R-69 |
| 3171 | A-5 | R-70 |
| 3172 | A-5 | R-71 |
| 3173 | A-5 | R-72 |
| 3174 | A-5 | R-73 |
| 3175 | A-5 | R-74 |
| 3176 | A-5 | R-76 |
| 3177 | A-5 | R-77 |
| 3178 | A-5 | R-78 |
| 3179 | A-5 | R-79 |
| 3180 | A-6 | R-1 |
| 3181 | A-6 | R-2 |
| 3182 | A-6 | R-3 |
| 3183 | A-6 | R-4 |
| 3184 | A-6 | R-5 |
| 3185 | A-6 | R-7 |
| 3186 | A-6 | R-8 |
| 3187 | A-6 | R-11 |

TABLE 6-continued

|  |  | A | $R^b$, $R^d$ |
|---|---|---|---|
|  | 3188 | A-6 | R-13 |
|  | 3189 | A-6 | R-14 |
|  | 3190 | A-6 | R-15 |
|  | 3191 | A-6 | R-18 |
|  | 3192 | A-6 | R-19 |
|  | 3193 | A-6 | R-20 |
|  | 3194 | A-6 | R-21 |
|  | 3195 | A-6 | R-22 |
|  | 3196 | A-6 | R-23 |
|  | 3197 | A-6 | R-26 |
|  | 3198 | A-6 | R-27 |
|  | 3199 | A-6 | R-31 |
|  | 3200 | A-6 | R-37 |
|  | 3201 | A-6 | R-38 |
|  | 3202 | A-6 | R-43 |
|  | 3203 | A-6 | R-44 |
|  | 3204 | A-6 | R-45 |
|  | 3205 | A-6 | R-47 |
|  | 3206 | A-6 | R-51 |
|  | 3207 | A-6 | R-55 |
|  | 3208 | A-6 | R-56 |
|  | 3209 | A-6 | R-57 |
|  | 3210 | A-6 | R-60 |
|  | 3211 | A-6 | R-61 |
|  | 3212 | A-6 | R-62 |
|  | 3213 | A-6 | R-63 |
|  | 3214 | A-6 | R-64 |
|  | 3215 | A-6 | R-65 |
|  | 3216 | A-6 | R-66 |
|  | 3217 | A-6 | R-67 |

TABLE 7

|  |  | A | $R^b$, $R^d$ |
|---|---|---|---|
| Compound | 3218 | A-6 | R-68 |
|  | 3219 | A-6 | R-69 |
|  | 3220 | A-6 | R-70 |
|  | 3221 | A-6 | R-71 |
|  | 3222 | A-6 | R-72 |
|  | 3223 | A-6 | R-73 |
|  | 3224 | A-6 | R-74 |
|  | 3225 | A-6 | R-76 |
|  | 3226 | A-6 | R-77 |
|  | 3227 | A-6 | R-78 |
|  | 3228 | A-6 | R-79 |
|  | 3229 | A-7 | R-1 |
|  | 3230 | A-7 | R-2 |
|  | 3231 | A-7 | R-3 |
|  | 3232 | A-7 | R-4 |
|  | 3233 | A-7 | R-5 |
|  | 3234 | A-7 | R-7 |
|  | 3235 | A-7 | R-8 |
|  | 3236 | A-7 | R-11 |
|  | 3237 | A-7 | R-13 |
|  | 3238 | A-7 | R-14 |
|  | 3239 | A-7 | R-15 |
|  | 3240 | A-7 | R-18 |
|  | 3241 | A-7 | R-19 |
|  | 3242 | A-7 | R-20 |
|  | 3243 | A-7 | R-21 |
|  | 3244 | A-7 | R-22 |
|  | 3245 | A-7 | R-23 |
|  | 3246 | A-7 | R-26 |
|  | 3247 | A-7 | R-27 |
|  | 3248 | A-7 | R-31 |
|  | 3249 | A-7 | R-37 |
|  | 3250 | A-7 | R-38 |
|  | 3251 | A-7 | R-43 |
|  | 3252 | A-7 | R-44 |
|  | 3253 | A-7 | R-45 |
|  | 3254 | A-7 | R-47 |
|  | 3255 | A-7 | R-51 |
|  | 3256 | A-7 | R-55 |
|  | 3257 | A-7 | R-56 |

TABLE 7-continued

|  | A | $R^b$, $R^d$ |
|---|---|---|
| 3258 | A-7 | R-57 |
| 3259 | A-7 | R-60 |
| 3260 | A-7 | R-61 |
| 3261 | A-7 | R-62 |
| 3262 | A-7 | R-63 |
| 3263 | A-7 | R-64 |
| 3264 | A-7 | R-65 |
| 3265 | A-7 | R-66 |
| 3266 | A-7 | R-67 |
| 3267 | A-7 | R-68 |
| 3268 | A-7 | R-69 |
| 3269 | A-7 | R-70 |
| 3270 | A-7 | R-71 |
| 3271 | A-7 | R-72 |
| 3272 | A-7 | R-73 |
| 3273 | A-7 | R-74 |
| 3274 | A-7 | R-76 |
| 3275 | A-7 | R-77 |
| 3276 | A-7 | R-78 |
| 3277 | A-7 | R-79 |
| 3278 | A-8 | R-1 |
| 3279 | A-8 | R-2 |
| 3280 | A-8 | R-3 |
| 3281 | A-8 | R-4 |
| 3282 | A-8 | R-5 |
| 3283 | A-8 | R-7 |
| 3284 | A-8 | R-8 |
| 3285 | A-8 | R-11 |
| 3286 | A-8 | R-13 |
| 3287 | A-8 | R-14 |
| 3288 | A-8 | R-15 |
| 3289 | A-8 | R-18 |
| 3290 | A-8 | R-19 |
| 3291 | A-8 | R-20 |
| 3292 | A-8 | R-21 |
| 3293 | A-8 | R-22 |
| 3294 | A-8 | R-23 |
| 3295 | A-8 | R-26 |
| 3296 | A-8 | R-27 |
| 3297 | A-8 | R-31 |
| 3298 | A-8 | R-37 |
| 3299 | A-8 | R-38 |
| 3300 | A-8 | R-43 |
| 3301 | A-8 | R-44 |
| 3302 | A-8 | R-45 |
| 3303 | A-8 | R-47 |
| 3304 | A-8 | R-51 |
| 3305 | A-8 | R-55 |
| 3306 | A-8 | R-56 |
| 3307 | A-8 | R-57 |
| 3308 | A-8 | R-60 |
| 3309 | A-8 | R-61 |
| 3310 | A-8 | R-62 |
| 3311 | A-8 | R-63 |
| 3312 | A-8 | R-64 |
| 3313 | A-8 | R-65 |
| 3314 | A-8 | R-66 |
| 3315 | A-8 | R-67 |
| 3316 | A-8 | R-68 |
| 3317 | A-8 | R-69 |
| 3318 | A-8 | R-70 |
| 3319 | A-8 | R-71 |
| 3320 | A-8 | R-72 |
| 3321 | A-8 | R-73 |
| 3322 | A-8 | R-74 |
| 3323 | A-8 | R-76 |
| 3324 | A-8 | R-77 |
| 3325 | A-8 | R-78 |
| 3326 | A-8 | R-79 |
| 3327 | A-20 | R-1 |
| 3328 | A-20 | R-2 |
| 3329 | A-20 | R-3 |
| 3330 | A-20 | R-4 |
| 3331 | A-20 | R-5 |
| 3332 | A-20 | R-7 |
| 3333 | A-20 | R-8 |
| 3334 | A-20 | R-11 |

TABLE 8

|  | Compound | A | $R^b, R^d$ |
|---|---|---|---|
|  | 3335 | A-20 | R-13 |
|  | 3336 | A-20 | R-14 |
|  | 3337 | A-20 | R-15 |
|  | 3338 | A-20 | R-18 |
|  | 3339 | A-20 | R-19 |
|  | 3340 | A-20 | R-20 |
|  | 3341 | A-20 | R-21 |
|  | 3342 | A-20 | R-22 |
|  | 3343 | A-20 | R-23 |
|  | 3344 | A-20 | R-26 |
|  | 3345 | A-20 | R-27 |
|  | 3346 | A-20 | R-31 |
|  | 3347 | A-20 | R-37 |
|  | 3348 | A-20 | R-38 |
|  | 3349 | A-20 | R-43 |
|  | 3350 | A-20 | R-44 |
|  | 3351 | A-20 | R-45 |
|  | 3352 | A-20 | R-47 |
|  | 3353 | A-20 | R-51 |
|  | 3354 | A-20 | R-55 |
|  | 3355 | A-20 | R-56 |
|  | 3356 | A-20 | R-57 |
|  | 3357 | A-20 | R-60 |
|  | 3358 | A-20 | R-61 |
|  | 3359 | A-20 | R-62 |
|  | 3360 | A-20 | R-63 |
|  | 3361 | A-20 | R-64 |
|  | 3362 | A-20 | R-65 |
|  | 3363 | A-20 | R-66 |
|  | 3364 | A-20 | R-67 |
|  | 3365 | A-20 | R-68 |
|  | 3366 | A-20 | R-69 |
|  | 3367 | A-20 | R-70 |
|  | 3368 | A-20 | R-71 |
|  | 3369 | A-20 | R-72 |
|  | 3370 | A-20 | R-73 |
|  | 3371 | A-20 | R-74 |
|  | 3372 | A-20 | R-76 |
|  | 3373 | A-20 | R-77 |
|  | 3374 | A-20 | R-78 |
|  | 3375 | A-20 | R-79 |
|  | 3376 | A-34 | R-1 |
|  | 3377 | A-34 | R-2 |
|  | 3378 | A-34 | R-3 |
|  | 3379 | A-34 | R-4 |
|  | 3380 | A-34 | R-5 |
|  | 3381 | A-34 | R-7 |
|  | 3382 | A-34 | R-8 |
|  | 3383 | A-34 | R-11 |
|  | 3384 | A-34 | R-13 |
|  | 3385 | A-34 | R-14 |
|  | 3386 | A-34 | R-15 |
|  | 3387 | A-34 | R-18 |
|  | 3388 | A-34 | R-19 |
|  | 3389 | A-34 | R-20 |
|  | 3390 | A-34 | R-21 |
|  | 3391 | A-34 | R-22 |
|  | 3392 | A-34 | R-23 |
|  | 3393 | A-34 | R-26 |
|  | 3394 | A-34 | R-27 |
|  | 3395 | A-34 | R-31 |
|  | 3396 | A-34 | R-37 |
|  | 3397 | A-34 | R-38 |
|  | 3398 | A-34 | R-43 |
|  | 3399 | A-34 | R-44 |
|  | 3400 | A-34 | R-45 |
|  | 3401 | A-34 | R-47 |
|  | 3402 | A-34 | R-51 |
|  | 3403 | A-34 | R-55 |
|  | 3404 | A-34 | R-56 |
|  | 3405 | A-34 | R-57 |
|  | 3406 | A-34 | R-60 |
|  | 3407 | A-34 | R-61 |
|  | 3408 | A-34 | R-62 |
|  | 3409 | A-34 | R-63 |
|  | 3410 | A-34 | R-64 |
|  | 3411 | A-34 | R-65 |
|  | 3412 | A-34 | R-66 |
|  | 3413 | A-34 | R-67 |
|  | 3414 | A-34 | R-68 |
|  | 3415 | A-34 | R-69 |
|  | 3416 | A-34 | R-70 |
|  | 3417 | A-34 | R-71 |
|  | 3418 | A-34 | R-72 |
|  | 3419 | A-34 | R-73 |
|  | 3420 | A-34 | R-74 |
|  | 3421 | A-34 | R-76 |
|  | 3422 | A-34 | R-77 |
|  | 3423 | A-34 | R-78 |
|  | 3424 | A-34 | R-79 |
|  | 3425 | A-39 | R-1 |
|  | 3426 | A-39 | R-2 |
|  | 3427 | A-39 | R-3 |
|  | 3428 | A-39 | R-4 |
|  | 3429 | A-39 | R-5 |
|  | 3430 | A-39 | R-7 |
|  | 3431 | A-39 | R-8 |
|  | 3432 | A-39 | R-11 |
|  | 3433 | A-39 | R-13 |
|  | 3434 | A-39 | R-14 |
|  | 3435 | A-39 | R-15 |
|  | 3436 | A-39 | R-18 |
|  | 3437 | A-39 | R-19 |
|  | 3438 | A-39 | R-20 |
|  | 3439 | A-39 | R-21 |
|  | 3440 | A-39 | R-22 |
|  | 3441 | A-39 | R-23 |
|  | 3442 | A-39 | R-26 |
|  | 3443 | A-39 | R-27 |
|  | 3444 | A-39 | R-31 |
|  | 3445 | A-39 | R-37 |
|  | 3446 | A-39 | R-38 |
|  | 3447 | A-39 | R-43 |
|  | 3448 | A-39 | R-44 |
|  | 3449 | A-39 | R-45 |
|  | 3450 | A-39 | R-47 |
|  | 3451 | A-39 | R-51 |

TABLE 9

|  | Compound | A | $R^b, R^d$ |
|---|---|---|---|
|  | 3452 | A-39 | R-55 |
|  | 3453 | A-39 | R-56 |
|  | 3454 | A-39 | R-57 |
|  | 3455 | A-39 | R-60 |
|  | 3456 | A-39 | R-61 |
|  | 3457 | A-39 | R-62 |
|  | 3458 | A-39 | R-63 |
|  | 3459 | A-39 | R-64 |
|  | 3460 | A-39 | R-65 |
|  | 3461 | A-39 | R-66 |
|  | 3462 | A-39 | R-67 |
|  | 3463 | A-39 | R-68 |
|  | 3464 | A-39 | R-69 |
|  | 3465 | A-39 | R-70 |
|  | 3466 | A-39 | R-71 |
|  | 3467 | A-39 | R-72 |
|  | 3468 | A-39 | R-73 |
|  | 3469 | A-39 | R-74 |
|  | 3470 | A-39 | R-76 |
|  | 3471 | A-39 | R-77 |
|  | 3472 | A-39 | R-78 |
|  | 3473 | A-39 | R-79 |
|  | 3474 | A-41 | R-1 |
|  | 3475 | A-41 | R-2 |
|  | 3476 | A-41 | R-3 |
|  | 3477 | A-41 | R-4 |
|  | 3478 | A-41 | R-5 |
|  | 3479 | A-41 | R-7 |
|  | 3480 | A-41 | R-8 |
|  | 3481 | A-41 | R-11 |
|  | 3482 | A-41 | R-13 |

TABLE 9-continued

| | A | $R^b, R^d$ |
|---|---|---|
| 3483 | A-41 | R-14 |
| 3484 | A-41 | R-15 |
| 3485 | A-41 | R-18 |
| 3486 | A-41 | R-19 |
| 3487 | A-41 | R-20 |
| 3488 | A-41 | R-21 |
| 3489 | A-41 | R-22 |
| 3490 | A-41 | R-23 |
| 3491 | A-41 | R-26 |
| 3492 | A-41 | R-27 |
| 3493 | A-41 | R-31 |
| 3494 | A-41 | R-37 |
| 3495 | A-41 | R-38 |
| 3496 | A-41 | R-43 |
| 3497 | A-41 | R-44 |
| 3498 | A-41 | R-45 |
| 3499 | A-41 | R-47 |
| 3500 | A-41 | R-51 |
| 3501 | A-41 | R-55 |
| 3502 | A-41 | R-56 |
| 3503 | A-41 | R-57 |
| 3504 | A-41 | R-60 |
| 3505 | A-41 | R-61 |
| 3506 | A-41 | R-62 |
| 3507 | A-41 | R-63 |
| 3508 | A-41 | R-64 |
| 3509 | A-41 | R-65 |
| 3510 | A-41 | R-66 |
| 3511 | A-41 | R-67 |
| 3512 | A-41 | R-68 |
| 3513 | A-41 | R-69 |
| 3514 | A-41 | R-70 |
| 3515 | A-41 | R-71 |
| 3516 | A-41 | R-72 |
| 3517 | A-41 | R-73 |
| 3518 | A-41 | R-74 |
| 3519 | A-41 | R-76 |
| 3520 | A-41 | R-77 |
| 3521 | A-41 | R-78 |
| 3522 | A-41 | R-79 |
| 3523 | A-42 | R-1 |
| 3524 | A-42 | R-2 |
| 3525 | A-42 | R-3 |
| 3526 | A-42 | R-4 |
| 3527 | A-42 | R-5 |
| 3528 | A-42 | R-7 |
| 3529 | A-42 | R-8 |
| 3530 | A-42 | R-11 |
| 3531 | A-42 | R-13 |
| 3532 | A-42 | R-14 |
| 3533 | A-42 | R-15 |
| 3534 | A-42 | R-18 |
| 3535 | A-42 | R-19 |
| 3536 | A-42 | R-20 |
| 3537 | A-42 | R-21 |
| 3538 | A-42 | R-22 |
| 3539 | A-42 | R-23 |
| 3540 | A-42 | R-26 |
| 3541 | A-42 | R-27 |
| 3542 | A-42 | R-31 |
| 3543 | A-42 | R-37 |
| 3544 | A-42 | R-38 |
| 3545 | A-42 | R-43 |
| 3546 | A-42 | R-44 |
| 3547 | A-42 | R-45 |
| 3548 | A-42 | R-47 |
| 3549 | A-42 | R-51 |
| 3550 | A-42 | R-55 |
| 3551 | A-42 | R-56 |
| 3552 | A-42 | R-57 |
| 3553 | A-42 | R-60 |
| 3554 | A-42 | R-61 |
| 3555 | A-42 | R-62 |
| 3556 | A-42 | R-63 |
| 3557 | A-42 | R-64 |
| 3558 | A-42 | R-65 |
| 3559 | A-42 | R-66 |
| 3560 | A-42 | R-67 |
| 3561 | A-42 | R-68 |
| 3562 | A-42 | R-69 |
| 3563 | A-42 | R-70 |
| 3564 | A-42 | R-71 |
| 3565 | A-42 | R-72 |
| 3566 | A-42 | R-73 |
| 3567 | A-42 | R-74 |
| 3568 | A-42 | R-76 |

TABLE 10

| | | A | $R^b, R^d$ |
|---|---|---|---|
| Compound | 3569 | A-42 | R-77 |
| | 3570 | A-42 | R-78 |
| | 3571 | A-42 | R-79 |
| | 3572 | A-45 | R-1 |
| | 3573 | A-45 | R-2 |
| | 3574 | A-45 | R-3 |
| | 3575 | A-45 | R-4 |
| | 3576 | A-45 | R-5 |
| | 3577 | A-45 | R-7 |
| | 3578 | A-45 | R-8 |
| | 3579 | A-45 | R-11 |
| | 3580 | A-45 | R-13 |
| | 3581 | A-45 | R-14 |
| | 3582 | A-45 | R-15 |
| | 3583 | A-45 | R-18 |
| | 3584 | A-45 | R-19 |
| | 3585 | A-45 | R-20 |
| | 3586 | A-45 | R-21 |
| | 3587 | A-45 | R-22 |
| | 3588 | A-45 | R-23 |
| | 3589 | A-45 | R-26 |
| | 3590 | A-45 | R-27 |
| | 3591 | A-45 | R-31 |
| | 3592 | A-45 | R-37 |
| | 3593 | A-45 | R-38 |
| | 3594 | A-45 | R-43 |
| | 3595 | A-45 | R-44 |
| | 3596 | A-45 | R-45 |
| | 3597 | A-45 | R-47 |
| | 3598 | A-45 | R-51 |
| | 3599 | A-45 | R-55 |
| | 3600 | A-45 | R-56 |
| | 3601 | A-45 | R-57 |
| | 3602 | A-45 | R-60 |
| | 3603 | A-45 | R-61 |
| | 3604 | A-45 | R-62 |
| | 3605 | A-45 | R-63 |
| | 3606 | A-45 | R-64 |
| | 3607 | A-45 | R-65 |
| | 3608 | A-45 | R-66 |
| | 3609 | A-45 | R-67 |
| | 3610 | A-45 | R-68 |
| | 3611 | A-45 | R-69 |
| | 3612 | A-45 | R-70 |
| | 3613 | A-45 | R-71 |
| | 3614 | A-45 | R-72 |
| | 3615 | A-45 | R-73 |
| | 3616 | A-45 | R-74 |
| | 3617 | A-45 | R-76 |
| | 3618 | A-45 | R-77 |
| | 3619 | A-45 | R-78 |
| | 3620 | A-45 | R-79 |
| | 3621 | A-48 | R-1 |
| | 3622 | A-48 | R-2 |
| | 3623 | A-48 | R-3 |
| | 3624 | A-48 | R-4 |
| | 3625 | A-48 | R-5 |
| | 3626 | A-48 | R-7 |
| | 3627 | A-48 | R-8 |
| | 3628 | A-48 | R-11 |
| | 3629 | A-48 | R-13 |
| | 3630 | A-48 | R-14 |

TABLE 10-continued

| | A | $R^b$, $R^d$ |
|---|---|---|
| 3631 | A-48 | R-15 |
| 3632 | A-48 | R-18 |
| 3633 | A-48 | R-19 |
| 3634 | A-48 | R-20 |
| 3635 | A-48 | R-21 |
| 3636 | A-48 | R-22 |
| 3637 | A-48 | R-23 |
| 3638 | A-48 | R-26 |
| 3639 | A-48 | R-27 |
| 3640 | A-48 | R-31 |
| 3641 | A-48 | R-37 |
| 3642 | A-48 | R-38 |
| 3643 | A-48 | R-43 |
| 3644 | A-48 | R-44 |
| 3645 | A-48 | R-45 |
| 3646 | A-48 | R-47 |
| 3647 | A-48 | R-51 |
| 3648 | A-48 | R-55 |
| 3649 | A-48 | R-56 |
| 3650 | A-48 | R-57 |
| 3651 | A-48 | R-60 |
| 3652 | A-48 | R-61 |
| 3653 | A-48 | R-62 |
| 3654 | A-48 | R-63 |
| 3655 | A-48 | R-64 |
| 3656 | A-48 | R-65 |
| 3657 | A-48 | R-66 |
| 3658 | A-48 | R-67 |
| 3659 | A-48 | R-68 |
| 3660 | A-48 | R-69 |
| 3661 | A-48 | R-70 |
| 3662 | A-48 | R-71 |
| 3663 | A-48 | R-72 |
| 3664 | A-48 | R-73 |
| 3665 | A-48 | R-74 |
| 3666 | A-48 | R-76 |
| 3667 | A-48 | R-77 |
| 3668 | A-48 | R-78 |
| 3669 | A-48 | R-79 |

TABLE 11

| | | A | $R^b$, $R^d$ |
|---|---|---|---|
| Compound | 3670 | A-1 | R-1 |
| | 3671 | A-1 | R-2 |
| | 3672 | A-1 | R-3 |
| | 3673 | A-1 | R-4 |
| | 3674 | A-1 | R-5 |
| | 3675 | A-1 | R-7 |
| | 3676 | A-1 | R-8 |
| | 3677 | A-1 | R-11 |
| | 3678 | A-1 | R-13 |
| | 3679 | A-1 | R-14 |
| | 3680 | A-1 | R-15 |
| | 3681 | A-1 | R-18 |
| | 3682 | A-1 | R-19 |
| | 3683 | A-1 | R-20 |
| | 3684 | A-1 | R-21 |
| | 3685 | A-1 | R-22 |
| | 3686 | A-1 | R-23 |
| | 3687 | A-1 | R-26 |
| | 3688 | A-1 | R-27 |
| | 3689 | A-1 | R-31 |
| | 3690 | A-1 | R-37 |
| | 3691 | A-1 | R-38 |
| | 3692 | A-1 | R-43 |
| | 3693 | A-1 | R-44 |
| | 3694 | A-1 | R-45 |
| | 3695 | A-1 | R-47 |
| | 3696 | A-1 | R-51 |
| | 3697 | A-1 | R-55 |
| | 3698 | A-1 | R-56 |
| | 3699 | A-1 | R-57 |
| | 3700 | A-1 | R-60 |

TABLE 11-continued

| | A | $R^b$, $R^d$ |
|---|---|---|
| 3701 | A-1 | R-61 |
| 3702 | A-1 | R-62 |
| 3703 | A-1 | R-63 |
| 3704 | A-1 | R-64 |
| 3705 | A-1 | R-65 |
| 3706 | A-1 | R-66 |
| 3707 | A-1 | R-67 |
| 3708 | A-1 | R-68 |
| 3710 | A-1 | R-70 |
| 3711 | A-1 | R-71 |
| 3712 | A-1 | R-72 |
| 3713 | A-1 | R-73 |
| 3714 | A-1 | R-74 |
| 3715 | A-1 | R-76 |
| 3716 | A-1 | R-77 |
| 3717 | A-1 | R-78 |
| 3718 | A-1 | R-79 |
| 3719 | A-2 | R-1 |
| 3720 | A-2 | R-2 |
| 3721 | A-2 | R-3 |
| 3722 | A-2 | R-4 |
| 3723 | A-2 | R-5 |
| 3724 | A-2 | R-7 |
| 3725 | A-2 | R-8 |
| 3726 | A-2 | R-11 |
| 3727 | A-2 | R-13 |
| 3728 | A-2 | R-14 |
| 3729 | A-2 | R-15 |
| 3730 | A-2 | R-18 |
| 3731 | A-2 | R-19 |
| 3732 | A-2 | R-20 |
| 3733 | A-2 | R-21 |
| 3734 | A-2 | R-22 |
| 3735 | A-2 | R-23 |
| 3736 | A-2 | R-26 |
| 3737 | A-2 | R-27 |
| 3738 | A-2 | R-31 |
| 3739 | A-2 | R-37 |
| 3740 | A-2 | R-38 |
| 3741 | A-2 | R-43 |
| 3742 | A-2 | R-44 |
| 3743 | A-2 | R-45 |
| 3744 | A-2 | R-47 |
| 3745 | A-2 | R-51 |
| 3746 | A-2 | R-55 |
| 3747 | A-2 | R-56 |
| 3748 | A-2 | R-57 |
| 3749 | A-2 | R-60 |
| 3750 | A-2 | R-61 |
| 3751 | A-2 | R-62 |
| 3752 | A-2 | R-63 |
| 3753 | A-2 | R-64 |
| 3754 | A-2 | R-65 |
| 3755 | A-2 | R-66 |
| 3756 | A-2 | R-67 |
| 3757 | A-2 | R-68 |
| 3758 | A-2 | R-69 |
| 3759 | A-2 | R-70 |
| 3760 | A-2 | R-71 |
| 3761 | A-2 | R-72 |
| 3762 | A-2 | R-73 |
| 3763 | A-2 | R-74 |
| 3764 | A-2 | R-76 |
| 3765 | A-2 | R-77 |
| 3766 | A-2 | R-78 |
| 3767 | A-2 | R-79 |
| 3768 | A-4 | R-1 |
| 3769 | A-4 | R-2 |
| 3770 | A-4 | R-3 |
| 3771 | A-4 | R-4 |
| 3772 | A-4 | R-5 |
| 3773 | A-4 | R-7 |
| 3774 | A-4 | R-8 |
| 3775 | A-4 | R-11 |
| 3776 | A-4 | R-13 |
| 3777 | A-4 | R-14 |
| 3778 | A-4 | R-15 |
| 3779 | A-4 | R-18 |

TABLE 11-continued

|  | A | $R^b, R^d$ |
|---|---|---|
| 3780 | A-4 | R-19 |
| 3781 | A-4 | R-20 |
| 3782 | A-4 | R-21 |
| 3783 | A-4 | R-22 |
| 3784 | A-4 | R-23 |
| 3785 | A-4 | R-26 |
| 3786 | A-4 | R-27 |

TABLE 12

|  |  | A | $R^b, R^d$ |
|---|---|---|---|
| Compound | 3787 | A-4 | R-31 |
|  | 3788 | A-4 | R-37 |
|  | 3789 | A-4 | R-38 |
|  | 3790 | A-4 | R-43 |
|  | 3791 | A-4 | R-44 |
|  | 3792 | A-4 | R-45 |
|  | 3793 | A-4 | R-47 |
|  | 3794 | A-4 | R-51 |
|  | 3795 | A-4 | R-55 |
|  | 3796 | A-4 | R-56 |
|  | 3797 | A-4 | R-57 |
|  | 3798 | A-4 | R-60 |
|  | 3799 | A-4 | R-61 |
|  | 3800 | A-4 | R-62 |
|  | 3801 | A-4 | R-63 |
|  | 3802 | A-4 | R-64 |
|  | 3803 | A-4 | R-65 |
|  | 3804 | A-4 | R-66 |
|  | 3805 | A-4 | R-67 |
|  | 3806 | A-4 | R-68 |
|  | 3807 | A-4 | R-69 |
|  | 3808 | A-4 | R-70 |
|  | 3809 | A-4 | R-71 |
|  | 3810 | A-4 | R-72 |
|  | 3811 | A-4 | R-73 |
|  | 3812 | A-4 | R-74 |
|  | 3813 | A-4 | R-76 |
|  | 3814 | A-4 | R-77 |
|  | 3815 | A-4 | R-78 |
|  | 3816 | A-4 | R-79 |
|  | 3817 | A-5 | R-1 |
|  | 3818 | A-5 | R-2 |
|  | 3819 | A-5 | R-3 |
|  | 3820 | A-5 | R-4 |
|  | 3821 | A-5 | R-5 |
|  | 3822 | A-5 | R-7 |
|  | 3823 | A-5 | R-8 |
|  | 3824 | A-5 | R-11 |
|  | 3825 | A-5 | R-13 |
|  | 3826 | A-5 | R-14 |
|  | 3827 | A-5 | R-15 |
|  | 3828 | A-5 | R-18 |
|  | 3829 | A-5 | R-19 |
|  | 3830 | A-5 | R-20 |
|  | 3831 | A-5 | R-21 |
|  | 3832 | A-5 | R-22 |
|  | 3833 | A-5 | R-23 |
|  | 3834 | A-5 | R-26 |
|  | 3835 | A-5 | R-27 |
|  | 3836 | A-5 | R-31 |
|  | 3837 | A-5 | R-37 |
|  | 3838 | A-5 | R-38 |
|  | 3839 | A-5 | R-43 |
|  | 3840 | A-5 | R-44 |
|  | 3841 | A-5 | R-45 |
|  | 3842 | A-5 | R-47 |
|  | 3843 | A-5 | R-51 |
|  | 3844 | A-5 | R-55 |
|  | 3845 | A-5 | R-56 |
|  | 3846 | A-5 | R-57 |
|  | 3847 | A-5 | R-60 |
|  | 3848 | A-5 | R-61 |
|  | 3849 | A-5 | R-62 |

TABLE 12-continued

|  | A | $R^b, R^d$ |
|---|---|---|
| 3850 | A-5 | R-63 |
| 3851 | A-5 | R-64 |
| 3852 | A-5 | R-65 |
| 3853 | A-5 | R-66 |
| 3854 | A-5 | R-67 |
| 3855 | A-5 | R-68 |
| 3856 | A-5 | R-69 |
| 3857 | A-5 | R-70 |
| 3858 | A-5 | R-71 |
| 3859 | A-5 | R-72 |
| 3860 | A-5 | R-73 |
| 3861 | A-5 | R-74 |
| 3862 | A-5 | R-76 |
| 3863 | A-5 | R-77 |
| 3864 | A-5 | R-78 |
| 3865 | A-5 | R-79 |
| 3866 | A-6 | R-1 |
| 3867 | A-6 | R-2 |
| 3868 | A-6 | R-3 |
| 3869 | A-6 | R-4 |
| 3870 | A-6 | R-5 |
| 3871 | A-6 | R-7 |
| 3872 | A-6 | R-8 |
| 3873 | A-6 | R-11 |
| 3874 | A-6 | R-13 |
| 3875 | A-6 | R-14 |
| 3876 | A-6 | R-15 |
| 3877 | A-6 | R-18 |
| 3878 | A-6 | R-19 |
| 3879 | A-6 | R-20 |
| 3880 | A-6 | R-21 |
| 3881 | A-6 | R-22 |
| 3882 | A-6 | R-23 |
| 3883 | A-6 | R-26 |
| 3884 | A-6 | R-27 |
| 3885 | A-6 | R-31 |
| 3886 | A-6 | R-37 |
| 3887 | A-6 | R-38 |
| 3888 | A-6 | R-43 |
| 3889 | A-6 | R-44 |
| 3890 | A-6 | R-45 |
| 3891 | A-6 | R-47 |
| 3892 | A-6 | R-51 |
| 3893 | A-6 | R-55 |
| 3894 | A-6 | R-56 |
| 3895 | A-6 | R-57 |
| 3896 | A-6 | R-60 |
| 3897 | A-6 | R-61 |
| 3898 | A-6 | R-62 |
| 3899 | A-6 | R-63 |
| 3900 | A-6 | R-64 |
| 3901 | A-6 | R-65 |
| 3902 | A-6 | R-66 |
| 3903 | A-6 | R-67 |

TABLE 13

|  |  | A | $R^b, R^d$ |
|---|---|---|---|
| Compound | 3904 | A-6 | R-68 |
|  | 3905 | A-6 | R-69 |
|  | 3906 | A-6 | R-70 |
|  | 3907 | A-6 | R-71 |
|  | 3908 | A-6 | R-72 |
|  | 3909 | A-6 | R-73 |
|  | 3910 | A-6 | R-74 |
|  | 3911 | A-6 | R-76 |
|  | 3912 | A-6 | R-77 |
|  | 3913 | A-6 | R-78 |
|  | 3914 | A-6 | R-79 |
|  | 3915 | A-7 | R-1 |
|  | 3916 | A-7 | R-2 |
|  | 3917 | A-7 | R-3 |
|  | 3918 | A-7 | R-4 |
|  | 3919 | A-7 | R-5 |

TABLE 13-continued

|  | A | $R^b$, $R^d$ |
|---|---|---|
| 3920 | A-7 | R-7 |
| 3921 | A-7 | R-8 |
| 3922 | A-7 | R-11 |
| 3923 | A-7 | R-13 |
| 3924 | A-7 | R-14 |
| 3925 | A-7 | R-15 |
| 3926 | A-7 | R-18 |
| 3927 | A-7 | R-19 |
| 3928 | A-7 | R-20 |
| 3929 | A-7 | R-21 |
| 3930 | A-7 | R-22 |
| 3931 | A-7 | R-23 |
| 3932 | A-7 | R-26 |
| 3933 | A-7 | R-27 |
| 3934 | A-7 | R-31 |
| 3935 | A-7 | R-37 |
| 3936 | A-7 | R-38 |
| 3937 | A-7 | R-43 |
| 3938 | A-7 | R-44 |
| 3939 | A-7 | R-45 |
| 3940 | A-7 | R-47 |
| 3941 | A-7 | R-51 |
| 3942 | A-7 | R-55 |
| 3943 | A-7 | R-56 |
| 3944 | A-7 | R-57 |
| 3945 | A-7 | R-60 |
| 3946 | A-7 | R-61 |
| 3947 | A-7 | R-62 |
| 3948 | A-7 | R-63 |
| 3949 | A-7 | R-64 |
| 3950 | A-7 | R-65 |
| 3951 | A-7 | R-66 |
| 3952 | A-7 | R-67 |
| 3953 | A-7 | R-68 |
| 3954 | A-7 | R-69 |
| 3955 | A-7 | R-70 |
| 3956 | A-7 | R-71 |
| 3957 | A-7 | R-72 |
| 3958 | A-7 | R-73 |
| 3959 | A-7 | R-74 |
| 3960 | A-7 | R-76 |
| 3961 | A-7 | R-77 |
| 3962 | A-7 | R-78 |
| 3963 | A-7 | R-79 |
| 3964 | A-8 | R-1 |
| 3965 | A-8 | R-2 |
| 3966 | A-8 | R-3 |
| 3967 | A-8 | R-4 |
| 3968 | A-8 | R-5 |
| 3969 | A-8 | R-7 |
| 3970 | A-8 | R-8 |
| 3971 | A-8 | R-11 |
| 3972 | A-8 | R-13 |
| 3973 | A-8 | R-14 |
| 3974 | A-8 | R-15 |
| 3975 | A-8 | R-18 |
| 3976 | A-8 | R-19 |
| 3977 | A-8 | R-20 |
| 3978 | A-8 | R-21 |
| 3979 | A-8 | R-22 |
| 3980 | A-8 | R-23 |
| 3981 | A-8 | R-26 |
| 3982 | A-8 | R-27 |
| 3983 | A-8 | R-31 |
| 3984 | A-8 | R-37 |
| 3985 | A-8 | R-38 |
| 3986 | A-8 | R-43 |
| 3987 | A-8 | R-44 |
| 3988 | A-8 | R-45 |
| 3989 | A-8 | R-47 |
| 3990 | A-8 | R-51 |
| 3991 | A-8 | R-55 |
| 3992 | A-8 | R-56 |
| 3993 | A-8 | R-57 |
| 3994 | A-8 | R-60 |
| 3995 | A-8 | R-61 |
| 3996 | A-8 | R-62 |
| 3997 | A-8 | R-63 |
| 3998 | A-8 | R-64 |
| 3999 | A-8 | R-65 |
| 4000 | A-8 | R-66 |
| 4001 | A-8 | R-67 |
| 4002 | A-8 | R-68 |
| 4003 | A-8 | R-69 |
| 4004 | A-8 | R-70 |
| 4005 | A-8 | R-71 |
| 4006 | A-8 | R-72 |
| 4007 | A-8 | R-73 |
| 4008 | A-8 | R-74 |
| 4009 | A-8 | R-76 |
| 4010 | A-8 | R-77 |
| 4011 | A-8 | R-78 |
| 4012 | A-8 | R-79 |
| 4013 | A-20 | R-1 |
| 4014 | A-20 | R-2 |
| 4015 | A-20 | R-3 |
| 4016 | A-20 | R-4 |
| 4017 | A-20 | R-5 |
| 4018 | A-20 | R-7 |
| 4019 | A-20 | R-8 |
| 4020 | A-20 | R-11 |

TABLE 14

|  |  | A | $R^b$, $R^d$ |
|---|---|---|---|
| Compound | 4021 | A-20 | R-13 |
|  | 4022 | A-20 | R-14 |
|  | 4023 | A-20 | R-15 |
|  | 4024 | A-20 | R-18 |
|  | 4025 | A-20 | R-19 |
|  | 4026 | A-20 | R-20 |
|  | 4027 | A-20 | R-21 |
|  | 4028 | A-20 | R-22 |
|  | 4029 | A-20 | R-23 |
|  | 4030 | A-20 | R-26 |
|  | 4031 | A-20 | R-27 |
|  | 4032 | A-20 | R-31 |
|  | 4033 | A-20 | R-37 |
|  | 4034 | A-20 | R-38 |
|  | 4035 | A-20 | R-43 |
|  | 4036 | A-20 | R-44 |
|  | 4037 | A-20 | R-45 |
|  | 4038 | A-20 | R-47 |
|  | 4039 | A-20 | R-51 |
|  | 4040 | A-20 | R-55 |
|  | 4041 | A-20 | R-56 |
|  | 4042 | A-20 | R-57 |
|  | 4043 | A-20 | R-60 |
|  | 4044 | A-20 | R-61 |
|  | 4045 | A-20 | R-62 |
|  | 4046 | A-20 | R-63 |
|  | 4047 | A-20 | R-64 |
|  | 4048 | A-20 | R-65 |
|  | 4049 | A-20 | R-66 |
|  | 4050 | A-20 | R-67 |
|  | 4051 | A-20 | R-68 |
|  | 4052 | A-20 | R-69 |
|  | 4053 | A-20 | R-70 |
|  | 4054 | A-20 | R-71 |
|  | 4055 | A-20 | R-72 |
|  | 4056 | A-20 | R-73 |
|  | 4057 | A-20 | R-74 |
|  | 4058 | A-20 | R-76 |
|  | 4059 | A-20 | R-77 |
|  | 4060 | A-20 | R-78 |
|  | 4061 | A-20 | R-79 |
|  | 4062 | A-34 | R-1 |
|  | 4063 | A-34 | R-2 |
|  | 4064 | A-34 | R-3 |
|  | 4065 | A-34 | R-4 |
|  | 4066 | A-34 | R-5 |
|  | 4067 | A-34 | R-7 |

TABLE 14-continued

| | A | $R^b, R^d$ |
|---|---|---|
| 4068 | A-34 | R-8 |
| 4069 | A-34 | R-11 |
| 4070 | A-34 | R-13 |
| 4071 | A-34 | R-14 |
| 4072 | A-34 | R-15 |
| 4073 | A-34 | R-18 |
| 4074 | A-34 | R-19 |
| 4075 | A-34 | R-20 |
| 4076 | A-34 | R-21 |
| 4077 | A-34 | R-22 |
| 4078 | A-34 | R-23 |
| 4079 | A-34 | R-26 |
| 4080 | A-34 | R-27 |
| 4081 | A-34 | R-31 |
| 4082 | A-34 | R-37 |
| 4083 | A-34 | R-38 |
| 4084 | A-34 | R-43 |
| 4085 | A-34 | R-44 |
| 4086 | A-34 | R-45 |
| 4087 | A-34 | R-47 |
| 4088 | A-34 | R-51 |
| 4089 | A-34 | R-55 |
| 4090 | A-34 | R-56 |
| 4091 | A-34 | R-57 |
| 4092 | A-34 | R-60 |
| 4093 | A-34 | R-61 |
| 4094 | A-34 | R-62 |
| 4095 | A-34 | R-63 |
| 4096 | A-34 | R-64 |
| 4097 | A-34 | R-65 |
| 4098 | A-34 | R-66 |
| 4099 | A-34 | R-67 |
| 4100 | A-34 | R-68 |
| 4101 | A-34 | R-69 |
| 4102 | A-34 | R-70 |
| 4103 | A-34 | R-71 |
| 4104 | A-34 | R-72 |
| 4105 | A-34 | R-73 |
| 4106 | A-34 | R-74 |
| 4107 | A-34 | R-76 |
| 4108 | A-34 | R-77 |
| 4109 | A-34 | R-78 |
| 4110 | A-34 | R-79 |
| 4111 | A-39 | R-1 |
| 4112 | A-39 | R-2 |
| 4113 | A-39 | R-3 |
| 4114 | A-39 | R-4 |
| 4115 | A-39 | R-5 |
| 4116 | A-39 | R-7 |
| 4117 | A-39 | R-8 |
| 4118 | A-39 | R-11 |
| 4119 | A-39 | R-13 |
| 4120 | A-39 | R-14 |
| 4121 | A-39 | R-15 |
| 4122 | A-39 | R-18 |
| 4123 | A-39 | R-19 |
| 4124 | A-39 | R-20 |
| 4125 | A-39 | R-21 |
| 4126 | A-39 | R-22 |
| 4127 | A-39 | R-23 |
| 4128 | A-39 | R-26 |
| 4129 | A-39 | R-27 |
| 4130 | A-39 | R-31 |
| 4131 | A-39 | R-37 |
| 4132 | A-39 | R-38 |
| 4133 | A-39 | R-43 |
| 4134 | A-39 | R-44 |
| 4135 | A-39 | R-45 |
| 4136 | A-39 | R-47 |
| 4137 | A-39 | R-51 |

TABLE 15

| | | A | $R^b, R^d$ |
|---|---|---|---|
| Compound | 4138 | A-39 | R-55 |
| | 4139 | A-39 | R-56 |
| | 4140 | A-39 | R-57 |
| | 4141 | A-39 | R-60 |
| | 4142 | A-39 | R-61 |
| | 4143 | A-39 | R-62 |
| | 4144 | A-39 | R-63 |
| | 4145 | A-39 | R-64 |
| | 4146 | A-39 | R-65 |
| | 4147 | A-39 | R-66 |
| | 4148 | A-39 | R-67 |
| | 4149 | A-39 | R-68 |
| | 4150 | A-39 | R-69 |
| | 4151 | A-39 | R-70 |
| | 4152 | A-39 | R-71 |
| | 4153 | A-39 | R-72 |
| | 4154 | A-39 | R-73 |
| | 4155 | A-39 | R-74 |
| | 4156 | A-39 | R-76 |
| | 4157 | A-39 | R-77 |
| | 4158 | A-39 | R-78 |
| | 4159 | A-39 | R-79 |
| | 4160 | A-41 | R-1 |
| | 4161 | A-41 | R-2 |
| | 4162 | A-41 | R-3 |
| | 4163 | A-41 | R-4 |
| | 4164 | A-41 | R-5 |
| | 4165 | A-41 | R-7 |
| | 4166 | A-41 | R-8 |
| | 4167 | A-41 | R-11 |
| | 4168 | A-41 | R-13 |
| | 4169 | A-41 | R-14 |
| | 4170 | A-41 | R-15 |
| | 4171 | A-41 | R-18 |
| | 4172 | A-41 | R-19 |
| | 4173 | A-41 | R-20 |
| | 4174 | A-41 | R-21 |
| | 4175 | A-41 | R-22 |
| | 4176 | A-41 | R-23 |
| | 4177 | A-41 | R-26 |
| | 4178 | A-41 | R-27 |
| | 4179 | A-41 | R-31 |
| | 4180 | A-41 | R-37 |
| | 4181 | A-41 | R-38 |
| | 4182 | A-41 | R-43 |
| | 4183 | A-41 | R-44 |
| | 4184 | A-41 | R-45 |
| | 4185 | A-41 | R-47 |
| | 4186 | A-41 | R-51 |
| | 4187 | A-41 | R-55 |
| | 4188 | A-41 | R-56 |
| | 4189 | A-41 | R-57 |
| | 4190 | A-41 | R-60 |
| | 4191 | A-41 | R-61 |
| | 4192 | A-41 | R-62 |
| | 4193 | A-41 | R-63 |
| | 4194 | A-41 | R-64 |
| | 4195 | A-41 | R-65 |
| | 4196 | A-41 | R-66 |
| | 4197 | A-41 | R-67 |
| | 4198 | A-41 | R-68 |
| | 4199 | A-41 | R-69 |
| | 4200 | A-41 | R-70 |
| | 4201 | A-41 | R-71 |
| | 4202 | A-41 | R-72 |
| | 4203 | A-41 | R-73 |
| | 4204 | A-41 | R-74 |
| | 4205 | A-41 | R-76 |
| | 4206 | A-41 | R-77 |
| | 4207 | A-41 | R-78 |
| | 4208 | A-41 | R-79 |
| | 4209 | A-42 | R-1 |
| | 4210 | A-42 | R-2 |
| | 4211 | A-42 | R-3 |
| | 4212 | A-42 | R-4 |
| | 4213 | A-42 | R-5 |
| | 4214 | A-42 | R-7 |
| | 4215 | A-42 | R-8 |

TABLE 15-continued

| | A | $R^b$, $R^d$ |
|---|---|---|
| 4216 | A-42 | R-11 |
| 4217 | A-42 | R-13 |
| 4218 | A-42 | R-14 |
| 4219 | A-42 | R-15 |
| 4220 | A-42 | R-18 |
| 4221 | A-42 | R-19 |
| 4222 | A-42 | R-20 |
| 4223 | A-42 | R-21 |
| 4224 | A-42 | R-22 |
| 4225 | A-42 | R-23 |
| 4226 | A-42 | R-26 |
| 4227 | A-42 | R-27 |
| 4228 | A-42 | R-31 |
| 4229 | A-42 | R-37 |
| 4230 | A-42 | R-38 |
| 4231 | A-42 | R-43 |
| 4232 | A-42 | R-44 |
| 4233 | A-42 | R-45 |
| 4234 | A-42 | R-47 |
| 4235 | A-42 | R-51 |
| 4236 | A-42 | R-55 |
| 4237 | A-42 | R-56 |
| 4238 | A-42 | R-57 |
| 4239 | A-42 | R-60 |
| 4240 | A-42 | R-61 |
| 4241 | A-42 | R-62 |
| 4242 | A-42 | R-63 |
| 4243 | A-42 | R-64 |
| 4244 | A-42 | R-65 |
| 4245 | A-42 | R-66 |
| 4246 | A-42 | R-67 |
| 4247 | A-42 | R-68 |
| 4248 | A-42 | R-69 |
| 4249 | A-42 | R-70 |
| 4250 | A-42 | R-71 |
| 4251 | A-42 | R-72 |
| 4252 | A-42 | R-73 |
| 4253 | A-42 | R-74 |
| 4254 | A-42 | R-76 |

TABLE 16

| | | A | $R^b$, $R^d$ |
|---|---|---|---|
| Compound | 4255 | A-42 | R-77 |
| | 4256 | A-42 | R-78 |
| | 4257 | A-42 | R-79 |
| | 4258 | A-45 | R-1 |
| | 4259 | A-45 | R-2 |
| | 4260 | A-45 | R-3 |
| | 4261 | A-45 | R-4 |
| | 4262 | A-45 | R-5 |
| | 4263 | A-45 | R-7 |
| | 4264 | A-45 | R-8 |
| | 4265 | A-45 | R-11 |
| | 4266 | A-45 | R-13 |
| | 4267 | A-45 | R-14 |
| | 4268 | A-45 | R-15 |
| | 4269 | A-45 | R-18 |
| | 4270 | A-45 | R-19 |
| | 4271 | A-45 | R-20 |
| | 4272 | A-45 | R-21 |
| | 4273 | A-45 | R-22 |
| | 4274 | A-45 | R-23 |
| | 4275 | A-45 | R-26 |
| | 4276 | A-45 | R-27 |
| | 4277 | A-45 | R-31 |
| | 4278 | A-45 | R-37 |
| | 4279 | A-45 | R-38 |
| | 4280 | A-45 | R-43 |
| | 4281 | A-45 | R-44 |
| | 4282 | A-45 | R-45 |
| | 4283 | A-45 | R-47 |
| | 4284 | A-45 | R-51 |
| | 4285 | A-45 | R-55 |

TABLE 16-continued

| | A | $R^b$, $R^d$ |
|---|---|---|
| 4286 | A-45 | R-56 |
| 4287 | A-45 | R-57 |
| 4288 | A-45 | R-60 |
| 4289 | A-45 | R-61 |
| 4290 | A-45 | R-62 |
| 4291 | A-45 | R-63 |
| 4292 | A-45 | R-64 |
| 4293 | A-45 | R-65 |
| 4294 | A-45 | R-66 |
| 4295 | A-45 | R-67 |
| 4296 | A-45 | R-68 |
| 4297 | A-45 | R-69 |
| 4298 | A-45 | R-70 |
| 4299 | A-45 | R-71 |
| 4300 | A-45 | R-72 |
| 4301 | A-45 | R-73 |
| 4302 | A-45 | R-74 |
| 4303 | A-45 | R-76 |
| 4304 | A-45 | R-77 |
| 4305 | A-45 | R-78 |
| 4306 | A-45 | R-79 |
| 4307 | A-48 | R-1 |
| 4308 | A-48 | R-2 |
| 4309 | A-48 | R-3 |
| 4310 | A-48 | R-4 |
| 4311 | A-48 | R-5 |
| 4312 | A-48 | R-7 |
| 4313 | A-48 | R-8 |
| 4314 | A-48 | R-11 |
| 4315 | A-48 | R-13 |
| 4316 | A-48 | R-14 |
| 4317 | A-48 | R-15 |
| 4318 | A-48 | R-18 |
| 4319 | A-48 | R-19 |
| 4320 | A-48 | R-20 |
| 4321 | A-48 | R-21 |
| 4322 | A-48 | R-22 |
| 4323 | A-48 | R-23 |
| 4324 | A-48 | R-26 |
| 4325 | A-48 | R-27 |
| 4326 | A-48 | R-31 |
| 4327 | A-48 | R-37 |
| 4328 | A-48 | R-38 |
| 4329 | A-48 | R-43 |
| 4330 | A-48 | R-44 |
| 4331 | A-48 | R-45 |
| 4332 | A-48 | R-47 |
| 4333 | A-48 | R-51 |
| 4334 | A-48 | R-55 |
| 4335 | A-48 | R-56 |
| 4336 | A-48 | R-57 |
| 4337 | A-48 | R-60 |
| 4338 | A-48 | R-61 |
| 4339 | A-48 | R-62 |
| 4340 | A-48 | R-63 |
| 4341 | A-48 | R-64 |
| 4342 | A-48 | R-65 |
| 4343 | A-48 | R-66 |
| 4344 | A-48 | R-67 |
| 4345 | A-48 | R-68 |
| 4346 | A-48 | R-69 |
| 4347 | A-48 | R-70 |
| 4348 | A-48 | R-71 |
| 4349 | A-48 | R-72 |
| 4350 | A-48 | R-73 |
| 4351 | A-48 | R-74 |
| 4352 | A-48 | R-76 |
| 4353 | A-48 | R-77 |
| 4354 | A-48 | R-78 |
| 4355 | A-48 | R-79 |

TABLE 17

|  |  | A | $R^b$, $R^d$ |
|---|---|---|---|
| Compound | 4356 | A-1 | R-1 |
|  | 4357 | A-1 | R-2 |
|  | 4358 | A-1 | R-3 |
|  | 4359 | A-1 | R-4 |
|  | 4360 | A-1 | R-5 |
|  | 4361 | A-1 | R-7 |
|  | 4362 | A-1 | R-8 |
|  | 4363 | A-1 | R-11 |
|  | 4364 | A-1 | R-13 |
|  | 4365 | A-1 | R-14 |
|  | 4366 | A-1 | R-15 |
|  | 4367 | A-1 | R-18 |
|  | 4368 | A-1 | R-19 |
|  | 4369 | A-1 | R-20 |
|  | 4370 | A-1 | R-21 |
|  | 4371 | A-1 | R-22 |
|  | 4372 | A-1 | R-23 |
|  | 4373 | A-1 | R-26 |
|  | 4374 | A-1 | R-27 |
|  | 4375 | A-1 | R-31 |
|  | 4376 | A-1 | R-37 |
|  | 4377 | A-1 | R-38 |
|  | 4378 | A-1 | R-43 |
|  | 4379 | A-1 | R-44 |
|  | 4380 | A-1 | R-45 |
|  | 4381 | A-1 | R-47 |
|  | 4382 | A-1 | R-51 |
|  | 4383 | A-1 | R-55 |
|  | 4384 | A-1 | R-56 |
|  | 4385 | A-1 | R-57 |
|  | 4386 | A-1 | R-60 |
|  | 4387 | A-1 | R-61 |
|  | 4388 | A-1 | R-62 |
|  | 4389 | A-1 | R-63 |
|  | 4390 | A-1 | R-64 |
|  | 4391 | A-1 | R-65 |
|  | 4392 | A-1 | R-66 |
|  | 4393 | A-1 | R-67 |
|  | 4394 | A-1 | R-68 |
|  | 4395 | A-1 | R-69 |
|  | 4396 | A-1 | R-70 |
|  | 4397 | A-1 | R-71 |
|  | 4398 | A-1 | R-72 |
|  | 4399 | A-1 | R-73 |
|  | 4400 | A-1 | R-74 |
|  | 4401 | A-1 | R-76 |
|  | 4402 | A-1 | R-77 |
|  | 4403 | A-1 | R-78 |
|  | 4404 | A-1 | R-79 |
|  | 4405 | A-2 | R-1 |
|  | 4406 | A-2 | R-2 |
|  | 4407 | A-2 | R-3 |
|  | 4408 | A-2 | R-4 |
|  | 4409 | A-2 | R-5 |
|  | 4410 | A-2 | R-7 |
|  | 4411 | A-2 | R-8 |
|  | 4412 | A-2 | R-11 |
|  | 4413 | A-2 | R-13 |
|  | 4414 | A-2 | R-14 |
|  | 4415 | A-2 | R-15 |
|  | 4416 | A-2 | R-18 |
|  | 4417 | A-2 | R-19 |
|  | 4418 | A-2 | R-20 |
|  | 4419 | A-2 | R-21 |
|  | 4420 | A-2 | R-22 |
|  | 4421 | A-2 | R-23 |
|  | 4422 | A-2 | R-26 |
|  | 4423 | A-2 | R-27 |
|  | 4424 | A-2 | R-31 |
|  | 4425 | A-2 | R-37 |
|  | 4426 | A-2 | R-38 |
|  | 4427 | A-2 | R-43 |
|  | 4428 | A-2 | R-44 |
|  | 4429 | A-2 | R-45 |
|  | 4430 | A-2 | R-47 |
|  | 4431 | A-2 | R-51 |
|  | 4432 | A-2 | R-55 |
|  | 4433 | A-2 | R-56 |
|  | 4434 | A-2 | R-57 |
|  | 4435 | A-2 | R-60 |
|  | 4436 | A-2 | R-61 |
|  | 4437 | A-2 | R-62 |
|  | 4438 | A-2 | R-63 |
|  | 4439 | A-2 | R-64 |
|  | 4440 | A-2 | R-65 |
|  | 4441 | A-2 | R-66 |
|  | 4442 | A-2 | R-67 |
|  | 4443 | A-2 | R-68 |
|  | 4444 | A-2 | R-69 |
|  | 4445 | A-2 | R-70 |
|  | 4446 | A-2 | R-71 |
|  | 4447 | A-2 | R-72 |
|  | 4448 | A-2 | R-73 |
|  | 4449 | A-2 | R-74 |
|  | 4450 | A-2 | R-76 |
|  | 4451 | A-2 | R-77 |
|  | 4452 | A-2 | R-78 |
|  | 4453 | A-2 | R-79 |
|  | 4454 | A-4 | R-1 |
|  | 4455 | A-4 | R-2 |
|  | 4456 | A-4 | R-3 |
|  | 4457 | A-4 | R-4 |
|  | 4458 | A-4 | R-5 |
|  | 4459 | A-4 | R-7 |
|  | 4460 | A-4 | R-8 |
|  | 4461 | A-4 | R-11 |
|  | 4462 | A-4 | R-13 |
|  | 4463 | A-4 | R-14 |
|  | 4464 | A-4 | R-15 |
|  | 4465 | A-4 | R-18 |
|  | 4466 | A-4 | R-19 |
|  | 4467 | A-4 | R-20 |
|  | 4468 | A-4 | R-21 |
|  | 4469 | A-4 | R-22 |
|  | 4470 | A-4 | R-23 |
|  | 4471 | A-4 | R-26 |
|  | 4472 | A-4 | R-27 |

TABLE 18

|  |  | A | $R^b$, $R^d$ |
|---|---|---|---|
| Compound | 4473 | A-4 | R-31 |
|  | 4474 | A-4 | R-37 |
|  | 4475 | A-4 | R-38 |
|  | 4476 | A-4 | R-43 |
|  | 4477 | A-4 | R-44 |
|  | 4478 | A-4 | R-45 |
|  | 4479 | A-4 | R-47 |
|  | 4480 | A-4 | R-51 |
|  | 4481 | A-4 | R-55 |
|  | 4482 | A-4 | R-56 |
|  | 4483 | A-4 | R-57 |
|  | 4484 | A-4 | R-60 |
|  | 4485 | A-4 | R-61 |
|  | 4486 | A-4 | R-62 |
|  | 4487 | A-4 | R-63 |
|  | 4488 | A-4 | R-64 |
|  | 4489 | A-4 | R-65 |
|  | 4490 | A-4 | R-66 |
|  | 4491 | A-4 | R-67 |
|  | 4492 | A-4 | R-68 |
|  | 4493 | A-4 | R-69 |
|  | 4494 | A-4 | R-70 |
|  | 4495 | A-4 | R-71 |
|  | 4496 | A-4 | R-72 |
|  | 4497 | A-4 | R-73 |
|  | 4498 | A-4 | R-74 |
|  | 4499 | A-4 | R-76 |
|  | 4500 | A-4 | R-77 |
|  | 4501 | A-4 | R-78 |
|  | 4502 | A-4 | R-79 |
|  | 4503 | A-5 | R-1 |

TABLE 18-continued

| | A | $R^b, R^d$ |
|---|---|---|
| 4504 | A-5 | R-2 |
| 4505 | A-5 | R-3 |
| 4506 | A-5 | R-4 |
| 4507 | A-5 | R-5 |
| 4508 | A-5 | R-7 |
| 4509 | A-5 | R-8 |
| 4510 | A-5 | R-11 |
| 4511 | A-5 | R-13 |
| 4512 | A-5 | R-14 |
| 4513 | A-5 | R-15 |
| 4514 | A-5 | R-18 |
| 4515 | A-5 | R-19 |
| 4516 | A-5 | R-20 |
| 4517 | A-5 | R-21 |
| 4518 | A-5 | R-22 |
| 4519 | A-5 | R-23 |
| 4520 | A-5 | R-26 |
| 4521 | A-5 | R-27 |
| 4522 | A-5 | R-31 |
| 4523 | A-5 | R-37 |
| 4524 | A-5 | R-38 |
| 4525 | A-5 | R-43 |
| 4526 | A-5 | R-44 |
| 4527 | A-5 | R-45 |
| 4528 | A-5 | R-47 |
| 4529 | A-5 | R-51 |
| 4530 | A-5 | R-55 |
| 4531 | A-5 | R-56 |
| 4532 | A-5 | R-57 |
| 4533 | A-5 | R-60 |
| 4534 | A-5 | R-61 |
| 4535 | A-5 | R-62 |
| 4536 | A-5 | R-63 |
| 4537 | A-5 | R-64 |
| 4538 | A-5 | R-65 |
| 4539 | A-5 | R-66 |
| 4540 | A-5 | R-67 |
| 4541 | A-5 | R-68 |
| 4542 | A-5 | R-69 |
| 4543 | A-5 | R-70 |
| 4544 | A-5 | R-71 |
| 4545 | A-5 | R-72 |
| 4546 | A-5 | R-73 |
| 4547 | A-5 | R-74 |
| 4548 | A-5 | R-76 |
| 4549 | A-5 | R-77 |
| 4550 | A-5 | R-78 |
| 4551 | A-5 | R-79 |
| 4552 | A-6 | R-1 |
| 4553 | A-6 | R-2 |
| 4554 | A-6 | R-3 |
| 4555 | A-6 | R-4 |
| 4556 | A-6 | R-5 |
| 4557 | A-6 | R-7 |
| 4558 | A-6 | R-8 |
| 4559 | A-6 | R-11 |
| 4560 | A-6 | R-13 |
| 4561 | A-6 | R-14 |
| 4562 | A-6 | R-15 |
| 4563 | A-6 | R-18 |
| 4564 | A-6 | R-19 |
| 4565 | A-6 | R-20 |
| 4566 | A-6 | R-21 |
| 4567 | A-6 | R-22 |
| 4568 | A-6 | R-23 |
| 4569 | A-6 | R-26 |
| 4570 | A-6 | R-27 |
| 4571 | A-6 | R-31 |
| 4572 | A-6 | R-37 |
| 4573 | A-6 | R-38 |
| 4574 | A-6 | R-43 |
| 4575 | A-6 | R-44 |
| 4576 | A-6 | R-45 |
| 4577 | A-6 | R-47 |
| 4578 | A-6 | R-51 |
| 4579 | A-6 | R-55 |
| 4580 | A-6 | R-56 |
| 4581 | A-6 | R-57 |

TABLE 18-continued

| | A | $R^b, R^d$ |
|---|---|---|
| 4582 | A-6 | R-60 |
| 4583 | A-6 | R-61 |
| 4584 | A-6 | R-62 |
| 4585 | A-6 | R-63 |
| 4586 | A-6 | R-64 |
| 4587 | A-6 | R-65 |
| 4588 | A-6 | R-66 |
| 4589 | A-6 | R-67 |

TABLE 19

| Compound | A | $R^b, R^d$ |
|---|---|---|
| 4590 | A-6 | R-68 |
| 4591 | A-6 | R-69 |
| 4592 | A-6 | R-70 |
| 4593 | A-6 | R-71 |
| 4594 | A-6 | R-72 |
| 4595 | A-6 | R-73 |
| 4596 | A-6 | R-74 |
| 4597 | A-6 | R-76 |
| 4598 | A-6 | R-77 |
| 4599 | A-6 | R-78 |
| 4600 | A-6 | R-79 |
| 4601 | A-7 | R-1 |
| 4602 | A-7 | R-2 |
| 4603 | A-7 | R-3 |
| 4604 | A-7 | R-4 |
| 4605 | A-7 | R-5 |
| 4606 | A-7 | R-7 |
| 4607 | A-7 | R-8 |
| 4608 | A-7 | R-11 |
| 4609 | A-7 | R-13 |
| 4610 | A-7 | R-14 |
| 4611 | A-7 | R-15 |
| 4612 | A-7 | R-18 |
| 4613 | A-7 | R-19 |
| 4614 | A-7 | R-20 |
| 4615 | A-7 | R-21 |
| 4616 | A-7 | R-22 |
| 4617 | A-7 | R-23 |
| 4618 | A-7 | R-26 |
| 4619 | A-7 | R-27 |
| 4620 | A-7 | R-31 |
| 4621 | A-7 | R-37 |
| 4622 | A-7 | R-38 |
| 4623 | A-7 | R-43 |
| 4624 | A-7 | R-44 |
| 4625 | A-7 | R-45 |
| 4626 | A-7 | R-47 |
| 4627 | A-7 | R-51 |
| 4628 | A-7 | R-55 |
| 4629 | A-7 | R-56 |
| 4630 | A-7 | R-57 |
| 4631 | A-7 | R-60 |
| 4632 | A-7 | R-61 |
| 4633 | A-7 | R-62 |
| 4634 | A-7 | R-63 |
| 4635 | A-7 | R-64 |
| 4636 | A-7 | R-65 |
| 4637 | A-7 | R-66 |
| 4638 | A-7 | R-67 |
| 4639 | A-7 | R-68 |
| 4640 | A-7 | R-69 |
| 4641 | A-7 | R-70 |
| 4642 | A-7 | R-71 |
| 4643 | A-7 | R-72 |
| 4644 | A-7 | R-73 |
| 4645 | A-7 | R-74 |
| 4646 | A-7 | R-76 |
| 4647 | A-7 | R-77 |
| 4648 | A-7 | R-78 |
| 4649 | A-7 | R-79 |
| 4650 | A-8 | R-1 |
| 4651 | A-8 | R-2 |

TABLE 19-continued

| Compound | A | $R^b$, $R^d$ |
|---|---|---|
| 4652 | A-8 | R-3 |
| 4653 | A-8 | R-4 |
| 4654 | A-8 | R-5 |
| 4655 | A-8 | R-7 |
| 4656 | A-8 | R-8 |
| 4657 | A-8 | R-11 |
| 4658 | A-8 | R-13 |
| 4659 | A-8 | R-14 |
| 4660 | A-8 | R-15 |
| 4661 | A-8 | R-18 |
| 4662 | A-8 | R-19 |
| 4663 | A-8 | R-20 |
| 4664 | A-8 | R-21 |
| 4665 | A-8 | R-22 |
| 4666 | A-8 | R-23 |
| 4667 | A-8 | R-26 |
| 4668 | A-8 | R-27 |
| 4669 | A-8 | R-31 |
| 4670 | A-8 | R-37 |
| 4671 | A-8 | R-38 |
| 4672 | A-8 | R-43 |
| 4673 | A-8 | R-44 |
| 4674 | A-8 | R-45 |
| 4675 | A-8 | R-47 |
| 4676 | A-8 | R-51 |
| 4677 | A-8 | R-55 |
| 4678 | A-8 | R-56 |
| 4679 | A-8 | R-57 |
| 4680 | A-8 | R-60 |
| 4681 | A-8 | R-61 |
| 4682 | A-8 | R-62 |
| 4683 | A-8 | R-63 |
| 4684 | A-8 | R-64 |
| 4685 | A-8 | R-65 |
| 4686 | A-8 | R-66 |
| 4687 | A-8 | R-67 |
| 4688 | A-8 | R-68 |
| 4689 | A-8 | R-69 |
| 4690 | A-8 | R-70 |
| 4691 | A-8 | R-71 |
| 4692 | A-8 | R-72 |
| 4693 | A-8 | R-73 |
| 4694 | A-8 | R-74 |
| 4695 | A-8 | R-76 |
| 4696 | A-8 | R-77 |
| 4697 | A-8 | R-78 |
| 4698 | A-8 | R-79 |
| 4699 | A-20 | R-1 |
| 4700 | A-20 | R-2 |
| 4701 | A-20 | R-3 |
| 4702 | A-20 | R-4 |
| 4703 | A-20 | R-5 |
| 4704 | A-20 | R-7 |
| 4705 | A-20 | R-8 |
| 4706 | A-20 | R-11 |

TABLE 20

| Compound | A | $R^b$, $R^d$ |
|---|---|---|
| 4707 | A-20 | R-13 |
| 4708 | A-20 | R-14 |
| 4709 | A-20 | R-15 |
| 4710 | A-20 | R-18 |
| 4711 | A-20 | R-19 |
| 4712 | A-20 | R-20 |
| 4713 | A-20 | R-21 |
| 4714 | A-20 | R-22 |
| 4715 | A-20 | R-23 |
| 4716 | A-20 | R-26 |
| 4717 | A-20 | R-27 |
| 4718 | A-20 | R-31 |
| 4719 | A-20 | R-37 |
| 4720 | A-20 | R-38 |
| 4721 | A-20 | R-43 |

TABLE 20-continued

| Compound | A | $R^b$, $R^d$ |
|---|---|---|
| 4722 | A-20 | R-44 |
| 4723 | A-20 | R-45 |
| 4724 | A-20 | R-47 |
| 4725 | A-20 | R-51 |
| 4726 | A-20 | R-55 |
| 4727 | A-20 | R-56 |
| 4728 | A-20 | R-57 |
| 4729 | A-20 | R-60 |
| 4730 | A-20 | R-61 |
| 4731 | A-20 | R-62 |
| 4732 | A-20 | R-63 |
| 4733 | A-20 | R-64 |
| 4734 | A-20 | R-65 |
| 4735 | A-20 | R-66 |
| 4736 | A-20 | R-67 |
| 4737 | A-20 | R-68 |
| 4738 | A-20 | R-69 |
| 4739 | A-20 | R-70 |
| 4740 | A-20 | R-71 |
| 4741 | A-20 | R-72 |
| 4742 | A-20 | R-73 |
| 4743 | A-20 | R-74 |
| 4744 | A-20 | R-76 |
| 4745 | A-20 | R-77 |
| 4746 | A-20 | R-78 |
| 4747 | A-20 | R-79 |
| 4748 | A-34 | R-1 |
| 4749 | A-34 | R-2 |
| 4750 | A-34 | R-3 |
| 4751 | A-34 | R-4 |
| 4752 | A-34 | R-5 |
| 4753 | A-34 | R-7 |
| 4754 | A-34 | R-8 |
| 4755 | A-34 | R-11 |
| 4756 | A-34 | R-13 |
| 4757 | A-34 | R-14 |
| 4758 | A-34 | R-15 |
| 4759 | A-34 | R-18 |
| 4760 | A-34 | R-19 |
| 4761 | A-34 | R-20 |
| 4762 | A-34 | R-21 |
| 4763 | A-34 | R-22 |
| 4764 | A-34 | R-23 |
| 4765 | A-34 | R-26 |
| 4766 | A-34 | R-27 |
| 4767 | A-34 | R-31 |
| 4768 | A-34 | R-37 |
| 4769 | A-34 | R-38 |
| 4770 | A-34 | R-43 |
| 4771 | A-34 | R-44 |
| 4772 | A-34 | R-45 |
| 4773 | A-34 | R-47 |
| 4774 | A-34 | R-51 |
| 4775 | A-34 | R-55 |
| 4776 | A-34 | R-56 |
| 4777 | A-34 | R-57 |
| 4778 | A-34 | R-60 |
| 4779 | A-34 | R-61 |
| 4780 | A-34 | R-62 |
| 4781 | A-34 | R-63 |
| 4782 | A-34 | R-64 |
| 4783 | A-34 | R-65 |
| 4784 | A-34 | R-66 |
| 4785 | A-34 | R-67 |
| 4786 | A-34 | R-68 |
| 4787 | A-34 | R-69 |
| 4788 | A-34 | R-70 |
| 4789 | A-34 | R-71 |
| 4790 | A-34 | R-72 |
| 4791 | A-34 | R-73 |
| 4792 | A-34 | R-74 |
| 4793 | A-34 | R-76 |
| 4794 | A-34 | R-77 |
| 4795 | A-34 | R-78 |
| 4796 | A-34 | R-79 |
| 4797 | A-39 | R-1 |
| 4798 | A-39 | R-2 |
| 4799 | A-39 | R-3 |

TABLE 20-continued

| Compound | A | $R^b$, $R^d$ |
|---|---|---|
| 4800 | A-39 | R-4 |
| 4801 | A-39 | R-5 |
| 4802 | A-39 | R-7 |
| 4803 | A-39 | R-8 |
| 4804 | A-39 | R-11 |
| 4805 | A-39 | R-13 |
| 4806 | A-39 | R-14 |
| 4807 | A-39 | R-15 |
| 4808 | A-39 | R-18 |
| 4809 | A-39 | R-19 |
| 4810 | A-39 | R-20 |
| 4811 | A-39 | R-21 |
| 4812 | A-39 | R-22 |
| 4813 | A-39 | R-23 |
| 4814 | A-39 | R-26 |
| 4815 | A-39 | R-27 |
| 4816 | A-39 | R-31 |
| 4817 | A-39 | R-37 |
| 4818 | A-39 | R-38 |
| 4819 | A-39 | R-43 |
| 4820 | A-39 | R-44 |
| 4821 | A-39 | R-45 |
| 4822 | A-39 | R-47 |
| 4823 | A-39 | R-51 |

TABLE 21

| Compound | A | $R^b$, $R^d$ |
|---|---|---|
| 4824 | A-39 | R-55 |
| 4825 | A-39 | R-56 |
| 4826 | A-39 | R-57 |
| 4827 | A-39 | R-60 |
| 4828 | A-39 | R-61 |
| 4829 | A-39 | R-62 |
| 4830 | A-39 | R-63 |
| 4831 | A-39 | R-64 |
| 4832 | A-39 | R-65 |
| 4833 | A-39 | R-66 |
| 4834 | A-39 | R-67 |
| 4835 | A-39 | R-68 |
| 4836 | A-39 | R-69 |
| 4837 | A-39 | R-70 |
| 4838 | A-39 | R-71 |
| 4839 | A-39 | R-72 |
| 4840 | A-39 | R-73 |
| 4841 | A-39 | R-74 |
| 4842 | A-39 | R-76 |
| 4843 | A-39 | R-77 |
| 4844 | A-39 | R-78 |
| 4845 | A-39 | R-79 |
| 4846 | A-41 | R-1 |
| 4847 | A-41 | R-2 |
| 4848 | A-41 | R-3 |
| 4849 | A-41 | R-4 |
| 4850 | A-41 | R-5 |
| 4851 | A-41 | R-7 |
| 4852 | A-41 | R-8 |
| 4853 | A-41 | R-11 |
| 4854 | A-41 | R-13 |
| 4855 | A-41 | R-14 |
| 4856 | A-41 | R-15 |
| 4857 | A-41 | R-18 |
| 4858 | A-41 | R-19 |
| 4859 | A-41 | R-20 |
| 4860 | A-41 | R-21 |
| 4861 | A-41 | R-22 |
| 4862 | A-41 | R-23 |
| 4863 | A-41 | R-26 |
| 4864 | A-41 | R-27 |
| 4865 | A-41 | R-31 |
| 4866 | A-41 | R-37 |
| 4867 | A-41 | R-38 |
| 4868 | A-41 | R-43 |
| 4869 | A-41 | R-44 |

TABLE 21-continued

| Compound | A | $R^b$, $R^d$ |
|---|---|---|
| 4870 | A-41 | R-45 |
| 4871 | A-41 | R-47 |
| 4872 | A-41 | R-51 |
| 4873 | A-41 | R-55 |
| 4874 | A-41 | R-56 |
| 4875 | A-41 | R-57 |
| 4876 | A-41 | R-60 |
| 4877 | A-41 | R-61 |
| 4878 | A-41 | R-62 |
| 4879 | A-41 | R-63 |
| 4880 | A-41 | R-64 |
| 4881 | A-41 | R-65 |
| 4882 | A-41 | R-66 |
| 4883 | A-41 | R-67 |
| 4884 | A-41 | R-68 |
| 4885 | A-41 | R-69 |
| 4886 | A-41 | R-70 |
| 4887 | A-41 | R-71 |
| 4888 | A-41 | R-72 |
| 4889 | A-41 | R-73 |
| 4890 | A-41 | R-74 |
| 4891 | A-41 | R-76 |
| 4892 | A-41 | R-77 |
| 4893 | A-41 | R-78 |
| 4894 | A-41 | R-79 |
| 4895 | A-42 | R-1 |
| 4896 | A-42 | R-2 |
| 4897 | A-42 | R-3 |
| 4898 | A-42 | R-4 |
| 4899 | A-42 | R-5 |
| 4900 | A-42 | R-7 |
| 4901 | A-42 | R-8 |
| 4902 | A-42 | R-11 |
| 4903 | A-42 | R-13 |
| 4904 | A-42 | R-14 |
| 4905 | A-42 | R-15 |
| 4906 | A-42 | R-18 |
| 4907 | A-42 | R-19 |
| 4908 | A-42 | R-20 |
| 4909 | A-42 | R-21 |
| 4910 | A-42 | R-22 |
| 4911 | A-42 | R-23 |
| 4912 | A-42 | R-26 |
| 4913 | A-42 | R-27 |
| 4914 | A-42 | R-31 |
| 4915 | A-42 | R-37 |
| 4916 | A-42 | R-38 |
| 4917 | A-42 | R-43 |
| 4918 | A-42 | R-44 |
| 4919 | A-42 | R-45 |
| 4920 | A-42 | R-47 |
| 4921 | A-42 | R-51 |
| 4922 | A-42 | R-55 |
| 4923 | A-42 | R-56 |
| 4924 | A-42 | R-57 |
| 4925 | A-42 | R-60 |
| 4926 | A-42 | R-61 |
| 4927 | A-42 | R-62 |
| 4928 | A-42 | R-63 |
| 4929 | A-42 | R-64 |
| 4930 | A-42 | R-65 |
| 4931 | A-42 | R-66 |
| 4932 | A-42 | R-67 |
| 4933 | A-42 | R-68 |
| 4934 | A-42 | R-69 |
| 4935 | A-42 | R-70 |
| 4936 | A-42 | R-71 |
| 4937 | A-42 | R-72 |
| 4938 | A-42 | R-73 |
| 4939 | A-42 | R-74 |
| 4940 | A-42 | R-76 |

TABLE 22

| Compound | A | $R^b$, $R^d$ |
|---|---|---|
| 4941 | A-42 | R-77 |
| 4942 | A-42 | R-78 |
| 4943 | A-42 | R-79 |
| 4944 | A-45 | R-1 |
| 4945 | A-45 | R-2 |
| 4946 | A-45 | R-3 |
| 4947 | A-45 | R-4 |
| 4948 | A-45 | R-5 |
| 4949 | A-45 | R-7 |
| 4950 | A-45 | R-8 |
| 4951 | A-45 | R-11 |
| 4952 | A-45 | R-13 |
| 4953 | A-45 | R-14 |
| 4954 | A-45 | R-15 |
| 4955 | A-45 | R-18 |
| 4956 | A-45 | R-19 |
| 4957 | A-45 | R-20 |
| 4958 | A-45 | R-21 |
| 4959 | A-45 | R-22 |
| 4960 | A-45 | R-23 |
| 4961 | A-45 | R-26 |
| 4962 | A-45 | R-27 |
| 4963 | A-45 | R-31 |
| 4964 | A-45 | R-37 |
| 4965 | A-45 | R-38 |
| 4966 | A-45 | R-43 |
| 4967 | A-45 | R-44 |
| 4968 | A-45 | R-45 |
| 4969 | A-45 | R-47 |
| 4970 | A-45 | R-51 |
| 4971 | A-45 | R-55 |
| 4972 | A-45 | R-56 |
| 4973 | A-45 | R-57 |
| 4974 | A-45 | R-60 |
| 4975 | A-45 | R-61 |
| 4976 | A-45 | R-62 |
| 4977 | A-45 | R-63 |
| 4978 | A-45 | R-64 |
| 4979 | A-45 | R-65 |
| 4980 | A-45 | R-66 |
| 4981 | A-45 | R-67 |
| 4982 | A-45 | R-68 |
| 4983 | A-45 | R-69 |
| 4984 | A-45 | R-70 |
| 4985 | A-45 | R-71 |
| 4986 | A-45 | R-72 |
| 4987 | A-45 | R-73 |
| 4988 | A-45 | R-74 |
| 4989 | A-45 | R-76 |
| 4990 | A-45 | R-77 |
| 4991 | A-45 | R-78 |
| 4992 | A-45 | R-79 |
| 4993 | A-48 | R-1 |
| 4994 | A-48 | R-2 |
| 4995 | A-48 | R-3 |
| 4996 | A-48 | R-4 |
| 4997 | A-48 | R-5 |
| 4998 | A-48 | R-7 |
| 4999 | A-48 | R-8 |
| 5000 | A-48 | R-11 |
| 5001 | A-48 | R-13 |
| 5002 | A-48 | R-14 |
| 5003 | A-48 | R-15 |
| 5004 | A-48 | R-18 |
| 5005 | A-48 | R-19 |
| 5006 | A-48 | R-20 |
| 5007 | A-48 | R-21 |
| 5008 | A-48 | R-22 |
| 5009 | A-48 | R-23 |
| 5010 | A-48 | R-26 |
| 5011 | A-48 | R-27 |
| 5012 | A-48 | R-31 |
| 5013 | A-48 | R-37 |
| 5014 | A-48 | R-38 |
| 5015 | A-48 | R-43 |
| 5016 | A-48 | R-44 |
| 5017 | A-48 | R-45 |
| 5018 | A-48 | R-47 |
| 5019 | A-48 | R-51 |
| 5020 | A-48 | R-55 |
| 5021 | A-48 | R-56 |
| 5022 | A-48 | R-57 |
| 5023 | A-48 | R-60 |
| 5024 | A-48 | R-61 |
| 5025 | A-48 | R-62 |
| 5026 | A-48 | R-63 |
| 5027 | A-48 | R-64 |
| 5028 | A-48 | R-65 |
| 5029 | A-48 | R-66 |
| 5030 | A-48 | R-67 |
| 5031 | A-48 | R-68 |
| 5032 | A-48 | R-69 |
| 5033 | A-48 | R-70 |
| 5034 | A-48 | R-71 |
| 5035 | A-48 | R-72 |
| 5036 | A-48 | R-73 |
| 5037 | A-48 | R-74 |
| 5038 | A-48 | R-76 |
| 5039 | A-48 | R-77 |
| 5040 | A-48 | R-78 |
| 5041 | A-48 | R-79 |

TABLE 23

| Compound | A | $R^b$, $R^d$ |
|---|---|---|
| 5042 | A-1 | R-1 |
| 5043 | A-1 | R-2 |
| 5044 | A-1 | R-3 |
| 5045 | A-1 | R-4 |
| 5046 | A-1 | R-5 |
| 5047 | A-1 | R-7 |
| 5048 | A-1 | R-8 |
| 5049 | A-1 | R-11 |
| 5050 | A-1 | R-13 |
| 5051 | A-1 | R-14 |
| 5052 | A-1 | R-15 |
| 5053 | A-1 | R-18 |
| 5054 | A-1 | R-19 |
| 5055 | A-1 | R-20 |
| 5056 | A-1 | R-21 |
| 5057 | A-1 | R-22 |
| 5058 | A-1 | R-23 |
| 5059 | A-1 | R-26 |
| 5060 | A-1 | R-27 |
| 5061 | A-1 | R-31 |
| 5062 | A-1 | R-37 |
| 5063 | A-1 | R-38 |
| 5064 | A-1 | R-43 |
| 5065 | A-1 | R-44 |
| 5066 | A-1 | R-45 |
| 5067 | A-1 | R-47 |
| 5068 | A-1 | R-51 |
| 5069 | A-1 | R-55 |
| 5070 | A-1 | R-56 |
| 5071 | A-1 | R-57 |
| 5072 | A-1 | R-60 |
| 5073 | A-1 | R-61 |
| 5074 | A-1 | R-62 |
| 5075 | A-1 | R-63 |
| 5076 | A-1 | R-64 |
| 5077 | A-1 | R-65 |
| 5078 | A-1 | R-66 |
| 5079 | A-1 | R-67 |
| 5080 | A-1 | R-68 |
| 5081 | A-1 | R-69 |
| 5082 | A-1 | R-70 |
| 5083 | A-1 | R-71 |
| 5084 | A-1 | R-72 |
| 5085 | A-1 | R-73 |
| 5086 | A-1 | R-74 |
| 5087 | A-1 | R-76 |
| 5088 | A-1 | R-77 |

TABLE 23-continued

| Compound | A | $R^b$, $R^d$ |
|---|---|---|
| 5089 | A-1 | R-78 |
| 5090 | A-1 | R-79 |
| 5091 | A-2 | R-1 |
| 5092 | A-2 | R-2 |
| 5093 | A-2 | R-3 |
| 5094 | A-2 | R-4 |
| 5095 | A-2 | R-5 |
| 5096 | A-2 | R-7 |
| 5097 | A-2 | R-8 |
| 5098 | A-2 | R-11 |
| 5099 | A-2 | R-13 |
| 5100 | A-2 | R-14 |
| 5101 | A-2 | R-15 |
| 5102 | A-2 | R-18 |
| 5103 | A-2 | R-19 |
| 5104 | A-2 | R-20 |
| 5105 | A-2 | R-21 |
| 5106 | A-2 | R-22 |
| 5107 | A-2 | R-23 |
| 5108 | A-2 | R-26 |
| 5109 | A-2 | R-27 |
| 5110 | A-2 | R-31 |
| 5111 | A-2 | R-37 |
| 5112 | A-2 | R-38 |
| 5113 | A-2 | R-43 |
| 5114 | A-2 | R-44 |
| 5115 | A-2 | R-45 |
| 5116 | A-2 | R-47 |
| 5117 | A-2 | R-51 |
| 5118 | A-2 | R-55 |
| 5119 | A-2 | R-56 |
| 5120 | A-2 | R-57 |
| 5121 | A-2 | R-60 |
| 5122 | A-2 | R-61 |
| 5123 | A-2 | R-62 |
| 5124 | A-2 | R-63 |
| 5125 | A-2 | R-64 |
| 5126 | A-2 | R-65 |
| 5127 | A-2 | R-66 |
| 5128 | A-2 | R-67 |
| 5129 | A-2 | R-68 |
| 5130 | A-2 | R-69 |
| 5131 | A-2 | R-70 |
| 5132 | A-2 | R-71 |
| 5133 | A-2 | R-72 |
| 5134 | A-2 | R-73 |
| 5135 | A-2 | R-74 |
| 5136 | A-2 | R-76 |
| 5137 | A-2 | R-77 |
| 5138 | A-2 | R-78 |
| 5139 | A-2 | R-79 |
| 5140 | A-4 | R-1 |
| 5141 | A-4 | R-2 |
| 5142 | A-4 | R-3 |
| 5143 | A-4 | R-4 |
| 5144 | A-4 | R-5 |
| 5145 | A-4 | R-7 |
| 5146 | A-4 | R-8 |
| 5147 | A-4 | R-11 |
| 5148 | A-4 | R-13 |
| 5149 | A-4 | R-14 |
| 5150 | A-4 | R-15 |
| 5151 | A-4 | R-18 |
| 5152 | A-4 | R-19 |
| 5153 | A-4 | R-20 |
| 5154 | A-4 | R-21 |
| 5155 | A-4 | R-22 |
| 5156 | A-4 | R-23 |
| 5157 | A-4 | R-26 |
| 5158 | A-4 | R-27 |

TABLE 24

| Compound | A | $R^b$, $R^d$ |
|---|---|---|
| 5159 | A-4 | R-31 |
| 5160 | A-4 | R-37 |
| 5161 | A-4 | R-38 |
| 5162 | A-4 | R-43 |
| 5163 | A-4 | R-44 |
| 5164 | A-4 | R-45 |
| 5165 | A-4 | R-47 |
| 5166 | A-4 | R-51 |
| 5167 | A-4 | R-55 |
| 5168 | A-4 | R-56 |
| 5169 | A-4 | R-57 |
| 5170 | A-4 | R-60 |
| 5171 | A-4 | R-61 |
| 5172 | A-4 | R-62 |
| 5173 | A-4 | R-63 |
| 5174 | A-4 | R-64 |
| 5175 | A-4 | R-65 |
| 5176 | A-4 | R-66 |
| 5177 | A-4 | R-67 |
| 5178 | A-4 | R-68 |
| 5179 | A-4 | R-69 |
| 5180 | A-4 | R-70 |
| 5181 | A-4 | R-71 |
| 5182 | A-4 | R-72 |
| 5183 | A-4 | R-73 |
| 5184 | A-4 | R-74 |
| 5185 | A-4 | R-76 |
| 5186 | A-4 | R-77 |
| 5187 | A-4 | R-78 |
| 5188 | A-4 | R-79 |
| 5189 | A-5 | R-1 |
| 5190 | A-5 | R-2 |
| 5191 | A-5 | R-3 |
| 5192 | A-5 | R-4 |
| 5193 | A-5 | R-5 |
| 5194 | A-5 | R-7 |
| 5195 | A-5 | R-8 |
| 5196 | A-5 | R-11 |
| 5197 | A-5 | R-13 |
| 5198 | A-5 | R-14 |
| 5199 | A-5 | R-15 |
| 5200 | A-5 | R-18 |
| 5201 | A-5 | R-19 |
| 5202 | A-5 | R-20 |
| 5203 | A-5 | R-21 |
| 5204 | A-5 | R-22 |
| 5205 | A-5 | R-23 |
| 5206 | A-5 | R-26 |
| 5207 | A-5 | R-27 |
| 5208 | A-5 | R-31 |
| 5209 | A-5 | R-37 |
| 5210 | A-5 | R-38 |
| 5211 | A-5 | R-43 |
| 5212 | A-5 | R-44 |
| 5213 | A-5 | R-45 |
| 5214 | A-5 | R-47 |
| 5215 | A-5 | R-51 |
| 5216 | A-5 | R-55 |
| 5217 | A-5 | R-56 |
| 5218 | A-5 | R-57 |
| 5219 | A-5 | R-60 |
| 5220 | A-5 | R-61 |
| 5221 | A-5 | R-62 |
| 5222 | A-5 | R-63 |
| 5223 | A-5 | R-64 |
| 5224 | A-5 | R-65 |
| 5225 | A-5 | R-66 |
| 5226 | A-5 | R-67 |
| 5227 | A-5 | R-68 |
| 5228 | A-5 | R-69 |
| 5229 | A-5 | R-70 |
| 5230 | A-5 | R-71 |
| 5231 | A-5 | R-72 |
| 5232 | A-5 | R-73 |
| 5233 | A-5 | R-74 |
| 5234 | A-5 | R-76 |
| 5235 | A-5 | R-77 |
| 5236 | A-5 | R-78 |

TABLE 24-continued

| Compound | A | $R^b$, $R^d$ |
|---|---|---|
| 5237 | A-5 | R-79 |
| 5238 | A-6 | R-1 |
| 5239 | A-6 | R-2 |
| 5240 | A-6 | R-3 |
| 5241 | A-6 | R-4 |
| 5242 | A-6 | R-5 |
| 5243 | A-6 | R-7 |
| 5244 | A-6 | R-8 |
| 5245 | A-6 | R-11 |
| 5246 | A-6 | R-13 |
| 5247 | A-6 | R-14 |
| 5248 | A-6 | R-15 |
| 5249 | A-6 | R-18 |
| 5250 | A-6 | R-19 |
| 5251 | A-6 | R-20 |
| 5252 | A-6 | R-21 |
| 5253 | A-6 | R-22 |
| 5254 | A-6 | R-23 |
| 5255 | A-6 | R-26 |
| 5256 | A-6 | R-27 |
| 5257 | A-6 | R-31 |
| 5258 | A-6 | R-37 |
| 5259 | A-6 | R-38 |
| 5260 | A-6 | R-43 |
| 5261 | A-6 | R-44 |
| 5262 | A-6 | R-45 |
| 5263 | A-6 | R-47 |
| 5264 | A-6 | R-51 |
| 5265 | A-6 | R-55 |
| 5266 | A-6 | R-56 |
| 5267 | A-6 | R-57 |
| 5268 | A-6 | R-60 |
| 5269 | A-6 | R-61 |
| 5270 | A-6 | R-62 |
| 5271 | A-6 | R-63 |
| 5272 | A-6 | R-64 |
| 5273 | A-6 | R-65 |
| 5274 | A-6 | R-66 |
| 5275 | A-6 | R-67 |

TABLE 25

| Compound | A | $R^b$, $R^d$ |
|---|---|---|
| 5276 | A-6 | R-68 |
| 5277 | A-6 | R-69 |
| 5278 | A-6 | R-70 |
| 5279 | A-6 | R-71 |
| 5280 | A-6 | R-72 |
| 5281 | A-6 | R-73 |
| 5282 | A-6 | R-74 |
| 5283 | A-6 | R-76 |
| 5284 | A-6 | R-77 |
| 5285 | A-6 | R-78 |
| 5286 | A-6 | R-79 |
| 5287 | A-7 | R-1 |
| 5288 | A-7 | R-2 |
| 5289 | A-7 | R-3 |
| 5290 | A-7 | R-4 |
| 5291 | A-7 | R-5 |
| 5292 | A-7 | R-7 |
| 5293 | A-7 | R-8 |
| 5294 | A-7 | R-11 |
| 5295 | A-7 | R-13 |
| 5296 | A-7 | R-14 |
| 5297 | A-7 | R-15 |
| 5298 | A-7 | R-18 |
| 5299 | A-7 | R-19 |
| 5300 | A-7 | R-20 |
| 5301 | A-7 | R-21 |
| 5302 | A-7 | R-22 |
| 5303 | A-7 | R-23 |
| 5304 | A-7 | R-26 |
| 5305 | A-7 | R-27 |
| 5306 | A-7 | R-31 |

TABLE 25-continued

| Compound | A | $R^b$, $R^d$ |
|---|---|---|
| 5307 | A-7 | R-37 |
| 5308 | A-7 | R-38 |
| 5309 | A-7 | R-43 |
| 5310 | A-7 | R-44 |
| 5311 | A-7 | R-45 |
| 5312 | A-7 | R-47 |
| 5313 | A-7 | R-51 |
| 5314 | A-7 | R-55 |
| 5315 | A-7 | R-56 |
| 5316 | A-7 | R-57 |
| 5317 | A-7 | R-60 |
| 5318 | A-7 | R-61 |
| 5319 | A-7 | R-62 |
| 5320 | A-7 | R-63 |
| 5321 | A-7 | R-64 |
| 5322 | A-7 | R-65 |
| 5323 | A-7 | R-66 |
| 5324 | A-7 | R-67 |
| 5325 | A-7 | R-68 |
| 5326 | A-7 | R-69 |
| 5327 | A-7 | R-70 |
| 5328 | A-7 | R-71 |
| 5329 | A-7 | R-72 |
| 5330 | A-7 | R-73 |
| 5331 | A-7 | R-74 |
| 5332 | A-7 | R-76 |
| 5333 | A-7 | R-77 |
| 5334 | A-7 | R-78 |
| 5335 | A-7 | R-79 |
| 5336 | A-8 | R-1 |
| 5337 | A-8 | R-2 |
| 5338 | A-8 | R-3 |
| 5339 | A-8 | R-4 |
| 5340 | A-8 | R-5 |
| 5341 | A-8 | R-7 |
| 5342 | A-8 | R-8 |
| 5343 | A-8 | R-11 |
| 5344 | A-8 | R-13 |
| 5345 | A-8 | R-14 |
| 5346 | A-8 | R-15 |
| 5347 | A-8 | R-18 |
| 5348 | A-8 | R-19 |
| 5349 | A-8 | R-20 |
| 5350 | A-8 | R-21 |
| 5351 | A-8 | R-22 |
| 5352 | A-8 | R-23 |
| 5353 | A-8 | R-26 |
| 5354 | A-8 | R-27 |
| 5355 | A-8 | R-31 |
| 5356 | A-8 | R-37 |
| 5357 | A-8 | R-38 |
| 5358 | A-8 | R-43 |
| 5359 | A-8 | R-44 |
| 5360 | A-8 | R-45 |
| 5361 | A-8 | R-47 |
| 5362 | A-8 | R-51 |
| 5363 | A-8 | R-55 |
| 5364 | A-8 | R-56 |
| 5365 | A-8 | R-57 |
| 5366 | A-8 | R-60 |
| 5367 | A-8 | R-61 |
| 5368 | A-8 | R-62 |
| 5369 | A-8 | R-63 |
| 5370 | A-8 | R-64 |
| 5371 | A-8 | R-65 |
| 5372 | A-8 | R-66 |
| 5373 | A-8 | R-67 |
| 5374 | A-8 | R-68 |
| 5375 | A-8 | R-69 |
| 5376 | A-8 | R-70 |
| 5377 | A-8 | R-71 |
| 5378 | A-8 | R-72 |
| 5379 | A-8 | R-73 |
| 5380 | A-8 | R-74 |
| 5381 | A-8 | R-76 |
| 5382 | A-8 | R-77 |
| 5383 | A-8 | R-78 |
| 5384 | A-8 | R-79 |

TABLE 25-continued

| Compound | A | $R^b$, $R^d$ |
|---|---|---|
| 5385 | A-20 | R-1 |
| 5386 | A-20 | R-2 |
| 5387 | A-20 | R-3 |
| 5388 | A-20 | R-4 |
| 5389 | A-20 | R-5 |
| 5390 | A-20 | R-7 |
| 5391 | A-20 | R-8 |
| 5392 | A-20 | R-11 |

TABLE 26

| Compound | A | $R^b$, $R^d$ |
|---|---|---|
| 5393 | A-20 | R-13 |
| 5394 | A-20 | R-14 |
| 5395 | A-20 | R-15 |
| 5396 | A-20 | R-18 |
| 5397 | A-20 | R-19 |
| 5398 | A-20 | R-20 |
| 5399 | A-20 | R-21 |
| 5400 | A-20 | R-22 |
| 5401 | A-20 | R-23 |
| 5402 | A-20 | R-26 |
| 5403 | A-20 | R-27 |
| 5404 | A-20 | R-31 |
| 5405 | A-20 | R-37 |
| 5406 | A-20 | R-38 |
| 5407 | A-20 | R-43 |
| 5408 | A-20 | R-44 |
| 5409 | A-20 | R-45 |
| 5410 | A-20 | R-47 |
| 5411 | A-20 | R-51 |
| 5412 | A-20 | R-55 |
| 5413 | A-20 | R-56 |
| 5414 | A-20 | R-57 |
| 5415 | A-20 | R-60 |
| 5416 | A-20 | R-61 |
| 5417 | A-20 | R-62 |
| 5418 | A-20 | R-63 |
| 5419 | A-20 | R-64 |
| 5420 | A-20 | R-65 |
| 5421 | A-20 | R-66 |
| 5422 | A-20 | R-67 |
| 5423 | A-20 | R-68 |
| 5424 | A-20 | R-69 |
| 5425 | A-20 | R-70 |
| 5426 | A-20 | R-71 |
| 5427 | A-20 | R-72 |
| 5428 | A-20 | R-73 |
| 5429 | A-20 | R-74 |
| 5430 | A-20 | R-76 |
| 5431 | A-20 | R-77 |
| 5432 | A-20 | R-78 |
| 5433 | A-20 | R-79 |
| 5434 | A-34 | R-1 |
| 5435 | A-34 | R-2 |
| 5436 | A-34 | R-3 |
| 5437 | A-34 | R-4 |
| 5438 | A-34 | R-5 |
| 5439 | A-34 | R-7 |
| 5440 | A-34 | R-8 |
| 5441 | A-34 | R-11 |
| 5442 | A-34 | R-13 |
| 5443 | A-34 | R-14 |
| 5444 | A-34 | R-15 |
| 5445 | A-34 | R-18 |
| 5446 | A-34 | R-19 |
| 5447 | A-34 | R-20 |
| 5448 | A-34 | R-21 |
| 5449 | A-34 | R-22 |
| 5450 | A-34 | R-23 |
| 5451 | A-34 | R-26 |
| 5452 | A-34 | R-27 |
| 5453 | A-34 | R-31 |
| 5454 | A-34 | R-37 |

TABLE 26-continued

| Compound | A | $R^b$, $R^d$ |
|---|---|---|
| 5455 | A-34 | R-38 |
| 5456 | A-34 | R-43 |
| 5457 | A-34 | R-44 |
| 5458 | A-34 | R-45 |
| 5459 | A-34 | R-47 |
| 5460 | A-34 | R-51 |
| 5461 | A-34 | R-55 |
| 5462 | A-34 | R-56 |
| 5463 | A-34 | R-57 |
| 5464 | A-34 | R-60 |
| 5465 | A-34 | R-61 |
| 5466 | A-34 | R-62 |
| 5467 | A-34 | R-63 |
| 5468 | A-34 | R-64 |
| 5469 | A-34 | R-65 |
| 5470 | A-34 | R-66 |
| 5471 | A-34 | R-67 |
| 5472 | A-34 | R-68 |
| 5473 | A-34 | R-69 |
| 5474 | A-34 | R-70 |
| 5475 | A-34 | R-71 |
| 5476 | A-34 | R-72 |
| 5477 | A-34 | R-73 |
| 5478 | A-34 | R-74 |
| 5479 | A-34 | R-76 |
| 5480 | A-34 | R-77 |
| 5481 | A-34 | R-78 |
| 5482 | A-34 | R-79 |
| 5483 | A-39 | R-1 |
| 5484 | A-39 | R-2 |
| 5485 | A-39 | R-3 |
| 5486 | A-39 | R-4 |
| 5487 | A-39 | R-5 |
| 5488 | A-39 | R-7 |
| 5489 | A-39 | R-8 |
| 5490 | A-39 | R-11 |
| 5491 | A-39 | R-13 |
| 5492 | A-39 | R-14 |
| 5493 | A-39 | R-15 |
| 5494 | A-39 | R-18 |
| 5495 | A-39 | R-19 |
| 5496 | A-39 | R-20 |
| 5497 | A-39 | R-21 |
| 5498 | A-39 | R-22 |
| 5499 | A-39 | R-23 |
| 5500 | A-39 | R-26 |
| 5501 | A-39 | R-27 |
| 5502 | A-39 | R-31 |
| 5503 | A-39 | R-37 |
| 5504 | A-39 | R-38 |
| 5505 | A-39 | R-43 |
| 5506 | A-39 | R-44 |
| 5507 | A-39 | R-45 |
| 5508 | A-39 | R-47 |
| 5509 | A-39 | R-51 |

TABLE 27

| Compound | A | $R^b$, $R^d$ |
|---|---|---|
| 5510 | A-39 | R-55 |
| 5511 | A-39 | R-56 |
| 5512 | A-39 | R-57 |
| 5513 | A-39 | R-60 |
| 5514 | A-39 | R-61 |
| 5515 | A-39 | R-62 |
| 5516 | A-39 | R-63 |
| 5517 | A-39 | R-64 |
| 5518 | A-39 | R-65 |
| 5519 | A-39 | R-66 |
| 5520 | A-39 | R-67 |
| 5521 | A-39 | R-68 |
| 5522 | A-39 | R-69 |
| 5523 | A-39 | R-70 |
| 5524 | A-39 | R-71 |

TABLE 27-continued

| Compound | A | $R^b$, $R^d$ |
|---|---|---|
| 5525 | A-39 | R-72 |
| 5526 | A-39 | R-73 |
| 5527 | A-39 | R-74 |
| 5528 | A-39 | R-76 |
| 5529 | A-39 | R-77 |
| 5530 | A-39 | R-78 |
| 5531 | A-39 | R-79 |
| 5532 | A-41 | R-1 |
| 5533 | A-41 | R-2 |
| 5534 | A-41 | R-3 |
| 5535 | A-41 | R-4 |
| 5536 | A-41 | R-5 |
| 5537 | A-41 | R-7 |
| 5538 | A-41 | R-8 |
| 5539 | A-41 | R-11 |
| 5540 | A-41 | R-13 |
| 5541 | A-41 | R-14 |
| 5542 | A-41 | R-15 |
| 5543 | A-41 | R-18 |
| 5544 | A-41 | R-19 |
| 5545 | A-41 | R-20 |
| 5546 | A-41 | R-21 |
| 5547 | A-41 | R-22 |
| 5548 | A-41 | R-23 |
| 5549 | A-41 | R-26 |
| 5550 | A-41 | R-27 |
| 5551 | A-41 | R-31 |
| 5552 | A-41 | R-37 |
| 5553 | A-41 | R-38 |
| 5554 | A-41 | R-43 |
| 5555 | A-41 | R-44 |
| 5556 | A-41 | R-45 |
| 5557 | A-41 | R-47 |
| 5558 | A-41 | R-51 |
| 5559 | A-41 | R-55 |
| 5560 | A-41 | R-56 |
| 5561 | A-41 | R-57 |
| 5562 | A-41 | R-60 |
| 5563 | A-41 | R-61 |
| 5564 | A-41 | R-62 |
| 5565 | A-41 | R-63 |
| 5566 | A-41 | R-64 |
| 5567 | A-41 | R-65 |
| 5568 | A-41 | R-66 |
| 5569 | A-41 | R-67 |
| 5570 | A-41 | R-68 |
| 5571 | A-41 | R-69 |
| 5572 | A-41 | R-70 |
| 5573 | A-41 | R-71 |
| 5574 | A-41 | R-72 |
| 5575 | A-41 | R-73 |
| 5576 | A-41 | R-74 |
| 5577 | A-41 | R-76 |
| 5578 | A-41 | R-77 |
| 5579 | A-41 | R-78 |
| 5580 | A-41 | R-79 |
| 5581 | A-42 | R-1 |
| 5582 | A-42 | R-2 |
| 5583 | A-42 | R-3 |
| 5584 | A-42 | R-4 |
| 5585 | A-42 | R-5 |
| 5586 | A-42 | R-7 |
| 5587 | A-42 | R-8 |
| 5588 | A-42 | R-11 |
| 5589 | A-42 | R-13 |
| 5590 | A-42 | R-14 |
| 5591 | A-42 | R-15 |
| 5592 | A-42 | R-18 |
| 5593 | A-42 | R-19 |
| 5594 | A-42 | R-20 |
| 5595 | A-42 | R-21 |
| 5596 | A-42 | R-22 |
| 5597 | A-42 | R-23 |
| 5598 | A-42 | R-26 |
| 5599 | A-42 | R-27 |
| 5600 | A-42 | R-31 |
| 5601 | A-42 | R-37 |
| 5602 | A-42 | R-38 |
| 5603 | A-42 | R-43 |
| 5604 | A-42 | R-44 |
| 5605 | A-42 | R-45 |
| 5606 | A-42 | R-47 |
| 5607 | A-42 | R-51 |
| 5608 | A-42 | R-55 |
| 5609 | A-42 | R-56 |
| 5610 | A-42 | R-57 |
| 5611 | A-42 | R-60 |
| 5612 | A-42 | R-61 |
| 5613 | A-42 | R-62 |
| 5614 | A-42 | R-63 |
| 5615 | A-42 | R-64 |
| 5616 | A-42 | R-65 |
| 5617 | A-42 | R-66 |
| 5618 | A-42 | R-67 |
| 5619 | A-42 | R-68 |
| 5620 | A-42 | R-69 |
| 5621 | A-42 | R-70 |
| 5622 | A-42 | R-71 |
| 5623 | A-42 | R-72 |
| 5624 | A-42 | R-73 |
| 5625 | A-42 | R-74 |
| 5626 | A-42 | R-76 |

TABLE 28

| Compound | A | $R^b$, $R^d$ |
|---|---|---|
| 5627 | A-42 | R-77 |
| 5628 | A-42 | R-78 |
| 5629 | A-42 | R-79 |
| 5630 | A-45 | R-1 |
| 5631 | A-45 | R-2 |
| 5632 | A-45 | R-3 |
| 5633 | A-45 | R-4 |
| 5634 | A-45 | R-5 |
| 5635 | A-45 | R-7 |
| 5636 | A-45 | R-8 |
| 5637 | A-45 | R-11 |
| 5638 | A-45 | R-13 |
| 5639 | A-45 | R-14 |
| 5640 | A-45 | R-15 |
| 5641 | A-45 | R-18 |
| 5642 | A-45 | R-19 |
| 5643 | A-45 | R-20 |
| 5644 | A-45 | R-21 |
| 5645 | A-45 | R-22 |
| 5646 | A-45 | R-23 |
| 5647 | A-45 | R-26 |
| 5648 | A-45 | R-27 |
| 5649 | A-45 | R-31 |
| 5650 | A-45 | R-37 |
| 5651 | A-45 | R-38 |
| 5652 | A-45 | R-43 |
| 5653 | A-45 | R-44 |
| 5654 | A-45 | R-45 |
| 5655 | A-45 | R-47 |
| 5656 | A-45 | R-51 |
| 5657 | A-45 | R-55 |
| 5658 | A-45 | R-56 |
| 5659 | A-45 | R-57 |
| 5660 | A-45 | R-60 |
| 5661 | A-45 | R-61 |
| 5662 | A-45 | R-62 |
| 5663 | A-45 | R-63 |
| 5664 | A-45 | R-64 |
| 5665 | A-45 | R-65 |
| 5666 | A-45 | R-66 |
| 5667 | A-45 | R-67 |
| 5668 | A-45 | R-68 |
| 5669 | A-45 | R-69 |
| 5670 | A-45 | R-70 |
| 5671 | A-45 | R-71 |
| 5672 | A-45 | R-72 |

TABLE 28-continued

| Compound | A | $R^b$, $R^d$ |
|---|---|---|
| 5673 | A-45 | R-73 |
| 5674 | A-45 | R-74 |
| 5675 | A-45 | R-76 |
| 5676 | A-45 | R-77 |
| 5677 | A-45 | R-78 |
| 5678 | A-45 | R-79 |
| 5679 | A-48 | R-1 |
| 5680 | A-48 | R-2 |
| 5681 | A-48 | R-3 |
| 5682 | A-48 | R-4 |
| 5683 | A-48 | R-5 |
| 5684 | A-48 | R-7 |
| 5685 | A-48 | R-8 |
| 5686 | A-48 | R-11 |
| 5687 | A-48 | R-13 |
| 5688 | A-48 | R-14 |
| 5689 | A-48 | R-15 |
| 5690 | A-48 | R-18 |
| 5691 | A-48 | R-19 |
| 5692 | A-48 | R-20 |
| 5693 | A-48 | R-21 |
| 5694 | A-48 | R-22 |
| 5695 | A-48 | R-23 |
| 5696 | A-48 | R-26 |
| 5697 | A-48 | R-27 |
| 5698 | A-48 | R-31 |
| 5699 | A-48 | R-37 |
| 5700 | A-48 | R-38 |
| 5701 | A-48 | R-43 |
| 5702 | A-48 | R-44 |
| 5703 | A-48 | R-45 |
| 5704 | A-48 | R-47 |
| 5705 | A-48 | R-51 |
| 5706 | A-48 | R-55 |
| 5707 | A-48 | R-56 |
| 5708 | A-48 | R-57 |
| 5709 | A-48 | R-60 |
| 5710 | A-48 | R-61 |
| 5711 | A-48 | R-62 |
| 5712 | A-48 | R-63 |
| 5713 | A-48 | R-64 |
| 5714 | A-48 | R-65 |
| 5715 | A-48 | R-66 |
| 5716 | A-48 | R-67 |
| 5717 | A-48 | R-68 |
| 5718 | A-48 | R-69 |
| 5719 | A-48 | R-70 |
| 5720 | A-48 | R-71 |
| 5721 | A-48 | R-72 |
| 5722 | A-48 | R-73 |
| 5723 | A-48 | R-74 |
| 5724 | A-48 | R-76 |
| 5725 | A-48 | R-77 |
| 5726 | A-48 | R-78 |
| 5727 | A-48 | R-79 |

<Water-Soluble Organic Solvent>

The ink composition for ink jet printing according to the embodiment of the present disclosure includes the water-soluble organic solvent.

In the present disclosure, "water-soluble" represents that a certain concentration or higher of a substance is soluble in water, and only has to be a property in which a substance is soluble in an aqueous ink or a treatment liquid in some cases. Specifically, the solubility in water is preferably 10 mass % or higher and more preferably 15 mass % or higher.

The water-soluble organic solvent is not particularly limited, and a well-known solvent in the field of the ink composition for ink jet printing can be used.

[Specific Water-Soluble Organic Solvent]

From the viewpoint of improving light fastness, rub resistance, and a dot shape of an infrared absorbing image and improving ink stability, it is preferable that the ink composition for ink jet printing according to the embodiment of the present disclosure includes, as the water-soluble organic solvent, includes at least one water-soluble organic solvent (also referred to as "specific water-soluble organic solvent") selected from the group consisting of propylene glycol, dipropylene glycol, ethylene glycol, diethylene glycol, glycerin, trimethylolpropane, 2-pyrrolidone, 1,5-pentanediol, triethylene glycol, polyethylene glycol, and polyoxypropylene glyceryl ether, and it is more preferable that the ink composition for ink jet printing according to the embodiment of the present disclosure includes the specific water-soluble organic solvent and the total content of the specific water-soluble organic solvent and another water-soluble organic solvent is 5 mass % to 35 mass % with respect to the total mass of the ink composition for ink jet printing.

As each of the solvents, one kind may be used alone, or two or more kinds may be used. The water-soluble organic solvent included in the ink may consist of only the specific water-soluble organic solvent or may be a mixture of the specific water-soluble organic solvent and the other water-soluble organic solvent.

The content of the specific water-soluble organic solvent and the other water-soluble organic solvent is more preferably 10 mass % to 35 mass % and still more preferably 15 mass % to 25 mass %.

In addition, it is preferable that the ink composition for ink jet printing includes a glycol or a polyhydric alcohol as the specific water-soluble organic solvent because a glycol or a polyhydric alcohol is useful for preventing drying or as a wetting agent.

From the viewpoint of suppressing nozzle clogging by drying, the boiling point of the specific water-soluble organic solvent under 1 atm is preferably 100° C. or higher.

From the viewpoint of easy drying, the boiling point of the specific water-soluble organic solvent under 1 atm is preferably 250° C. or lower and more preferably 200° C. or lower. The total content of solvents having a boiling point of 250° C. or higher under 1 atm is preferably 20 mass % or lower and more preferably 10 mass % or lower with respect to the total mass of the ink composition for ink jet printing.

[Molecular Weight]

The water-soluble organic solvent used in the present disclosure includes preferably a water-soluble organic solvent having a molecular weight of 500 or lower, more preferably a water-soluble organic solvent having a molecular weight of 200 or lower, and still more preferably a water-soluble organic solvent having a molecular weight of 100 or lower.

[SP Value]

The water-soluble organic solvent used in the present disclosure includes a water-soluble organic solvent having a solubility parameter (SP value) of preferably 23 or higher and more preferably 25 or higher.

Examples of the organic solvent having a solubility parameter (SP value) of 23 or higher include propylene glycol (SP value: 26.7), diethylene glycol (SP value: 26.1), and dipropylene glycol (26).

The SP value described in the present disclosure is calculated using the Okitsu method ("Journal of the Adhesion Society of Japan" 29(5) (1993) by Toshinao Okitsu). Specifically, the SP value is calculated from the following expression. ΔF refers to a value described in the document.

$$\text{SP Value}(\delta) = \Sigma \Delta F (\text{Molar Attraction Constants}) / V \text{ (Molar Volume)}$$

In addition, the unit of the SP value in the present disclosure is $(\text{cal/cm}^3)^{1/2}$.

It is preferable that the water-soluble organic solvent used in the present disclosure includes a water-soluble organic solvent having a boiling point of 100° C. or higher under 101.325 kPa (hereinafter, simply referred to as "boiling point"). "Under 101.325 kPa" has the same definition as "under 1 atm".

Examples of the organic solvent having a boiling point of 100° C. or higher include ethylene glycol, diethylene glycol, triethylene glycol, tetraethylene glycol, polyethylene glycol, propylene glycol, dipropylene glycol, tripropylene glycol, glycerin, 2-pyrrolidone, butanediol, hexanediol, and trimethylolpropane.

The content of the water-soluble organic solvent is preferably 5 mass % to 45 mass %, more preferably 10 mass % to 40 mass %, still more preferably 15 mass % to 35 mass %, and most preferably 15 mass % to 30 mass % with respect to the total mass of the ink composition for ink jet printing according to the embodiment of the present disclosure.

<Water>

The ink composition for ink jet printing according to the embodiment of the present disclosure includes water.

The content of water is preferably 50 mass % or higher, more preferably 60 mass % or higher with respect to the total mass of the ink composition for ink jet printing.

The upper limit of the content of water is not particularly limited may be determined depending on the contents of other components, and is preferably 99 mass % or lower, more preferably 98 mass % or lower, and still more preferably 95 mass % or lower.

<Surfactant>

The ink may include a surfactant.

As the surfactant, a compound having a structure that includes both a hydrophilic portion and a hydrophobic portion in a molecule can be effectively used, and any one of an anionic surfactant, a cationic surfactant, an amphoteric surfactant, a nonionic surfactant, or a betaine surfactant can also be used.

As the surfactant, from the viewpoint of suppressing ink jetting interference, an anionic surfactant or a nonionic surfactant is preferable, and a nonionic surfactant is more preferable. In particular, an acetylenic glycol derivative (acetylenic glycol surfactant) is more preferable.

Examples of the acetylenic glycol surfactant include 2,4,7,9-tetramethyl-5-decyne-4,7-diol and alkylene oxide adduct of 2,4,7,9-tetramethyl-5-decyne-4,7-diol. At least one selected from the examples is preferable.

Examples of a commercially available product of the acetylenic glycol surfactant include SURFYNOL series such as SURFYNOL 104PG manufactured by Nissin Chemical Co., Ltd. and E series such as OLFINE E1010 manufactured by Nissin Chemical Co., Ltd.

As a surfactant other than the acetylenic glycol surfactant, a fluorine surfactant is preferable. Examples of the fluorine surfactant include an anionic surfactant, a nonionic surfactant, and a betaine surfactant. Among these, an anionic surfactant is more preferable. Examples of the anionic surfactant include: Capstone FS-63 and Capstone FS-61 (manufactured by Dupont); FTERGENT 100, FTERGENT 110, and FTERGENT 150 (manufactured by Neos Co., Ltd.); and CHEMGUARD S-760P (manufactured by Chemguard Inc.).

In a case where the ink includes the surfactant, the content of the surfactant (in a case where two or more surfactants are included, the total content) is not particularly limited and is preferably 0.1 mass % or higher, more preferably 0.1 mass % to 10 mass %, and still more preferably 0.2 mass % to 3 mass % with respect to the total mass of the ink composition for ink jet printing.

<Water-Soluble Polymer Compound>

The ink may include a water-soluble polymer compound.

The water-soluble polymer compound is not particularly limited. For example, a natural hydrophilic polymer compound described in paragraphs "0021" and "0022" of JP2010-188661A or a synthetic hydrophilic polymer compound including a vinyl polymer such as polyvinyl alcohol, polyvinyl pyrrolidone, or polyvinyl methyl ether, an acrylic resin such as polyacrylamide, polyacrylic acid or an alkali metal salt thereof, or a water-soluble styrene-acrylic resin, a water-soluble styrene-maleic acid resin, a water-soluble vinyl naphthalene acrylic resin, a water-soluble vinyl naphthalene maleic acid resin, polyvinyl pyrrolidone, polyvinyl alcohol, an alkali metal salt of a β-naphthalene sulfonic acid formalin condensate, and a quaternary ammonium, or a polymer compound having a salt of a cationic functional group such as an amino group at a side chain can be used.

Among these, a well-known water-soluble polymer compound such as polyvinyl alcohol, polyacrylamide, polyvinyl pyrrolidone, polyethylene glycol, or hydroxypropyl methyl cellulose is preferable.

The weight-average molecular weight of the water-soluble polymer compound is not particularly limited and is, for example, 5000 to 100000, preferably 10000 to 80000 and more preferably 10000 to 50000.

In addition, the content of the water-soluble polymer compound in the ink according to the embodiment of the present disclosure is not particularly limited and is preferably 0.1 mass % to 10 mass %, more preferably 0.1 mass % to 4 mass %, still more preferably 0.1 mass % to 2 mass %, and still more preferably 0.1 mass % to 1 mass % with respect to the total mass of the ink.

In a case where the content is 0.1 mass % or higher, the spreading of ink droplets or the bleeding of the ink to a permeable substrate can be suppressed. In a case where the content is 10 mass % or lower, the thickening of the ink can be further suppressed. In addition, in a case where the content is 2 mass % or lower, jettability can be favorably maintained.

<Other Components>

Examples of the other components of the ink include additives such as an antifading agent, an emulsion stabilizer, a penetration enhancer, an ultraviolet absorber, a preservative, a fungicide, a pH adjuster, a surface tension adjuster, an antifoaming agent, a viscosity adjuster, a dispersant, a dispersion stabilizer, a rust inhibitor, or a chelating agent. Regarding the respective components, compounds described in paragraphs "0044" to "0050" of JP2008-144004A can be used.

<Other Colorants>

The ink may include colorants other than the colorant represented by any one of Formulae 1 to 3. The other colorants are not particularly limited, and well-known colorants in the field of the ink composition for ink jet printing can be used.

From the viewpoint of the invisibility of the obtained infrared absorbing image, the content of the other colorants is preferably 0.1 mass % or lower and more preferably 0.05 mass % or lower with respect to the total mass of the ink composition for ink jet printing.

<Preferable Physical Properties of Ink>

[pH]

As the pH adjuster, a neutralizer (an organic base or an inorganic alkali) can be used. From the viewpoint of jettability, the pH of the ink is preferably 7 to 10 and more preferably 7.5 to 9.5.

In a case where the pH is in the above-described range, the dispersibility of the resin particles is excellent. Therefore, it is presumed that the dot shape of the infrared absorbing image and the ink jettability can be improved.

The pH of the ink is a value measured using a pH meter (Model Number: HM-31, manufactured by DKK-TOA Corporation) at 25° C.

[Viscosity]

The viscosity of the ink is preferably 0.5 mPa·s to 30 mPa·s, more preferably 2 mPa·s to 20 mPa·s, still more preferably 2 mPa·s to 15 mPa·s, and even still more preferably 3 mPa·s to 10 mPa·s.

The viscosity is measured under a condition of 30° C. using VISOMETER TV-22 (manufactured by Toki Sangyo Co., Ltd.).

[Surface Tension]

In addition, a surface tension of the ink at 25° C. is preferably 60 mN/m or lower, more preferably 20 mN/m to 50 mN/m, and still more preferably 25 mN/m to 45 mN/m. In a case where the surface tension of the ink is in the above-described range, the occurrence of curling in the substrate is suppressed, which is advantageous. The surface tension is measured with a plate method using an Automatic Surface Tensiometer CBVP-Z (manufactured by Kyowa Interface Science Co., Ltd.).

[Absorption Maximum]

In a case where a dry material is obtained from the ink composition for ink jet printing according to the embodiment of the present disclosure, the absorption maximum of the dry material is preferably in a wavelength range of 700 nm to 1,000 nm.

From the viewpoint of the invisibility of the obtained recorded material, the absorption maximum is more preferably 710 nm to 1000 nm, still more preferably 760 nm to 1000 nm, and still more preferably 800 nm to 1000 nm.

By adjusting the absorption maximum to be 700 nm to 1000 nm, the invisibility of the obtained infrared absorbing image and the readability of a detector using infrared light are further improved.

In the present disclosure, the dry material of the ink composition for ink jet printing is obtained by applying the ink composition for ink jet printing to OK Top Coat Paper (manufactured by Oji Paper Co., Ltd.) at 7 to 10 pl, 600 dpi, and a halftone dot rate of 1 to 100% and heating and drying the ink composition for ink jet printing with warm air at 100° C. for 1 minute.

The absorption maximum of the dry material is obtained by measuring a reflection spectrum using a spectrophotometer UV-3100PC (manufactured by Shimadzu Corporation) including a 150 mm φ large integrating sphere attachment LISR-3100 (manufactured by Shimadzu Corporation).

From the viewpoints of the invisibility and readability of the obtained infrared absorbing image, it is preferable that a maximum absorption wavelength of the dry material of the ink composition for ink jet printing according to the embodiment of the present disclosure in a range of 400 nm to 1000 nm is in a range of 700 nm to 1000 nm.

By measuring an optical density in a range of 400 nm to 1000 nm using the same method of measuring the absorption maximum of the dry material, a value of the maximum absorption wavelength can be measured. The optical density is measured using a spectrophotometer UV-3100PC (manufactured by Shimadzu Corporation) including a 150 mm φ large integrating sphere attachment LISR-3100 (manufactured by Shimadzu Corporation).

[J-Aggregate]

From the viewpoint of the invisibility of the obtained infrared absorbing image, it is preferable that in the dry material of the ink composition for ink jet printing according to the embodiment of the present disclosure, at least a part of the colorant represented by any one of Formulae 1 to 3 is a J-aggregate.

Generally, a state where colorant chromophores are fixed to a specific space arrangement through a covalent bond or a coordinate bond or by a bonding strength such as various intermolecular forces (for example, a hydrogen bond, a van der Waals force, or a Coulomb force) is referred to as an aggregate (or associate) state. From the viewpoint of the absorption wavelength of the aggregate, an aggregate in which absorption shifts to a short wavelength side with respect to the monomer absorption will be referred to as "H-aggregate" (especially, the dimer will be referred to as "dimer"), and an aggregate in which absorption shifts to a long wavelength side with respect to the monomer absorption will be referred to as "J-aggregate".

The colorant in a J-aggregate state forms a so-called a J-band, and thus shows a sharp absorption spectrum peak. The details of the aggregate and J-band of the colorant can be found in a document (for example, Photographic Science and Engineering Vol. 18, No. 323-335 (1974)).

An absorption maximum of the colorant in a J-aggregate state shifts to a longer wavelength side than an absorption maximum of the colorant in a solution state. Accordingly, whether the colorant is in a J-aggregate state or a non-aggregate state can be determined by measuring the absorption maximum in 400 nm to 1000 nm.

In the present disclosure, in a case where a difference between the absorption maximum of the dry material in a range of 700 nm to 1000 nm and an absorption maximum of a solution in which the colorant included in the ink composition for ink jet printing is dissolved in N,N-dimethylformamide (DMF) is 30 nm or more, it is determined that the colorant represented by any one of Formulae 1 to 3 in the dry material is a J-aggregate. From the viewpoint of improving the invisibility of the obtained infrared absorbing image, the difference is preferably 50 nm or more, more preferably 70 nm or more, and still more preferably 100 nm or more.

In addition, the colorant represented by any one of Formulae 1 to 3 may form a J-aggregate in the ink, or may form a J-aggregate in an infrared absorbing image without forming a J-aggregate in the ink while liquid droplets of the colorant are moving to a substrate or after the liquid droplets arrive at the substrate. Further, all the colorants on the substrate do not necessarily form a J-aggregate, and a colorant in a J-aggregate state and a colorant in a molecular dispersion state may be mixed.

It is preferable that the colorant represented by any one of Formulae 1 to 3 forms an aggregate by being simply dissolved in water. In order to promote the formation of an aggregate in the ink or in the infrared absorbing image, an amphoteric compound (the polymer compound such as gelatin, low molecular weight collagen, oligopeptide, or polyacrylic acid (JURYMER ET410, manufactured by Toagosei Co., Ltd.) included in the above-described water-soluble polymer compound or amino acid thereof), a salt (for example, an alkali earth metal salt such as barium chloride, strontium chloride, calcium chloride, or magnesium chloride, an alkali metal salt such as potassium chloride or sodium chloride, a group 13 metal salt such as aluminum chloride, an organic salt such as ammonium acetate, an organic intramolecular salt such as betaine, or a salt including an organic polycation or polyanion), an inorganic acid such as hydrochloric acid or sulfuric acid, an organic acid such as acetic acid or p-toluenesulfonic acid, an inorganic base such as potassium carbonate or sodium hydroxide, or an organic base such as trialkylamine or pyridine may be added to the ink.

The content of the amphoteric compound is preferably 10 ppm to 50000 ppm (5 mass %) and more preferably 30 ppm to 20000 ppm (2 mass %) with respect to the total mass of the ink composition for ink jet printing.

The content of the salt is preferably 10 ppm to 50000 ppm (5 mass %) and more preferably 30 ppm to 20000 ppm (2 mass %) with respect to the total mass of the ink composition for ink jet printing.

The content of the acid and the base is preferably 10 ppm to 50000 ppm (5 mass %) and more preferably 30 ppm to 20000 ppm (2 mass %) with respect to the total mass of the ink composition for ink jet printing.

[Divalent Alkali Metal Element and Trivalent Group 13 Metal Element]

In the ink composition for ink jet printing according to the embodiment, it is preferable that the content of at least one of a divalent alkali earth metal element or a trivalent group 13 metal element is 10 ppm to 50000 ppm with respect to the total mass of the ink.

Examples of the divalent alkali earth metal include magnesium, calcium, strontium, barium, and radium.

Examples of the trivalent group 13 metal element include aluminum, gallium, indium, and thallium.

It is preferable that the divalent alkali earth metal element or the trivalent group 13 metal element is an element derived from the alkali earth metal salt or the group 13 metal salt.

From the viewpoint of the dispersion stability and jettability of the ink, the content of the divalent alkali metal element and the trivalent group 13 metal element is preferably 10 ppm to 50000 ppm (5 mass %), more preferably 10 ppm to 10000 ppm (1 mass %), still more preferably 10 ppm to 1000 ppm (0.1 mass %), and still more preferably 10 ppm to 100 ppm (0.01 mass %) with respect to the total mass of the ink.

In addition, the content of the divalent alkali metal element or the trivalent group 13 metal element is, as a molar ratio thereof to the colorant, preferably 0.01 equivalents to 1 equivalent, more preferably 0.1 equivalents to 0.8 equivalents, and still more preferably 0.15 equivalents to 0.6 equivalents.

The molar ratio of the content of the divalent alkali metal element or the trivalent group 13 metal element to the colorant being 0.01 equivalents represents that the molar amount of the divalent alkali metal element or the trivalent group 13 metal element/the molar amount of the colorant is 0.01.

As the divalent alkali metal element or the trivalent group 13 metal element, one kind may be included, or two or more kinds may be included.

In a case where two or more divalent alkali metal elements or two or more trivalent group 13 metal elements are included, the content refers to the total content of the two or more divalent alkali metal elements or the two or more trivalent group 13 metal elements.

The content is determined by analyzing a solution in which the ink is diluted with N-methylpyrrolidone and the colorant dispersion is completely dissolved using a plasma optical emission spectrometer (OPTIMA 7300DV, manufactured by PerkinElmer Co., Ltd.).

It is presumed that, in a case where the content of the divalent alkali metal element and the trivalent group 13 metal element is in the above-described range, a plurality of colorants in which a divalent or trivalent metal ion is negatively charged are bonded to each other and are partially crosslinked to each other to form a structure such that the dispersion stability of the ink is further improved.

In addition, it is presumed that, in a case where the content of the divalent alkali metal element and the trivalent group 13 metal element is in the above-described range, the amount of the crosslinked structure formed is appropriate and excessive aggregation of the colorants is suppressed such that the jettability of the ink is maintained.

[Reflectivity]

From the viewpoint of the invisibility of the obtained infrared absorbing image, in a case where a solid coating film or a solid printed material obtained from the ink composition for ink jet printing according to the embodiment of the present disclosure, it is preferable that a reflectivity (% R) at 600 nm is two times or more of the reflectivity at an absorption maximum in a wavelength range of 700 nm to 1,000 nm.

In addition, from the viewpoint of the invisibility of the obtained infrared absorbing image, in a case where a dry material is obtained from the ink composition for ink jet printing according to the embodiment of the present disclosure, it is preferable that a reflectivity R1 at a wavelength of 600 nm and a reflectivity R2 at an absorption maximum in a wavelength range of 800 nm to 1000 nm satisfy the following Expression R.

$$2<R1/R2 \qquad \text{Expression R.}$$

The reflectivity at 600 nm is preferably 2 times or more, more preferably 2.5 times or more, and still more preferably 3 times or more with respect to the reflectivity at the absorption maximum.

By adjusting the reflectivity at 600 nm to be 2 times or more of the reflectivity at the absorption maximum, the invisibility of the obtained infrared absorbing image is further improved.

The values of the reflectivity at 600 nm and the reflectivity at the absorption maximum are measured by measuring the reflectivity of the dry material at 600 nm and the reflectivity of the dry material at the absorption maximum using the same method as in the determination on whether or not the colorant is in a J-aggregate state. The reflectivity is measured using a spectrophotometer UV-3100PC (manufactured by Shimadzu Corporation) including a 150 mm φ large integrating sphere attachment LISR-3100 (manufactured by Shimadzu Corporation).

In addition, from the viewpoints of the absorption properties of the near infrared light, the reflectivity at the absorption maximum is preferably 40% or lower, more preferably 30% or lower, and still more preferably 20% or lower.

The dry material for the reflectivity measurement can be prepared by applying the ink composition using a #0 bar and drying the coating film by natural drying or blowing of hot air at 100° C. from a position at a distance of 10 cm from the film surface for 10 seconds to 1 minute, or by applying the ink composition at a jetting amount of 7 to 10 pl, 600 dpi, and a halftone dot rate of 100% to form a film and drying the film using the same method. As the substrate, coated paper (OK TOP COAT) is used.

<Method of Manufacturing Ink>

A method of manufacturing the ink composition for ink jet printing according to the present disclosure is not particularly limited, and the ink composition for ink jet printing can be manufactured (prepared) using a well-known method of manufacturing (preparing) an ink.

For example, the ink composition can be manufactured using a method of manufacturing an ink described in JP1993-148436A (JP-H5-148436A), JP1993-295312A (JP-H5-295312A), JP1995-097541A (JP-H7-097541A), JP1995-082515A (JP-H7-082515A), JP1995-118584A (JP-H7-118584A), JP1999-286637A (JP-H11-286637A), or JP1999-286637A (JP-H11-286637A).

In addition, as the method of manufacturing the ink composition for ink jet printing according to the present disclosure, the following first aspect or second aspect is preferable.

First aspect: a method of manufacturing the ink composition for ink jet printing including: a step of dispersing the colorant represented by any one of Formulae 1 to 3 in water to prepare an aqueous dispersion (also referred to as "first preparation step"); and a step of mixing the aqueous dispersion with another component of the ink including at least resin particles (also referred to as "first mixing step")

Second aspect: a method of manufacturing the ink composition for ink jet printing including: a step of dispersing the colorant represented by any one of Formulae 1 to 3 in water to prepare an aqueous dispersion (also referred to as "second preparation step"); and a step of mixing the aqueous dispersion, at least one of a divalent alkali earth metal salt or a trivalent group 13 metal salt, and another component of the ink including at least resin particles with each other such that a total content of a divalent alkali earth metal element and a trivalent group 13 metal element is 10 ppm to 50000 ppm with respect to the total mass of the ink (also referred to as "second mixing step")

According to the first aspect or second aspect, an ink composition for ink jet printing having excellent dispersion stability can be obtained.

Hereinafter, the first aspect and the second aspect will be described in detail.

(First Aspect)

[First Preparation Step]

The first preparation step is a step of dispersing the colorant represented by any one of Formulae 1 to 3 in water to prepare an aqueous dispersion (colorant dispersion).

The content of the colorant represented by any one of Formulae 1 to 3 in the aqueous dispersion is preferably 0.1 mass % to 10 mass % and more preferably 0.1 mass % to 5 mass % with respect to the total mass of the aqueous dispersion.

In addition, during the preparation of the aqueous dispersion, in order to improve dispersibility, the ink composition for ink jet printing may further include a surfactant, a water-soluble polymer compound as a dispersant, or an ionic compound such as the above-described amphoteric compound.

Examples of the surfactant include the surfactants included in the above-described ink.

The content of the surfactant, the dispersant, or the ionic compound in the aqueous dispersion is preferably 0.1 mass % to 5 mass % with respect to the total mass of the aqueous dispersion.

As a dispersion method, various well-known dispersion methods can be used without any particular limitation. Examples of the dispersion method include a stirring method using a three-one motor or dissolver, a medium dispersion method using media such as beads, and a dispersion method using ultrasonic waves.

[First Mixing Step]

In the first mixing step, the above-described aqueous dispersion, water, a dispersant, resin particles, a surfactant, and other additives such as a dispersant are mixed with each other.

In the first mixing step, the ink composition for ink jet printing according to the embodiment of the present disclosure can be obtained.

After the first mixing step, a solution obtained after mixing may be filtered through a filter to obtain the ink composition for ink jet printing according to the embodiment of the present disclosure.

In the first mixing step, the content of the above-described colorant is preferably 0.1 mass % to 5 mass % and more preferably 0.2 mass % to 3 mass % with respect to the total mass of the ink.

As a mixing method, well-known mixing methods can be used without any particular limitation. Examples of the mixing method include a method of stirring the respective components in a container.

[Second Mixing Step]

The second mixing step is a step of mixing the aqueous dispersion, at least one of a divalent alkali earth metal salt or a trivalent group 13 metal salt, and other components of the ink such as resin particles, a surfactant, a dispersant, and other additives such that a total content of a divalent alkali earth metal element and a trivalent group 13 metal element is 10 ppm to 50,000 ppm with respect to the total mass of the ink.

A preferable aspect of the second preparation step is the same as the first preparation step except that the divalent alkali earth metal salt and the trivalent group 13 metal salt are mixed in the first mixing step of the first preparation step.

(Image Forming Method)

An image forming method according to the embodiment of the present disclosure a step of forming an infrared absorbing image by applying the ink composition for ink jet printing according to the embodiment of the present disclosure to a substrate.

<Step of Forming Infrared Absorbing Image>

The step of forming the infrared absorbing image is a step of applying the ink composition for ink jet printing according to the embodiment of the present disclosure to a substrate.

The application method is not particularly limited, and it is preferable that the ink composition is applied using an ink jet method.

According to this step, the ink can be selectively applied to the substrate, and a desired infrared absorbing image can be formed.

[Substrate]

The substrate on which the infrared absorbing image is to be formed is not particularly limited as long as an infrared absorbing image can be formed. Examples of the substrate include paper, cloth, wood, a metal plate, and a plastic film.

The paper is not particularly limited, and general printing paper or ink jet recording paper including cellulose as a major component, for example, so-called high-quality paper, coated paper, or art paper used in general offset printing or the like can be used.

In addition, as the substrate, an impermeable substrate can also be used. In a case where an impermeable substrate is used as the substrate, from the viewpoint of image formability, it is preferable that the method includes a step of applying a treatment liquid described below to the substrate.

"Impermeable" of the impermeable substrate used in the present disclosure represents that the absorption amount of water included in the ink is small or zero, and specifically refers to a property in which the absorption amount of water is 10.0 g/m² or less.

The impermeable substrate used in the present disclosure is not particularly limited, and examples thereof include a sheet-shaped substrate and a film-shaped substrate.

From the viewpoint of the productivity of the printed material, it is preferable that the impermeable substrate used in the present disclosure is a sheet-shaped or film-shaped impermeable substrate with which a roll can be formed by being wound.

Examples of the impermeable substrate include a metal (for example, an aluminum foil), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal), plastic, and glass.

In particular, a substrate including a thermoplastic resin such as polyvinyl chloride, polyethylene terephthalate, or polypropylene is preferable.

A surface treatment may be performed on the impermeable substrate.

Examples of the surface treatment include corona treatment, plasma treatment, frame treatment, heat treatment, abrasion treatment, light irradiation treatment (UV treatment), and flame treatment. However, the surface treatment is not limited to these examples. For example, in a case where the corona treatment is performed on the surface of the impermeable substrate in advance before applying the ink to form an image, the surface energy of the impermeable substrate increases, and the wetting of the surface of the impermeable substrate and the adhesion of the ink with the impermeable substrate are accelerated. The corona treatment can be performed, for example, using a corona master (PS-10S, manufactured by Shinko Electric & Instrumentation Co., Ltd.). Conditions of the corona treatment may be appropriately selected depending on cases such as the kind of the impermeable substrate or the composition of the ink. For example, the following treatment conditions may be adopted.

Treatment voltage: 10 to 15.6 kV
Treatment speed: 30 to 100 mm/s

In addition, a visible image may be formed on the substrate using an ink jet method or other well-known methods.

The visible image may be formed in a step of forming the visible image described below, or a substrate on which the visible image formed in the image forming method according to the embodiment of the present disclosure may be used.

The infrared absorbing image which is formed in this step is not particularly limited, and an infrared absorbing image consisting of a plurality of component patterns (for example, dot patterns or line patterns), in other words, an infrared absorbing image that is a set of a plurality of component patterns is preferable.

The diameter of the dot pattern is preferably 25 µm to 70 µm and more preferably 30 µm to 60 µm.

The ink jet method is not particularly limited and may be any one of well-known methods such as an electric charge control method of jetting ink using an electrostatic attraction force, a drop-on-demand method (pressure pulse method) using a vibration pressure of a piezoelectric element, an acoustic ink jet method of jetting ink using a radiation pressure by converting an electrical signal into an acoustic beam and irradiating the ink with the acoustic beam, or a thermal ink jet method (Bubble Jet (registered trade name)) of heating ink to form bubbles and using a pressure generated from the bubbles.

As the ink jet method, in particular, an ink jet method described in JP1988-059936A (JP-S54-059936A) can be preferably used, in which a rapid volume change occurs in the ink due to the action of thermal energy, and the ink is jetted from a nozzle due to a force generated by the stage change.

In addition, the ink jet method can also refer to a method described in paragraphs "0093" to 0105" of JP2003-306623A.

Examples of an ink jet head used in the ink jet method include: a shuttle type that performs recording using a short serial head while causing the head to scan a substrate in a width direction; and a line type that uses a line head in which recording elements are arranged corresponding to the entire region of one side of a substrate.

In the line type, pattern formation can be performed on the entire surface of a substrate by scanning the substrate in a direction perpendicular to a direction in which the recording elements are arranged, and a transport system such as a carriage that scans a short head is unnecessary.

In addition, the movement of the carriage and complex scanning control on the substrate are not necessary, and only the substrate moves. Therefore, an increase in the recording speed can be realized as compared to the shuttle type.

The image forming method according to the embodiment is applicable to the shuttle type or the line type but is preferably applicable to the line type.

From the viewpoint of obtaining a high-accuracy pattern, the amount of liquid droplets of the ink ejected from the ink jet head is preferably 1 pL (picoliters; hereinafter, the same shall be applied) to 20 pL and more preferably 1.5 pL to 10 pL.

In the infrared absorbing image formed in this step, the amount of the colorant represented by any one of Formulae 1 to 3 applied per unit area is preferably 0.0001 g/m² to 1.0 g/m² and more preferably 0.0001 g/m² to 0.5 g/m².

<Heating Step>

It is preferable that the image forming method according to the embodiment of the present disclosure includes a step of heating the formed infrared absorbing image after the step of forming the infrared absorbing image.

It is presumed that, by forming a film using the resin particles in the infrared absorbing image through the heating step, the rub resistance of the image is improved.

In the heating step, drying may be performed at the same time.

From the viewpoint of the rub resistance of the image, the heating temperature of the image is preferably a temperature lower than the Tg of the resin particles.

Examples of a unit that heats the image include a well-known heating unit such as a heater, a well-known blowing unit such as a dryer, and a combination thereof.

Examples of a method of heating the image include a method of applying heat using a heater or the like from a side of a recording medium (substrate) opposite to an image-forming surface, a method of blowing warm air or hot air to an image-forming surface of a recording medium, a method of applying heat using an infrared heater from an image-forming surface of a recording medium or a side of the recording medium opposite to the image-forming surface, and a method including a combination thereof.

The heating temperature during the heating of the image is preferably 60° C. or higher, more preferably 65° C. or higher, and still more preferably 70° C. or higher.

The upper limit of the heating temperature is not particularly limited and, for example, is preferably 150° C. or lower.

The heating time of the image is not particularly limited and is preferably 1 second to 300 seconds and more preferably 1 second to 30 seconds.

<Step of applying Treatment Liquid to Substrate>

It is preferable that the image forming method according to the embodiment of the present disclosure includes a step of applying a treatment liquid including an aggregating agent to the substrate before the step of forming the infrared absorbing image.

[Treatment Liquid]

—Water—

It is preferable that the treatment liquid according to the embodiment of the present disclosure includes water.

The water content is preferably 50 mass % to 95 mass %, more preferably 60 mass % to 90 mass %, and still more preferably 70 mass % to 85 mass % with respect to the total mass of the treatment liquid.

It is preferable that the treatment liquid in the present disclosure further includes at least one aggregating agent selected from the group consisting of a polyvalent metal salt, an organic acid, an inorganic acid, a cationic compound, and a metal complex.

The details of each of the components will be described below.

The treatment liquid includes the aggregating agent such that the ink composition for ink jet printing aggregates, and an image having excellent image quality can be easily obtained.

—Organic Acid—

Examples of the organic acid used in the present disclosure include an organic compound having an acidic group.

Examples of the acidic group include a phosphate group, a phosphonate group, a phosphinate group, a sulfate group, a sulfonate group, a sulfinate group, and a carboxy group. From the viewpoint of the aggregation rate of the ink, the acidic group is preferably a phosphate group or a carboxy group and more preferably a carboxy group.

It is preferable that at least a part of the acidic group is dissociated in the treatment liquid.

As the organic compound having a carboxy group, for example, polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivatives of the above-described compound, or a salt thereof is preferable. As the compound, one kind may be used alone, or two or more kinds may be used in combination.

As the organic compound having a carboxy group, from the viewpoint of the aggregation rate of the ink, a divalent or higher carboxylic acid (hereinafter, also referred to as "polycarboxylic acid") is preferable, and dicarboxylic acid is more preferable.

As the dicarboxylic acid, malonic acid, malic acid, maleic acid, succinic acid, glutaric acid, fumaric acid, tartaric acid, 4-methylphthalic acid, or citric acid is more preferable, and malonic acid, malic acid, glutaric acid, tartaric acid, or citric acid is still more preferable.

It is preferable that the pKa of the organic acid is low (for example, 1.0 to 5.0).

As a result, the surface charge of particles such as the pigment or the polymer particles in the ink in which dispersion is stabilized by a weakly acidic functional group such as a carboxy group decreases due to the contact with the organic acidic compound having a lower pKa such that the dispersion stability can be decreased.

As the organic acid included in the treatment liquid, an organic acid having a low pKa, a high solubility in water, and a valence of 2 or higher is preferable, and a divalent or trivalent acidic material having high buffer capacity in a pH range lower than the pKa of the functional group (for example, a carboxy group) that stabilizes the dispersion of the particles in the ink is more preferable.

In a case where an organic acid is used as the aggregating agent, the content of the organic acid is preferably 1 mass % to 20 mass %, more preferably 2 mass % to 15 mass %, and still more preferably 5 mass % to 10 mass % with respect to the total mass of the treatment liquid according to the embodiment of the present disclosure.

—Inorganic Acid—

The ink composition may include a compound such as sulfuric acid, hydrochloric acid, nitric acid, or phosphoric acid as the inorganic acid.

In a case where an inorganic acid is used as the aggregating agent, the content of the inorganic acid is preferably 1 mass % to 40 mass %, more preferably 2 mass % to 30 mass %, and still more preferably 5 mass % to 20 mass % with respect to the total mass of the treatment liquid according to the embodiment of the present disclosure.

—Polyvalent Metal Salt—

It is preferable that the polyvalent metal salt used in the present disclosure is formed of a divalent or higher polyvalent metal ion and an anion bonded to the polyvalent metal ion. In addition, it is preferable that the polyvalent metal salt is water-soluble.

Specific examples of the polyvalent metal ion include a divalent metal ion such as $Ca^{2+}$, $Cu^{2+}$, $Ni^{2+}$, $Mg^{2+}$, $Zn^{2+}$, or $Ba^{2+}$ and a trivalent metal ion such as $Al^{3+}$, $Fe^{3+}$, or $Cr^{3+}$. Examples of the anion include $Cl^-$, $NO_3^-$, $I^-$, $Br^-$, $ClO_3^-$, $SO_4^{2-}$, and a carboxylate ion.

From the viewpoint of the image quality of the obtained printed material, a salt including $Ca^{2+}$ or $Mg^{2+}$ is preferable as the polyvalent metal salt.

In addition, as the polyvalent metal salt, a salt of a sulfate ion ($SO_4^{2-}$), a nitrate ion ($NO_3^-$), or a carboxylate ion ($RCOO^-$, R represents an alkyl group having 1 or more carbon atoms) is preferable.

It is preferable that the carboxylate ion is derived from a saturated aliphatic monocarboxylic acid having 1 to 6 carbon atoms or a carbocyclic monocarboxylic acid having 7 to 11 carbon atoms. Preferable examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. In particular, formic acid or acetic acid is preferable.

In a case where a polyvalent metal salt is used as the aggregating agent, the content of the polyvalent metal salt is preferably 1 mass % to 40 mass %, more preferably 2 mass % to 25 mass %, and still more preferably 5 mass % to 20 mass % with respect to the total mass of the treatment liquid according to the embodiment of the present disclosure.

—Cationic Compound—

As the cationic compound used in the present disclosure, for example, a primary, secondary, or tertiary amine salt compound is preferable. Examples of the amine salt compound include a compound of a hydrochloride or an acetate (for example, laurylamine, coconut amine, stearylamine, or rosinamine), a quaternary ammonium salt compound (for example, lauryl trimethyl ammonium chloride, cetyl trimethyl ammonium chloride, lauryl dimethyl benzyl ammonium chloride, benzyl tributyl ammonium chloride, or benzalkonium chloride), a pyridinium salt compound (for example, cetyl pyridinium chloride or cetyl pyridinium bromide), an imidazoline cationic compound (for example, 2-heptadecenyl-hydroxyethylimidazoline), and an ethylene oxide adduct of higher alkylamine (for example, dihydroxy ethyl stearylamine). In addition, a polyallylamine may be used.

As the polyallylamine or the polyallylamine derivative is not particularly limited, a well-known material can be appropriately selected and used, and examples thereof include a polyallylamine hydrochloride, a polyallylamine amide sulfate, an allylamine hydrochloride-diallylamine hydrochloride copolymer, an allylamine acetate-diallylamine acetate copolymer, an allylamine hydrochloride-dimethylallylamine hydrochloride copolymer, an allylamine-dimethylallylamine copolymer, a polydiallylamine hydrochloride, a polymethyldiallylamine hydrochloride, a polymethyldiallylamine amide sulfate, a polymethyldiallylamine acetate, a polydiallyldimethylammonium chloride, a diallylamine acetate-sulfur dioxide copolymer, a diallyl methyl ethyl ammonium ethyl sulfate-sulfur dioxide copolymer, a methyldiallylamine hydrochloride-sulfur dioxide copolymer, a diallyldimethylammonium chloride-sulfur dioxide copolymer, and a diallyldimethylammoniumchloride-acrylamidecopolymer.

In a case where the cationic compound is a polymer, it is preferable that the polymer is a water-soluble polymer.

As the polyallylamine or the polyallylamine derivative, a commercially available product can be used. For example, "PAA-HCL-01", "PAA-HCL-03", "PAA-HCL-05", "PAA-HCL-3L", "PAA-HCL-10L", "PAA-H-HCL", "PAA-SA", "PAA-01", "PAA-03", "PAA-05", "PAA-08", "PAA-15", "PAA-15C", "PAA-25", "PAA-H-10C", "PAA-D11-HCL", "PAA-D41-HCL", "PAA-D19-HCL", "PAS-21CL", "PAS-M-1L", "PAS-M-1", "PAS-22SA", "PAS-M-1A", "PAS-H-1L", "PAS-H-5L", "PAS-H-10L", "PAS-92", "PAS-92A", "PAS-J-81L", "PAS-J-81" (trade names, manufactured by Nittobo Medical Co., Ltd.), "HIMO Neo-600", "HIMOLOC Q-101", "HIMOLOC Q-311", "HIMOLOC Q-501", and "HIMAX SC-505", (trade names, manufactured by HYMO Co., Ltd.) can be used.

In a case where a cationic compound is used as the aggregating agent, the content of the cationic compound is preferably 1 mass % to 40 mass %, more preferably 2 mass % to 25 mass %, and still more preferably 5 mass % to 20 mass % with respect to the total mass of the treatment liquid according to the embodiment of the present disclosure.

—Metal Complex—

In the present disclosure, the metal complex refers to a compound in which a ligand is coordinated to a metal ion such as a zirconium ion, a titanium ion, or an aluminum ion.

As the metal complex used in the present disclosure, commercially available metal complexes may be used.

In addition, various organic ligands, in particular, various multidentate ligands capable of forming a metal chelate catalyst are commercially available. As the metal complex used in the present disclosure, a metal complex prepared using a commercially available organic ligand and a metal in combination may be used.

Examples of the metal complex include zirconium tetraacetylacetonate (for example, "ORGATIX ZC-150" manufactured by Matsumoto Fine Chemical Co. Ltd.), zirconium monoacetylacetonate (for example, "ORGATIX ZC-540" manufactured by Matsumoto Fine Chemical Co. Ltd.), zirconium bisacetylacetonate (for example, "ORGATIX ZC-550" manufactured by Matsumoto Fine Chemical Co. Ltd.), zirconium monoethylacetoacetate (for example, "ORGATIX ZC-560" manufactured by Matsumoto Fine Chemical Co. Ltd.), zirconium acetate (for example, "ORGATIX ZC-115" manufactured by Matsumoto Fine Chemical Co. Ltd.), titanium diisopropoxy bis(acetylacetonate) (for example, "ORGATIX TC-100" manufactured by Matsumoto Fine Chemical Co. Ltd.), titanium tetraacetylacetonate (for example, "ORGATIX TC-401" manufactured by Matsumoto Fine Chemical Co. Ltd.), titanium dioctyloxy bis(octyleneglycolate) (for example, "ORGATIX TC-200" manufactured by Matsumoto Fine Chemical Co. Ltd.), titanium diisopropoxy bis(ethyl acetoacetate) (for example, "ORGATIX TC-750" manufactured by Matsumoto Fine Chemical Co. Ltd.), zirconium tetraacetylacetonate (for example, "ORGATIX ZC-700" manufactured by Matsumoto Fine Chemical Co. Ltd.), zirconium tributoxymonoacetylacetonate (for example, "ORGATIX ZC-540" manufactured by Matsumoto Fine Chemical Co. Ltd.), zirconium monobutoxy acetylacetonate bis(ethyl acetoacetate) (for example, "ORGATIX ZC-570" manufactured by Matsumoto Fine Chemical Co. Ltd.), zirconium dibutoxy bis(ethyl acetoacetate) (for example, "ORGATIX ZC-580" manufactured by Matsumoto Fine Chemical Co. Ltd.), aluminum trisacetylacetonate (for example, "ORGATIX AL-80" manufactured by Matsumoto Fine Chemical Co. Ltd.), titanium lactate ammonium salts (for example, "ORGATIX TC-300" manufactured by Matsumoto Fine Chemical Co. Ltd.), titanium lactate (for example, "ORGATIX TC-310, 315" manufactured by Matsumoto Fine Chemical Co. Ltd.), titanium triethanolaminate (for example, "ORGATIX TC-400" manufactured by Matsumoto Fine Chemical Co. Ltd.), and zirconyl chloride compound ("ORGATIX ZC-126" manufactured by Matsumoto Fine Chemical Co. Ltd.).

Among these, titanium lactate ammonium salts (for example, "ORGATIX TC-300" manufactured by Matsumoto Fine Chemical Co. Ltd.), titanium lactate (for example, "ORGATIX TC-310, 315" manufactured by Matsumoto Fine Chemical Co. Ltd.), titanium triethanolaminate (for example, "ORGATIX TC-400" manufactured by Matsumoto Fine Chemical Co. Ltd.), or a zirconyl chloride compound ("ORGATIX ZC-126" manufactured by Matsumoto Fine Chemical Co. Ltd.) is preferable.

—Other Components—

<<Water-Soluble Organic Solvent>>

The treatment liquid may include at least one water-soluble organic solvent.

As the water-soluble organic solvent, a well-known water-soluble organic solvent can be used without any particular limitation.

Examples of the water-soluble organic solvent include: a glycol such as glycerin, 1,2,6-hexanetriol, trimethylolpropane, ethylene glycol, propylene glycol, diethylene glycol, triethylene glycol, tetraethylene glycol, pentaethylene glycol, or dipropylene glycol; a polyhydric alcohol, for example, an alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and a saccharide, a sugar alcohol, a hyaluronic acid, an alkyl alcohol having 1 to 4 carbon atoms, a glycol ether, 2-pyrrolidone, or N-methyl-2-pyrrolidone described in paragraph "0116" of JP2011-042150A.

In particular, from the viewpoint of suppressing the peeling of an image, polyalkylene glycol or a derivative is preferable, and at least one selected from diethylene glycol monoalkyl ether, triethylene glycol monoalkyl ether, dipropylene glycol, tripropylene glycol monoalkyl ether, polyoxypropylene glyceryl ether, or polyoxyethylene polyoxypropylene glycol is more preferable.

In a case where the treatment liquid includes the water-soluble organic solvent, the content of the water-soluble organic solvent is preferably 3 mass % to 20 mass % and more preferably 5 mass % to 15 mass % with respect to the total mass of the treatment liquid from the viewpoint of application properties.

<<Surfactant>>

The treatment liquid may include at least one surfactant.

The surfactant can be used as a surface tension adjuster or an antifoaming agent.

Examples of the surface tension adjuster or the antifoaming agent include a nonionic surfactant, a cationic surfactant, an anionic surfactant, and a betaine surfactant. In particular, from the viewpoint of the aggregation rate of the ink, an anionic surfactant is preferable. The anionic surfactant can be appropriately selected from well-known anionic surfactants. For example, a sulfate, a sulfonate, a phosphate, a fatty acid salt, and a formalin condensate. Examples of a cation for forming a salt include an ammonium ion, a triethanolamine ion, and a metal cation. Among these cations, a monovalent metal cation is more preferable, and a sodium ion or a potassium ion is still more preferable.

Examples of the surfactant include compounds described as surfactants in pp. 37 to 38 of JP1976-157636A (JP-S59-157636A) and Research Disclosure No. 308119 (1989). In addition, for example, fluorine (fluorinated alkyl) surfactants or silicone surfactants described in JP2003-322926A, JP2004-325707A, and JP2004-309806A can also be used.

The content of the surfactant may be appropriately adjusted such that the surface tension of the treatment liquid is in a range described below.

<<Other Additives>>

The treatment liquid may optionally include components other than the above-described component.

Examples of the other components that may be included in the treatment liquid include well-known additives such as a solid wetting agent, colloidal silica, an inorganic salt, an antifading agent, an emulsion stabilizer, a penetration enhancer, an ultraviolet absorber, a preservative, a fungicide, a pH adjuster, a viscosity adjuster, a rust inhibitor, or a chelating agent.

—Physical Properties of Treatment Liquid—

From the viewpoint of the aggregation rate of the ink, the pH of the treatment liquid at 25° C. is preferably 0.1 to 3.5.

In a case where the pH of the treatment liquid is 0.1 or higher, the graininess of the substrate is further reduced, and the adhesiveness of an image area is further improved.

In a case where the pH of the treatment liquid is 3.5 or lower, the aggregation rate is further improved, coalescence of dots (ink dots) of the ink on the substrate is further suppressed, and the graininess of the image is further reduced.

The pH (25° C.) of the treatment liquid is more preferably 0.2 to 2.0.

From the viewpoint of the aggregation rate of the ink, the viscosity of the treatment liquid is preferably in a range of 0.5 mPa·s to 30 mPa·s, more preferably in a range of 1 mPa·s to 20 mPa·s, still more preferably in a range of 2 mPa·s to 15 mPa·s, and still more preferably in a range of 2 mPa·s to 10 mPa·s.

The viscosity of the treatment liquid is measured using VISOMETER TV-22 (manufactured by Toki Sangyo Co., Ltd.) under a condition of 25° C.

The surface tension of the treatment liquid at 25° C. is preferably 60 mN/m or lower, more preferably 20 mN/m to 50 mN/m, and still more preferably 30 mN/m to 45 mN/m.

In a case where the surface tension of the treatment liquid is in the above-described range, the adhesiveness between the substrate and the treatment liquid is improved.

The surface tension of the treatment liquid is measured with a plate method using an Automatic Surface Tensiometer CBVP-Z (manufactured by Kyowa Interface Science Co., Ltd.).

<Other Steps>

The image forming method according to the embodiment of the present disclosure may further include other steps.

Examples of the other steps include a step of drying the treatment liquid, a step of forming the visible image, a step of forming an overcoat layer, and a step of forming a protective film.

[Step of Drying Treatment Liquid]

The image forming method according to the embodiment of the present disclosure may further include a step of drying the treatment liquid.

It is preferable that the step of drying the treatment liquid is performed before the step of forming the infrared absorbing image and after the step of applying the treatment liquid to the substrate.

A method of drying the treatment liquid in the step of drying the treatment liquid is not particularly limited, and drying by heating using a well-known drying method is preferable.

[Step of Forming Visible Image]

The image forming method according to the embodiment of the present disclosure may further include a step of forming the visible image.

In the present disclosure, the visible image refers to an image that can be seen by eyes, and is preferably an image that is formed using an ink other than the ink according to the embodiment of the present disclosure.

The step of forming the visible image is not particularly limited, and examples thereof include a step of forming an image using a well-known printing method such as printing using an ink jet method, screen printing, gravure printing, or flexographic printing.

The image forming method according to the embodiment of the present disclosure may include the step of forming the visible image before or after the step of forming the infrared absorbing image.

(Step of Forming Overcoat Layer)

The image forming method according to the embodiment of the present disclosure may further include a step of forming an overcoat layer after the step of forming the infrared absorbing image.

Examples of a method of forming the overcoat layer include a method of applying an overcoat layer-forming composition including the same resin particles as those included in the ink according to the embodiment of the present disclosure to the image formed in the step of forming the infrared absorbing image and heating the overcoat layer-forming composition.

—Overcoat Layer-Forming Composition—

It is preferable that the overcoat layer-forming composition includes the same resin particles as those included in the ink according to the embodiment of the present disclosure and another polymer compound. The overcoat layer-forming composition may consist of any one of the resin particles or the polymer compound or may include both the resin particles and the polymer compound.

In addition, it is preferable that the overcoat layer-forming composition includes the same water-soluble solvent as that of the resin particles included in the ink according to the embodiment of the present disclosure, a surfactant, and water. Further, it is preferable that the overcoat layer-forming composition includes, as other components, additives such as an antifading agent, an emulsion stabilizer, a penetration enhancer, an ultraviolet absorber, a preservative, a fungicide, a pH adjuster, a surface tension adjuster, an antifoaming agent, a viscosity adjuster, a dispersant, a dispersion stabilizer, a rust inhibitor, or a chelating agent.

The components included in the overcoat layer-forming composition have the same definitions and the same preferable aspects as those of the components included in the ink according to the embodiment of the present disclosure.

—Method of Applying Overcoat Layer-Forming Composition—

A method of applying the overcoat layer-forming composition is not particularly limited, and examples thereof include a coating method such as spray coating or a coating roller and a method of application, dipping, or the like using an ink jet method. Among these, an ink jet method is preferable.

The application of the overcoat layer-forming composition using an ink jet method can be performed using the same method as the ink jet method in the step of forming the infrared absorbing image described above.

—Heating Method—

By heating the overcoat layer-forming composition formed on the infrared absorbing image, for example, a film is formed using the resin particles in the overcoat layer-forming composition to form the overcoat layer.

In the heating step, drying may be performed at the same time.

In addition, the heating in the step of forming the overcoat layer can be performed using the same method as that in the above-described heating step.

[Step of Forming Protective Film]

It is preferable that the image forming method according to the embodiment of the present disclosure further includes a step of forming a protective film.

The protective film is not particularly limited, and a protective film in which a transmittance of at least the infrared absorbing image obtained in the step of forming the infrared absorbing image at an absorption maximum in a wavelength range of 700 nm to 1000 nm is 50% or higher is preferable, and a protective film in which a transmittance at an absorption maximum in a wavelength range of 700 nm to 1000 nm is 50% or higher is more preferable.

Examples of a material of the protective film include a resin and glass.

A method of forming the protective film is not particularly limited, and examples thereof include a method of disposing the protective film on the infrared absorbing image and a method of bonding the protective film using a well-known bonding method. Examples of the well-known bonding method include a method using an adhesive and a laminating method.

(Recorded Material)

A recorded material according to the embodiment of the present disclosure includes: a substrate; and an infrared absorbing image that is a dry material of the ink composition for ink jet printing according to the embodiment of the present disclosure.

In the present disclosure, "drying" refers to volatilizing and removing at least a part of water or the water-soluble organic solvent in the ink composition for ink jet printing, and a material obtained by drying the ink composition for ink jet printing refers to "dry material".

It is preferable that the recorded material is obtained using the above-described image forming method.

<Substrate>

The substrate in the recorded material according to the embodiment of the present disclosure is the same as the substrate in the image forming method according to the embodiment of the present disclosure, and a preferable aspect thereof is also the same.

<Infrared Absorbing Image>

The infrared absorbing image in the recorded material according to the embodiment of the present disclosure is a dry material of the ink composition for ink jet printing according to the embodiment of the present disclosure.

A method of obtaining the dry material using the ink composition for ink jet printing according to the embodiment of the present disclosure is not particularly limited, and the dry material can be obtained using the above-described image forming method.

In addition, an absorption maximum of the infrared absorbing image in the recorded material according to the embodiment of the present disclosure is preferably 700 nm to 1000 nm, more preferably 710 nm to 1000 nm, still more preferably 760 nm to 1000 nm, and still more preferably 800 nm to 1000 nm.

The absorption maximum is measured using the same method as the method of measuring the absorption maximum of the dry material of the ink composition for ink jet printing according to the embodiment of the present disclosure.

In addition, from the viewpoints of the invisibility and readability of the infrared absorbing image, it is preferable that a maximum absorption wavelength of the infrared absorbing image in the recorded material according to the embodiment of the present disclosure in a range of 400 nm to 1000 nm is 700 nm to 1000 nm.

The maximum absorption wavelength is measured using the same method as the method of measuring the maximum absorption wavelength of the dry material of the ink composition for ink jet printing according to the embodiment of the present disclosure.

From the viewpoint of the invisibility of the infrared absorbing image, it is preferable that an optical density (OD) of the infrared absorbing image in the recorded material according to the embodiment of the present disclosure at 450 nm is $1/7$ or lower of an optical density of the infrared absorbing image at an absorption maximum. It is more preferable the optical density is $1/8$ or lower of the optical density at the absorption maximum, and it is still more preferable the optical density is $1/9$ or lower of the optical density at the absorption maximum.

In addition, from the viewpoint of readability, the optical density of the infrared absorbing image at the absorption maximum is preferably 0.1 or higher, more preferably 0.3 or higher, and still more preferably 0.5 or higher.

The optical density is measured using the same method as the method of measuring the optical density of the dry material of the ink composition for ink jet printing according to the embodiment of the present disclosure.

In the infrared absorbing image in the recorded material according to the embodiment of the present disclosure, the content of the colorant represented by any one of Formulae 1 to 3 per unit area is preferably 0.0001 $g/m^2$ to 1.0 $g/m^2$ and more preferably 0.0001 $g/m^2$ to 0.5 $g/m^2$.

<Visible Image>

The recorded material according to the embodiment of the present disclosure may include a visible image.

The visible image may be provided between the substrate and the infrared absorbing image or may be provided above the substrate and the infrared absorbing image.

The details of the visible image in the recorded material according to the embodiment of the present disclosure is the same as those of the visible image in the step of the visible image in the above-described image forming method according to the embodiment of the present disclosure, and a preferable aspect thereof is also the same.

<Overcoat Layer>

The recorded material according to the embodiment of the present disclosure may include an overcoat layer.

It is preferable that the overcoat layer is provided above the substrate and the infrared absorbing image, and in a case where the recorded material includes the visible image, it is preferable that the overcoat layer is provided above the substrate, the visible image, and the infrared absorbing image.

The details of the overcoat layer in the recorded material according to the embodiment of the present disclosure is the same as those of the overcoat layer in the step of the overcoat layer in the above-described image forming method according to the embodiment of the present disclosure, and a preferable aspect thereof is also the same.

<Protective Film>

The recorded material according to the embodiment of the present disclosure may include a protective film.

It is preferable that the protective film is provided above the substrate and the infrared absorbing image, and in a case where the recorded material includes the visible image, it is preferable that the protective film is provided above the substrate, the visible image, and the infrared absorbing image.

The details of the protective film in the recorded material according to the embodiment of the present disclosure is the same as those of the protective film in the step of the protective film in the above-described image forming method according to the embodiment of the present disclosure, and a preferable aspect thereof is also the same.

(Method of Reading Infrared Absorbing Image)

A method of reading the infrared absorbing image according to the embodiment of the present disclosure includes a step of reading the infrared absorbing image that is a dry material of the ink composition for ink jet printing according to the embodiment of the present disclosure or the infrared absorbing image included in the recorded material according to the embodiment of the present disclosure.

<Step of Reading Infrared Absorbing Image>

A method of reading the infrared absorbing image is not particularly limited, and a well-known method can be used.

For example, a method of reading the infrared absorbing image by irradiating the infrared absorbing image with infrared light from an oblique direction and reading reflected light using an optical receiver provided in the vicinity of an infrared output portion to determine whether or not absorption of infrared light is present.

As a light source used for reading the infrared absorbing image, for example, a laser or a light emitting diode (LED) is used.

A wavelength used for reading the infrared absorbing image may be in a range of 700 nm to 1000 nm. For example, it is preferable that 850 nm that is a wavelength of a general LED is used.

EXAMPLES

Hereinafter, the present disclosure will be described in detail using Examples. Materials, used amounts, ratios, treatment details, treatment procedures, and the like shown in the following examples can be appropriately changed within a range not departing from the scope of the embodiment of the present disclosure. Accordingly, the scope of the embodiment of the present disclosure is not limited to the following specific examples. In Examples, unless specified otherwise, "part(s)" and "%" represent "part(s) by mass" and "mass %".

Example 1-1

<Preparation of Ink Composition 1 for Ink Jet Printing>

[Preparation of Dispersion A]

2 parts by mass of a compound 1 described below was added to 98 parts by mass of ultrapure water, and the solution was dispersed using a beads mill for 3 hours to obtain a dispersion A.

[Preparation of Resin Particles A-1]

Methyl ethyl ketone (540.0 g) was charged into a 2 L three-neck flask equipped with a mechanical stirrer, a thermometer, a reflux cooling pipe, and a nitrogen gas introduction pipe and was heated to 75° C. While maintaining the reaction vessel internal temperature at 75° C., a mixed solution consisting of methyl methacrylate (108 g), isobornyl methacrylate (388.8 g), methacrylic acid (43.2 g), methyl ethyl ketone (108 g), and "V-601" (manufactured by Fujifilm Wako Pure Chemical Corporation; 2.1 g) was added dropwise at a constant speed until the dropwise addition was completed after 2 hours. After completion of the dropwise addition, a solution consisting of "V-601" (1.15 g) and methyl ethyl ketone (15.0 g) was added, and the solution was stirred at 75° C. for 2 hours. Further, a solution consisting of "V-601" (0.54 g) and methyl ethyl ketone (15.0 g) was added, and the solution was stirred at 75° C. for 2 hours. Next, the solution was heated to 85° C., and was further stirred for 2 hours. As a result, a resin solution of a methyl methacrylate/isobornyl methacrylate/methacrylic acid copolymer (=20/72/8 [mass ratio]) copolymer was obtained.

In the obtained copolymer, the weight-average molecular weight (Mw) was 60,000, the acid value was 54.2 mgKOH/g, and the glass transition temperature was 124° C.

Next, the resin solution (588.2 g) was weighed, isopropanol (165 g) and 1 mol/L of a sodium hydroxide aqueous solution (120.8 ml) were added, and the reaction vessel internal temperature was increased to 80° C. Next, distilled water (718 g) was added dropwise at a rate of 20 ml/min and was water-dispersed. Next, under the atmospheric pressure, the reaction vessel internal temperature was held at 80° C. for 2 hours, was held at 85° C. for 2 hours, and was held at 90° C. for 2 hours to distill off the solvent. Further, the internal pressure of the reaction vessel was reduced, and isopropanol, methyl ethyl ketone, and distilled water were distilled off. As a result, resin particles A-1 (aqueous dispersion having a solid content concentration of 25.0 mass %) as polymer particles were obtained.

25 parts by mass of the dispersion A, 20 parts by mass of propylene glycol (manufactured by Fujifilm Wako Pure Chemical Corporation) as a water-soluble organic solvent, 1 part by mass of OLFINE E1010 (manufactured by Nissin Chemical Co., Ltd.) as a surfactant, and self-dispersing acrylic resin particles A-1 (methyl methacrylate/isobornyl methacrylate/methacrylic acid copolymer (=20/72/8 [mass ratio]) copolymer) were mixed with each other such that the content of the compound 1 was 0.5 parts by mass with respect to the total mass of the ink composition, and 16 parts by mass of the aqueous dispersion A-1 was mixed such that the solid content concentration A-1 was 4 parts by mass. The solution was adjusted with ion exchange water such that the total weight was 100 parts by mass and was filtered through a filter having a pore size of 5 µm. As a result, an ink composition 1 for ink jet printing was prepared.

<Evaluation of Ink Composition 1 for Ink Jet Printing>

[Evaluation: Rub Resistance Evaluation]

The ink composition 1 for ink jet printing was charged into an ink cartridge provided in an ink jet recording device (DMP-2831, manufactured by Fujifilm Composition), a 10% halftone image was formed on coated paper (OK TOP COAT) under conditions of 600 dpi (dots per inch) and 10 pl per dot, and was dried with warm air at 100° C. for 1 minute. Next, a paperweight rubbing evaluation was performed with 5 grades A to E according to the following evaluation standards. The evaluation was performed by visual inspection and by observation using an IR microscope (a microscope with a portable digital colorimeter function, HandyScope, manufactured by Spectra Co-Op, wavelength of IR light source: 783 nm). The evaluation results are shown in Table 29.

In a case where the evaluation result is any one of A, B, C, or D, it can be said that the rub resistance of the obtained infrared absorbing image is excellent. A or B is preferable, and A is more preferable.

The rubbing evaluation was performed by reciprocating a paperweight around which coated paper was wound under a load of 55 g/cm² twice.

—Evaluation Standards—

A: after rubbing substantially no scratch was observed on the surface of the infrared absorbing image B: after rubbing, a small amount of scratch was observed on the surface of the infrared absorbing image, but the proportion of a completely scraped portion was lower than 10%

C: after rubbing, a region where the infrared absorbing image was scraped was observed, and the area of the region was 10% or higher and lower than 30% with respect to the total area of the image D: after rubbing, a region where the infrared absorbing image was scraped was observed, and the area of the region was 30% or higher and lower than 50% with respect to the total area of the image E: after rubbing, a region where the infrared absorbing image was scraped was observed, and the area of the region was 50% or higher with respect to the total area of the image

[Evaluation 2: Evaluation of Jettability]

Using the ink jet recording device used in the evaluation of rub resistance, in all the nozzles (16), ink jetting portions of an ink jet head were observed to evaluate the jettability of the ink according to the following evaluation standards.

In the following description, "Defective Nozzle Number Ratio (%)" refers to a ratio of the number of defective nozzles to the number of all the nozzles after performing continuous jetting for 10 minutes. The evaluation results are shown in Table 29.

In a case where the evaluation result A, B, or C, it can be said that jetting stability is excellent, and A is more preferable.

—Evaluation Standards—

A: the defective nozzle number ratio was lower than 13%

B: the defective nozzle number ratio was 13% or higher and lower than 32%

C: the defective nozzle number ratio was 32% or higher and lower than 50%

D: the defective nozzle number ratio was 50% or higher

[Evaluation 3: Evaluation of Light Fastness]

Using a solid image that was formed with the same method as that of the evaluation of rub resistance, the light fastness evaluation was performed.

The recorded material was irradiated with xenon light (85000 lx) using a weather meter (ATLAS C. I65) for 6 days. The optical density of the recorded material at the absorption maximum was measured before and after the irradiation of xenon light, and "(Optical Density after Irradiation)/(Optical Density before Irradiation)=Colorant Residue Rate" was evaluated.

All the optical densities were measured using a spectrophotometer UV-3100PC (manufactured by Shimadzu Corporation) including a 150 mm φ large integrating sphere attachment LISR-3100 (manufactured by Shimadzu Corporation).

In a case where the evaluation result is A, B, or C, there is no problem in practice. A or B is preferable, and A is more preferable.

—Evaluation Standards—

A: the colorant residue rate was 90% or higher

B: the colorant residue rate was 75% or higher and lower than 90%

C: the colorant residue rate was 60% or higher and lower than 75%

D: the colorant residue rate was lower than 60%

[Evaluation 4: Evaluation of Ink Stability]

After storing the ink composition 1 for ink jet printing at 50° C. and a humidity of 60% RH for 7 days, the amount of change in volume average particle size of the coloring material and the resin particles in the ink was investigated.

It can be said that, as the amount of change decreases, the ink stability is excellent.

The evaluation was performed with 5 grades A to E according to the following evaluation standards. The evaluation results are shown in Table 29.

The volume average particle size and the particle size distribution of the coloring material and the resin particles in the ink was measured with a dynamic light scattering method using a Nanotrac particle size distribution measuring apparatus.

—Evaluation Standards—

A: a change in average particle size was less than 10 nm

B: a change in average particle size was 10 nm or more and less than 20 nm

C: a change in average particle size was 20 nm or more and less than 30 nm

D: a change in average particle size was 30 nm or more and less than 50 nm

E: a change in average particle size was 50 nm or more

[Evaluation 5: Evaluation of Invisibility]

The ink composition 1 for ink jet printing was charged into an ink cartridge provided in an ink jet recording device (DMP-2831, manufactured by Fujifilm Composition), a 100% halftone image was formed on coated paper (OK TOP COAT) under conditions of 600 dpi (dots per inch) and 10 pl per dot, and was dried with warm air at 100° C. for 1 minute.

The reflectivity of the dry film was measured using an integrating sphere unit of V-570 (manufactured by JASCO Corporation), a reflectivity R1 at a wavelength of 600 nm and a reflectivity R2 at an absorption maximum in a wavelength range of 800 to 1000 nm were measured, and invisibility was evaluated based on the ratio between the reflectivity R1 and the reflectivity R2.

A: R1/R2 was 3.3 or higher
B: R1/R2 was 2.5 or higher and lower than 3.3
C: R1/R2 was 2 or higher and lower than 2.5
D: R1/R2 was 1.5 or higher and lower than 2
E: R1/R2 was lower than 1.5

Examples 1-2 to 1-32

The rub resistance, the dot shape, the light fastness, the ink stability, and the invisibility were evaluated using the same methods as those of Example 1-1, except that the compound 1 in Example 1-1 was changed to a compound shown in Table 29.

Comparative Example 1-1

An ink composition was prepared and evaluated using the same methods as those of Example 1-1, except that the resin particles A-1 were not added and the solution was adjusted with ion exchange water such that the total weight was 100 parts by mass.

Comparative Example 1-2

The following components were mixed to prepare an ink, and the ink was evaluated using the same method as that of Example 1-1.

The following cyanine colorant: 1 part by mass
Dipropylene glycol: 50 parts by mass
Acetylenic glycol surfactant (SURFYNOL 104PG): 0.3 parts by mass
Triisopropanolamine: 1 part by mass
Water: balance with respect to the total amount of 100 parts by mass

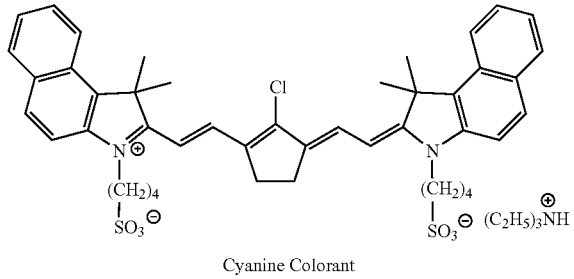

Cyanine Colorant

TABLE 29

|  |  | Evaluation 1: Rub Resistance | Evaluation 2: Jettability | Evaluation 3: Light Fastness | Evaluation 4: Ink Stability | Evaluation 5: Invisibility |
| --- | --- | --- | --- | --- | --- | --- |
| Example 1-1 | Compound 1 | B | A | A | B | A |
| Example 1-2 | Compound 2 | B | A | A | B | A |
| Example 1-3 | Compound 3 | B | A | A | B | A |
| Example 1-4 | Compound 4 | B | A | A | B | A |
| Example 1-5 | Compound 5 | B | A | A | B | A |
| Example 1-6 | Compound 6 | B | A | A | B | A |
| Example 1-7 | Compound 7 | B | A | A | B | A |
| Example 1-8 | Compound 8 | B | A | A | B | A |
| Example 1-9 | Compound 9 | B | A | A | B | A |
| Example 1-10 | Compound 10 | B | A | A | B | A |
| Example 1-11 | Compound 11 | B | A | A | B | A |
| Example 1-12 | Compound 12 | B | A | A | B | A |
| Example 1-13 | Compound 13 | B | B | B | B | A |
| Example 1-14 | Compound 14 | B | A | A | B | A |
| Example 1-15 | Compound 15 | B | B | A | B | A |
| Example 1-16 | Compound 16 | B | A | A | B | A |
| Example 1-17 | Compound 17 | B | A | A | B | A |
| Example 1-18 | Compound 18 | B | A | A | B | A |
| Example 1-19 | Compound 19 | B | A | A | B | A |
| Example 1-20 | Compound 20 | B | A | A | B | A |
| Example 1-21 | Compound 21 | B | A | A | B | A |
| Example 1-22 | Compound 22 | B | A | A | B | A |
| Example 1-23 | Compound 23 | B | A | A | B | A |
| Example 1-24 | Compound 24 | B | A | A | B | A |
| Example 1-25 | Compound 25 | B | A | A | B | A |
| Example 1-26 | Compound 26 | B | A | A | B | A |
| Example 1-27 | Compound 27 | B | A | A | B | A |
| Example 1-28 | Compound 28 | B | A | A | B | A |
| Example 1-29 | Compound 29 | B | A | A | B | A |
| Example 1-30 | Compound 30 | B | A | A | B | A |
| Example 1-31 | Compound 31 | B | A | A | B | A |
| Example 1-32 | Compound 32 | B | B | B | C | B |
| Comparative Example 1-1 | Compound 1 | E | A | A | B | A |
| Comparative Example 1-2 | Cyanine Colorant | E | A | D | — | A |

The details of the compounds 1 to 31 shown in Table 29 are shown in Table 30.

In Table 30, the compounds 1 to 31 are compounds represented by Formula 3, and $L^1$, A in $L^1$, $R^5$, $R^6$, $R^7$, $R^8$, X and M in Formula 3 represent structures described in Table 30, respectively.

In addition, the compound 32 is a compound having the following structure.

TABLE 30

| | $L^1$ | A in $L^1$ | $R^5$ | $R^6$ | $R^7$ | $R^8$ | X | M |
|---|---|---|---|---|---|---|---|---|
| Compound 1 | L1-1 | A-1 | H | R-1 | H | R-1 | O | Li |
| Compound 2 | L1-1 | A-1 | H | R-1 | H | R-1 | O | Na |
| Compound 3 | L1-1 | A-1 | H | R-1 | H | R-1 | O | K |
| Compound 4 | L1-1 | A-1 | H | R-1 | H | R-1 | O | Rb |
| Compound 5 | L1-1 | A-1 | H | R-1 | H | R-1 | O | Cs |
| Compound 6 | L1-1 | A-1 | H | R-7 | H | R-7 | O | Li |
| Compound 7 | L1-1 | A-1 | H | R-7 | H | R-7 | O | Na |
| Compound 8 | L1-1 | A-1 | H | R-7 | H | R-7 | O | K |
| Compound 9 | L1-1 | A-1 | H | R-11 | H | R-11 | O | Li |
| Compound 10 | L1-1 | A-1 | H | R-11 | H | R-11 | O | K |
| Compound 11 | L1-1 | A-1 | H | R-19 | H | R-19 | O | Li |
| Compound 12 | L1-1 | A-1 | H | R-19 | H | R-19 | O | Li |
| Compound 13 | L1-1 | A-1 | H | R-35 | H | R-35 | O | Li |
| Compound 14 | L1-1 | A-1 | H | R-56 | H | R-56 | O | Li |
| Compound 15 | L1-1 | A-1 | H | R-63 | H | R-63 | O | Li |
| Compound 16 | L1-1 | A-1 | H | R-64 | H | R-64 | O | Li |
| Compound 17 | L1-1 | A-2 | H | R-1 | H | R-1 | O | Li |
| Compound 18 | L1-1 | A-2 | H | R-20 | H | R-20 | O | Na |
| Compound 19 | L1-1 | A-2 | H | R-51 | H | R-51 | O | K |
| Compound 20 | L1-1 | A-4 | H | R-7 | H | R-7 | O | Li |
| Compound 21 | L1-1 | A-4 | H | R-69 | H | R-69 | O | Na |
| Compound 22 | L1-1 | A-4 | H | R-78 | H | R-78 | O | K |
| Compound 23 | L1-1 | A-8 | H | R-1 | H | R-1 | O | Li |
| Compound 24 | L1-1 | A-8 | H | R-11 | H | R-11 | O | Na |
| Compound 25 | L1-1 | A-8 | H | R-70 | H | R-70 | O | K |
| Compound 26 | L1-1 | A-39 | H | R-1 | H | R-1 | O | Li |
| Compound 27 | L1-1 | A-39 | H | R-71 | H | R-71 | O | Na |
| Compound 28 | L1-1 | A-39 | H | R-79 | H | R-79 | O | K |
| Compound 29 | L1-1 | A-42 | H | R-7 | H | R-7 | O | Li |
| Compound 30 | L1-1 | A-42 | H | R-72 | H | R-72 | O | Na |
| Compound 31 | L1-1 | A-42 | H | R-77 | H | R-77 | O | K |

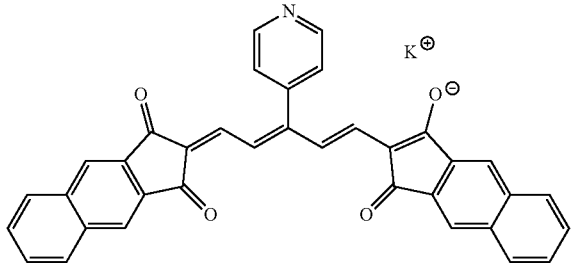

Compound 32

The details of the respective components in Table 29 other than the above-described components will be described.

Cyanine colorant: a compound having the following structure

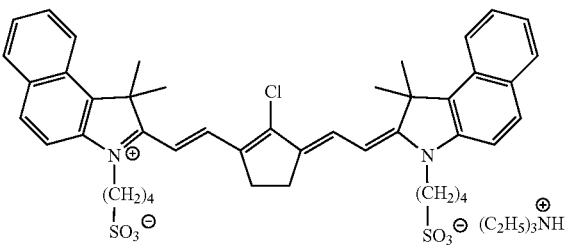

Cyanine Colorant

Glycerin: a water-soluble organic solvent, manufactured by Fujifilm Wako Pure Chemical Corporation Dipropylene glycol: a water-soluble organic solvent, manufactured by Fujifilm Wako Pure Chemical Corporation Diethylene glycol: a water-soluble organic solvent, manufactured by Fujifilm Wako Pure Chemical Corporation Trimethylolpropane: a water-soluble organic solvent, manufactured by Fujifilm Wako Pure Chemical Corporation SANNIX GP250: a water-soluble organic solvent, manufactured by Sanyo Chemical Industries Ltd.

Ethylene glycol: a water-soluble organic solvent, manufactured by Fujifilm Wako Pure Chemical Corporation OLFINE E1010: an acetylenic glycol surfactant, manufactured by Nissin Chemical Co., Ltd.

Polyvinyl pyrrolidone K15: a water-soluble organic solvent, manufactured by Tokyo Chemical Industry Co., Ltd.

SURFYNOL 104: an acetylenic glycol surfactant, manufactured by Nissin Chemical Co., Ltd.

Urethane resin particles WBR2101: manufactured by Taisei Fine Chemical Co., Ltd., volume average particle size: 33 nm, glass transition temperature 79° C., weight-average molecular weight: unclear Styrene acrylic resin particle: MOVINYL 972, manufactured by Nichigo-Movinyl Co., Ltd.

Triisopropanolamine: a pH adjuster, manufactured by Fujifilm Wako Pure Chemical Corporation Water: Pure water, manufactured by Fujifilm Wako Pure Chemical Corporation Examples 2-1 to 2-15

Ink compositions were prepared and the rub resistance, the dot shape, the light fastness, the ink stability, and the invisibility were evaluated using the same methods as those of Example 1-1, except that the compound 1 and the addition amounts of the other additives were changed to the compound and the addition amounts shown in Table 31.

In the tables, a numerical value corresponding to each of the components in the field "Ink Composition" represents the content thereof in the ink composition for ink jet printing (parts by mass).

TABLE 31

| | Example 2-1 | Example 2-2 | Example 2-3 | Example 2-4 | Example 2-5 | Example 2-6 | Example 2-7 | Example 2-8 |
|---|---|---|---|---|---|---|---|---|
| Compound 2 | 0.50 | 0.50 | — | — | — | — | — | — |
| Compound 3 | — | — | 0.50 | — | — | — | — | — |

TABLE 31-continued

| | | | | | | | | |
|---|---|---|---|---|---|---|---|---|
| Compound 4 | — | — | — | 0.50 | — | — | — | — |
| Compound 5 | — | — | — | — | 0.50 | — | — | — |
| Compound 6 | — | — | — | — | — | 0.50 | 0.50 | — |
| Compound 7 | — | — | — | — | — | — | — | 0.50 |
| Compound 8 | — | — | — | — | — | — | — | — |
| Compound 9 | — | — | — | — | — | — | — | — |
| Propylene Glycol | 30.00 | 40.00 | 40.00 | 30.00 | 40.00 | 20.00 | 30.00 | 20.00 |
| Glycerin | — | — | — | — | — | — | — | — |
| Dipropylene Glycol | — | — | — | — | — | — | — | — |
| Diethylene Glycol | — | — | — | — | — | — | — | — |
| Trimethylolpropane | — | — | — | — | — | — | — | — |
| SANNIX GP250 | — | — | — | — | — | — | — | — |
| Ethylene Glycol | — | — | — | — | — | — | — | — |
| OLEFINE E1010 | 1.00 | 1.00 | 1.00 | 1.00 | 1.00 | 1.00 | 1.00 | 1.00 |
| Polyvinyl Pyrrolidone K15 | — | — | — | — | — | — | — | — |
| Calcium Chloride | — | — | — | — | — | 0.01 | 0.01 | 0.01 |
| Acrylic Resin Particles A-1 | 4.00 | 4.00 | 4.00 | 4.00 | 4.00 | 6.00 | 6.00 | 4.00 |
| Water | 64.50 | 54.50 | 54.50 | 64.50 | 54.50 | 72.49 | 62.49 | 74.40 |
| Evaluation 1: Rub Resistance | C | D | D | C | D | A | B | A |
| Evaluation 2: Jettability | A | A | A | A | A | A | A | A |
| Evaluation 3: Light Fastness | A | B | B | A | B | A | A | A |
| Evaluation 4: Ink Stability | C | D | D | C | D | A | B | A |
| Evaluation 5: Invisibility | B | C | C | B | C | A | A | A |

| | Example 2-9 | Example 2-10 | Example 2-11 | Example 2-12 | Example 2-13 | Example 2-14 | Example 2-15 |
|---|---|---|---|---|---|---|---|
| Compound 2 | — | — | — | — | — | — | — |
| Compound 3 | — | — | — | — | — | — | — |
| Compound 4 | — | — | — | — | — | — | — |
| Compound 5 | — | — | — | — | — | — | — |
| Compound 6 | — | — | — | — | — | — | — |
| Compound 7 | 0.50 | — | — | — | — | — | — |
| Compound 8 | — | 0.50 | 0.50 | 0.50 | 0.50 | 0.50 | — |
| Compound 9 | — | — | — | — | — | — | 0.50 |
| Propylene Glycol | 20.00 | — | — | — | 20.00 | 15.00 | — |
| Glycerin | — | — | — | — | — | — | — |
| Dipropylene Glycol | — | — | 20.00 | — | — | — | — |
| Diethylene Glycol | — | — | — | 20.00 | — | — | — |
| Trimethylolpropane | — | — | — | — | 5.00 | — | — |
| SANNIX GP250 | — | — | — | — | — | 5.00 | — |
| Ethylene Glycol | — | — | — | — | — | — | 20.00 |
| OLEFINE E1010 | 1.00 | 1.00 | 1.00 | 1.00 | 1.00 | 1.00 | 1.00 |
| Polyvinyl Pyrrolidone K15 | 0.50 | — | — | — | — | — | — |
| Calcium Chloride | — | — | — | — | — | — | — |
| Acrylic Resin Particles A-1 | 6.00 | 4.00 | 4.00 | 4.00 | 4.00 | 4.00 | 4.00 |
| Water | 72.00 | 74.50 | 74.50 | 74.50 | 69.50 | 74.50 | 74.50 |
| Evaluation 1: Rub Resistance | A | C | B | B | B | B | B |
| Evaluation 2: Jettability | A | B | A | A | A | A | A |
| Evaluation 3: Light Fastness | A | A | A | A | A | A | A |
| Evaluation 4: Ink Stability | A | A | B | B | B | B | B |
| Evaluation 5: Invisibility | B | A | A | A | B | A | B |

Examples 3-1 to 3-12

Ink compositions were prepared and the rub resistance, the dot shape, the light fastness, the ink stability, and the invisibility were evaluated using the same methods as those of Example 1-1, except that the compound 1 and the addition amounts of the other additives were changed to the compound and the addition amounts shown in Table 32.

In the tables, a numerical value corresponding to each of the components in the field "Ink Composition" represents the content thereof in the ink composition for ink jet printing (parts by mass).

TABLE 32

|  | Example 3-1 | Example 3-2 | Example 3-3 | Example 3-4 | Example 3-5 | Example 3-6 |
| --- | --- | --- | --- | --- | --- | --- |
| Compound 10 | 0.5 | 0.5 | 0.5 | — | — | — |
| Compound 11 | — | — | — | 0.5 | — | — |
| Compound 12 | — | — | — | — | 0.5 | — |
| Compound 14 | — | — | — | — | — | 0.5 |
| Compound 15 | — | — | — | — | — | — |
| Compound 16 | — | — | — | — | — | — |
| Compound 17 | — | — | — | — | — | — |
| Compound 18 | — | — | — | — | — | — |
| Compound 19 | — | — | — | — | — | — |
| Compound 20 | — | — | — | — | — | — |
| Compound 21 | — | — | — | — | — | — |
| Propylene Glycol | 20.0 | 20.0 | 20.0 | 20.0 | 20.0 | 20.0 |
| Dipropylene Glycol | — | — | — | — | — | — |
| OLEFINE E1010 | 1.5 | 1.5 | 1.5 | 1.5 | 1.5 | 1.5 |
| Acrylic Resin Particles A-1 | 6.0 | 10.0 | 14.0 | — | — | — |
| Urethane Resin Particles WBR 2101, Particle Size: 33 nm, Tg 79° C. | — | — | — | 4.0 | — | — |
| Polyethylene Resin Particles HITECH E6314, Particle Size: 120 nm | — | — | — | — | 4.0 | — |
| Styrene-Acrylic Resin Particles MOVINYL 972, Particle Size: 131 nm, Tg 101° C. | — | — | — | — | — | 4.0 |
| Water | 72.0 | 68.0 | 64.0 | 74.0 | 74.0 | 74.0 |
| Evaluation 1: Rub Resistance | B | A | A | B | D | D |
| Evaluation 2: Jettability | A | B | C | B | B | C |
| Evaluation 3: Light Fastness | A | A | A | A | A | A |
| Evaluation 4: Ink Stability | B | C | D | C | C | C |
| Evaluation 5: Invisibility | A | A | B | A | A | A |

|  | Example 3-7 | Example 3-8 | Example 3-9 | Example 3-10 | Example 3-11 | Example 3-12 |
| --- | --- | --- | --- | --- | --- | --- |
| Compound 10 | — | — | — | — | — | — |
| Compound 11 | — | — | — | — | — | — |
| Compound 12 | — | — | — | — | — | — |
| Compound 14 | — | — | — | — | — | — |
| Compound 15 | 0.5 | — | — | — | — | — |
| Compound 16 | — | 0.5 | — | — | — | — |
| Compound 17 | — | — | 0.5 | — | — | — |
| Compound 18 | — | — | — | 0.5 | — | — |
| Compound 19 | — | — | — | — | 0.5 | — |
| Compound 20 | — | — | — | — | — | 0.5 |
| Compound 21 | — | — | — | — | — | — |
| Propylene Glycol | — | — | — | — | — | — |
| Dipropylene Glycol | 20.0 | 20.0 | 20.0 | 20.0 | 20.0 | 20.0 |
| OLEFINE E1010 | 1.5 | 1.5 | 1.5 | 1.5 | 1.5 | 1.5 |
| Acrylic Resin Particles A-1 | 2.0 | 4.0 | 6.0 | 8.0 | 10.0 | 12.0 |
| Urethane Resin Particles WBR 2101, Particle Size: 33 nm, Tg 79° C. | — | — | — | — | — | — |
| Polyethylene Resin Particles HITECH E6314, Particle Size: 120 nm | — | — | — | — | — | — |
| Styrene-Acrylic Resin Particles MOVINYL 972, Particle Size: 131 nm, Tg 101° C. | — | — | — | — | — | — |
| Water | 76.0 | 74.0 | 72.0 | 70.0 | 68.0 | 66.0 |
| Evaluation 1: Rub Resistance | C | B | B | A | A | A |
| Evaluation 2: Jettability | A | A | B | B | C | C |
| Evaluation 3: Light Fastness | A | A | A | A | A | A |
| Evaluation 4: Ink Stability | A | C | C | D | D | D |
| Evaluation 5: Invisibility | A | A | A | B | B | B |

Examples 4-1 to 4-10

Ink compositions were prepared and the rub resistance, the dot shape, the light fastness, the ink stability, and the invisibility were evaluated using the same methods as those of Example 1-1, except that the compound 1 and the addition amounts of the other additives were changed to the compound and the addition amounts shown in Table 33.

In the tables, a numerical value corresponding to each of the components in the field "Ink Composition" represents the content thereof in the ink composition for ink jet printing (parts by mass).

acrylic resin particles are used as the resin particles, the jettability and the ink stability are excellent as compared to a case where urethane resin particles are used. In addition, as shown in Examples 3-5 and 3-6, in a case where the particle size of the resin particles was less than 125 nm, jettability was excellent.

It can be seen from a comparison between Examples 1-8 and 2-10 shown in Tables 29 and 31 that, in a case where propylene glycol was used as the water-soluble organic solvent, an infrared absorbing image having excellent rub resistance can be obtained as compared to a case where glycerin was used.

TABLE 33

|  | Example 4-1 | Example 4-2 | Example 4-3 | Example 4-4 | Example 4-5 | Example 4-6 | Example 4-7 | Example 4-8 | Example 4-9 | Example 4-10 |
|---|---|---|---|---|---|---|---|---|---|---|
| Compound 22 | 0.5 | — | — | — | — | — | — | — | — | — |
| Compound 23 | — | 0.5 | — | — | — | — | — | — | — | — |
| Compound 24 | — | — | 0.5 | — | — | — | — | — | — | — |
| Compound 25 | — | — | — | 0.5 | — | — | — | — | — | — |
| Compound 26 | — | — | — | — | 0.5 | — | — | — | — | — |
| Compound 27 | — | — | — | — | — | 1 | — | — | — | — |
| Compound 28 | — | — | — | — | — | — | 1 | — | — | — |
| Compound 29 | — | — | — | — | — | — | — | 1 | — | — |
| Compound 30 | — | — | — | — | — | — | — | — | 1 | — |
| Compound 31 | — | — | — | — | — | — | — | — | — | 1 |
| Propylene Glycol | 20 | 20 | 20 | 20 | 20 | 20 | 20 | 20 | 20 | 20 |
| Glycerin | 10 | 20 | — | — | — | — | — | — | — | — |
| Dipropylene Glycol | — | — | 10 | 20 | — | — | — | — | — | — |
| Diethylene Glycol | — | — | — | — | 10 | — | — | — | — | — |
| OLEFINE E1010 | 1.5 | 1.5 | 1.5 | 1.5 | 1.5 | 1.5 | 1.5 | 1.5 | 1.5 | 1.5 |
| Acrylic Resin Particles A-1 | 4 | 4 | 4 | 4 | 4 | 4 | 4 | 4 | 4 | 4 |
| Water | — | — | — | — | — | — | — | — | — | — |
| Evaluation 1: Rub Resistance | C | D | C | D | C | A | A | A | A | A |
| Evaluation 2: Jettability | A | B | A | B | B | A | A | A | A | A |
| Evaluation 3: Light Fastness | A | A | A | A | A | A | A | A | A | A |
| Evaluation 4: Ink Stability | C | D | C | D | D | B | B | B | B | B |
| Evaluation 5 invisibility | B | C | C | D | C | B | B | B | B | B |

It can be seen from the results shown in Table 29 that, with the ink compositions for printing according to Examples 1-1 to 1-32, an infrared absorbing image having excellent light fastness can be obtained as compared to the ink composition for ink jet printing according to Comparative Example 1-2. In addition, an infrared absorbing image having excellent rub resistance can be obtained as compared to the ink composition for ink jet printing according to Comparative Example 1=, an infrared absorbing image having excellent rub resistance can be easily obtained.

In addition, it can be seen that with the ink compositions for ink jet printing according to Examples 1-1 to 1-32, rub resistance, jettability, ink stability, and invisibility can be improved as compared to the ink composition for ink jet printing according to Comparative Example 1.

In addition, it can be seen from a comparison between Examples 1-2, 2-1, and 2-2, Examples 1-3 and 2-3, Examples 1-4 and 2-4, Examples 1-5 and 2-5, Examples 1-22 and 4-1, Examples 1-23 and 4-2, Examples 1-24 and 4-3, Examples 1-25 and 4-4, and Examples 1-26 and 4-5 shown in Tables 29 and 31 to 33 that, in a case where the water-soluble organic solvent includes at least one selected from the group consisting of propylene glycol, dipropylene glycol, ethylene glycol, diethylene glycol, glycerin, and SANNIX GP250 (polyoxypropylene glyceryl ether) and the total content thereof is 5 mass % to 30 mass % with respect to the total mass of the ink, the light fastness, the rub resistance, the dot shape, and the ink stability are excellent.

It can be seen from a comparison between Examples 1-11 and 3-4 shown in Tables 29 and 32 that, in a case where Example 5

<Preparation of Treatment Liquid>

4 parts by mass of diethylene glycol monoethyl ether, 4 parts by mass of tripropylene glycol monomethyl ether, 2.6 parts by mass of 1,2,3-propanetricarboxylic acid, 7.3 parts by mass of malonic acid, 7.3 parts by mass of malic acid, 4.3 parts by mass of phosphoric acid, 2.5 parts by mass of a water-soluble polymer, 1 part by mass of benzotriazole, 0.5 parts by mass of an anionic surfactant (sodium dodecylbenzene sulfonate), 0.1 parts by mass of a silicone emulsion (solid content concentration: 15 mass %), and 66.8 parts by mass of ion exchange water were mixed with each other to prepare a treatment liquid.

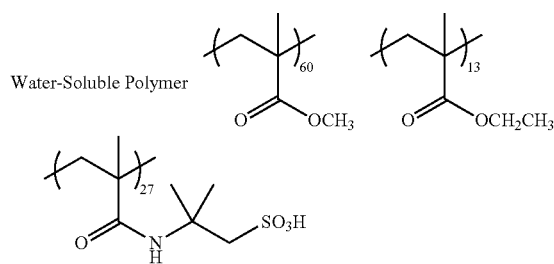

The water-soluble polymer was synthesized as follows.

30.0 g of isopropyl alcohol was charged into a 200 mL three-neck flask equipped with a stirrer, a thermometer, a reflux cooling pipe, and a nitrogen gas introduction pipe and was heated to 65° C. in a nitrogen atmosphere.

Next, 30.0 g of methyl methacrylate, 6.5 g of ethyl acrylate, 13.5 g of 2-acrylamido-2-methylpropanesulfonic acid, 30 g of isopropyl alcohol, and 15 g of water, and 2.97 g ((0.0129 mol); 3 mol % with respect to the total mol number (0.430 mol) of the monomers) of "V-601" (a polymerization initiator, manufactured by Fujifilm Wako Pure Chemical Corporation) were added dropwise at a constant speed until the dropwise addition was completed after 2 hours.

After completion of the dropwise addition, the solution was stirred for 2 hours. Next, 1.48 g (1.5 mol % with respect to the total mol number of the monomers) of "V-601" and 3.0 g of isopropyl alcohol were added and stirred for 2 hours.

The obtained polymer solution was neutralized with an aqueous solution of sodium hydroxide having the same mol number as that of the above-described 2-acrylamido-2-methylpropanesulfonic acid, isopropyl alcohol was distilled off by vacuum concentration, and water was added until the total amount of the polymer solution was 310 g. As a result, a polymer aqueous solution including 16 mass % of the water-soluble polymer was obtained.

The weight-average molecular weight (Mw) of the obtained water-soluble polymer was 45,000. The weight-average molecular weight was measured using the above-described method.

<Image Formation>

As the substrate, coated paper (OK TOP COAT+, manufactured by Oji Paper Co., Ltd.) and SHIRAOI (print paper, manufactured by Nippon Paper Industries Co., Ltd.) were used, and an image was formed under the following conditions.

During the following image formation, ink jetting was started within 10 seconds after the treatment liquid application (pre-treatment step).

[Pre-Treatment Step]

Immediately before the ink application to the substrate, the treatment liquid was applied to the substrate using a coating bar. The application amount of the treatment liquid was 1.7 g/m$^2$.

Next, the treatment liquid applied to the substrate was dried under the following conditions.

Drying Conditions for Treatment Liquid (Blast Drying)
Wind speed: 15 m/s
Temperature and heating method: a rear surface of the substrate (surface on a side where the treatment liquid was not applied) was heated using a contact-type planar heater such that the surface temperature (temperature on the side where the treatment liquid was applied) of the substrate was 60° C.
Blowing region: 450 mm (drying time: 0.7 seconds)
(Step of Forming Infrared Absorbing Image)

An image was formed in a single pass on the substrate to which the treatment liquid was applied using the ink (ink composition 1 for ink jet printing) according to Example 1-1 under the following conditions. Specifically, the ink was applied (jetted) to the treatment liquid-applied surface of the substrate to which the treatment liquid was applied under the following conditions to form an image.

<Image Forming Conditions>
Head: a piezoelectric head of 1,200 dpi (dot per inch)/20 inch (width)
Amount of liquid droplets jetted: 2.4 pL
Halftone dot rate: 10%
Driving frequency: 30 kHz (substrate transport speed; 635 mm/sec)

Next, the ink applied to the substrate was dried under the following conditions.
Drying Conditions for Ink (Blast Drying)
Wind speed: 15 m/s
Temperature: a rear surface of the substrate (surface on a side where the ink was not applied) was heated using a contact-type planar heater such that the surface temperature (temperature on the side where the ink was applied) of the substrate was 60° C.
Blowing region: 640 mm (drying time: 1 second)
<Evaluation>
[Observation of Dot Shape]

The dot shape of the sample obtained as described above was observed with an IR microscope (wavelength of IR light source: 783 nm). It was able to be verified that, in the sample prepared by applying the treatment liquid to coated paper, the dot shape was a small spherical shape as compared to a sample prepared using a method other than the treatment liquid application. It was found that, in the sample by applying the treatment liquid to SHIRAOI, the dot shape was similar to a spherical shape, the bleeding of the ink to the substrate was suppressed, and the concentration was high.

Example 6

By further performing an overcoat layer forming step after the step of forming the infrared absorbing image in Example 5, a printed material including the overcoat layer was prepared.

<Overcoat Layer Forming Step>
An image was formed on the image using the overcoat layer-forming composition in a single pass under the following conditions.
[Composition of Overcoat Layer-Forming Composition]
Resin particles A-1: 10 parts by mass
Propylene glycol: 20 parts by mass
OLFINE E1010: 1 part by mass
Water: an amount adjusted such that the total amount was 100 parts by mass
[Overcoat Layer Forming Conditions]
Head: a piezoelectric head of 1,200 dpi (dot per inch)/20 inch (width)
Amount of liquid droplets jetted: 2.4 pL
Halftone dot rate: 100% was set such that the overcoat layer was formed on the entire surface
Driving frequency: 30 kHz (substrate transport speed; 635 mm/sec)

Next, the overcoat layer-forming composition applied to the substrate was dried under the following conditions.
—Drying Conditions for Overcoat Layer-Forming Composition (Blast Drying)—
Wind speed: 15 m/s
Temperature: a rear surface of the substrate (surface on a side where the overcoat layer-forming composition was not applied) was heated using a contact-type planar heater such that the surface temperature (temperature on the side where the overcoat layer-forming composition was applied) of the substrate was 60° C.
Blowing region: 640 mm (drying time: 1 second)

It was able to be verified that the printed material according to Example 6 further had higher rub resistance than that of the printed material according to Example 5.

Example 7

Using the ink composition (ink composition 1 for ink jet printing) used in Example 1-1, a pattern image shown in FIG. 1 was prepared.

The details of the image forming method were the same as those of the Example 1.

Using an infrared reader "0.8 mm Height Flat Top Infrared LED (manufactured by Everlight Electronics Co., Ltd.), the formed infrared absorbing image was read, and the IR readability of the infrared absorbing image was evaluated based on the following evaluation standards.

In a case where the infrared reader was held over the infrared absorbing image, a read sound was generated within 3 seconds, and the read of the infrared absorbing image was verified.

The disclosure of Japanese Patent Application No. 2018-029131 filed on Feb. 21, 2018 is incorporated herein in its entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition for ink jet printing comprising:
a colorant represented by the following Formula 1;
resin particles;
a water-soluble organic solvent; and
water,

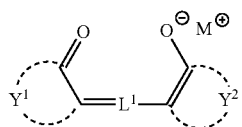

Formula 1 in Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain consisting of 5 or 7 methine groups, and a methine group at a center of the methine chain has a substituent represented by the following Formula A,

*-$S^A$-$T^A$      Formula A, in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, a cycloalkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and

* represents a binding site to the methine group at the center of the methine chain, wherein a content of the resin particles is 2 mass % to 12 mass % with respect to a total mass of the ink composition for ink jet printing.

2. The ink composition for ink jet printing according to claim 1,
wherein a volume average particle size of the resin particles is 125 nm or less.

3. The ink composition for ink jet printing according to claim 1,
wherein the resin particles include at least one kind of resin particles selected from the group consisting of acrylic resin particles, urethane resin particles, polyethylene resin particles, and styrene-acrylic resin particles.

4. The ink composition for ink jet printing according to claim 1,
wherein the water-soluble organic solvent includes at least one selected from the group consisting of propylene glycol, dipropylene glycol, ethylene glycol, diethylene glycol, glycerin, trimethylolpropane, 2-pyrrolidone, 1,5-pentanediol, triethylene glycol, polyethylene glycol, and polyoxypropylene glyceryl ether, and
a total content of the at least one water-soluble organic solvent selected from the group and another water-soluble organic solvent is 5 mass % to 35 mass % with respect to a total mass of the ink composition for ink jet printing.

5. The ink composition for ink jet printing according to claim 1,
wherein the colorant represented by Formula 1 is a colorant represented by the following Formula 3,

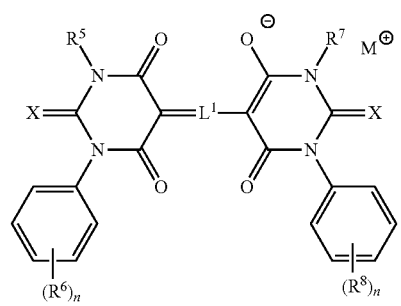

Formula 3 in Formula 3, $M^+$ represents a proton or a monovalent alkali metal cation or organic cation, $L^1$ represents a methine chain consisting of 5 or 7 methine groups, and a methine group at a center of the methine chain has a substituent represented by the following Formula A,

*-$S^A$-$T^A$      Formula A, in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^4$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^4$ represents a single bond or an alkylene group and $T^4$ represents an alkyl group, the total number of carbon atoms included in $S^4$ and $T^4$ is 3 or more,

* represents a binding site to the methine group at the center of the methine chain, $R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, $-OR^{L3}$, $-C(=O)R^{L3}$, $-C(=O)OR^{L3}$, $-OC(=O)R^{L3}$, $-N(R^{L3})_2$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-SR^{L3}$, $-S(=O)_2R^{L3}$, $-S(=O)_2OR^{L3}$, $-NHS(=O)_2R^{L3}$, or $-S(=O)_2N(R^{L3})_2$, $R^{L3}$'s each independently represent a hydrogen atom, an alkyl group, an alkenyl group, an aryl group, or a monovalent heterocyclic group, n's each independently represent an integer of 1 to 5, and
X's each independently represent an O atom, a S atom, or a Se atom.

6. The ink composition for ink jet printing according to claim 5,
wherein in Formula 3, at least one selected from the group consisting of $R^5$, $R^6$, $R^7$, and $R^8$ has a hydrogen-bonding group.

7. The ink composition for ink jet printing according to claim 1,
wherein a maximum absorption wavelength of a dry material is present in a wavelength range of 700 nm to 1000 nm.

8. The ink composition for ink jet printing according to claim 1,
wherein a reflectivity R1 of a dry material at a wavelength of 600 nm and a reflectivity R2 of the dry material at an absorption maximum in a wavelength range of 800 nm to 1000 nm satisfy the following Expression R, $$2 < R1/R2 \quad \text{Expression R.}$$

9. The ink composition for ink jet printing according to claim 1, which is an ink composition for forming an image that is readable using infrared light.

10. The ink composition for ink jet printing according to claim 1,
wherein a content of at least one of a divalent alkali earth metal element or a trivalent group 13 metal element is 10 ppm to 50000 ppm with respect to a total mass of the ink.

* * * * *